(12) United States Patent
Smith

(10) Patent No.: US 6,986,519 B2
(45) Date of Patent: Jan. 17, 2006

(54) LOW PROFILE CHASSIS AND SUSPENSION

(75) Inventor: Earl Dallas Smith, Greencastle, IN (US)

(73) Assignee: Aloha, LLC, Indianapolis, IN (US)

( * ) Notice: Subject to any disclaimer, the term of this patent is extended or adjusted under 35 U.S.C. 154(b) by 0 days.

(21) Appl. No.: 09/972,536

(22) Filed: Oct. 8, 2001

(65) Prior Publication Data

US 2002/0105170 A1    Aug. 8, 2002

Related U.S. Application Data

(63) Continuation-in-part of application No. 09/318,428, filed on May 25, 1999, now Pat. No. 6,398,251, which is a continuation-in-part of application No. 09/193,501, filed on Nov. 17, 1998, now abandoned, which is a continuation of application No. 08/792,972, filed on Jan. 31, 1997, now Pat. No. 5,839,750.

(60) Provisional application No. 60/238,790, filed on Oct. 6, 2000.

(51) Int. Cl.
    *B60G 3/14*    (2006.01)

(52) U.S. Cl. .................. 280/124.128; 280/124.116; 280/124.157; 280/43.18; 280/86.5; 280/789; 280/683; 414/921; 180/291; 180/309

(58) Field of Classification Search ......... 280/124.116, 280/124.128, 124.132, 124.157, 43.18, 678, 280/683, 86.5, 781, 789; 414/921; 180/291, 180/309

See application file for complete search history.

(56) References Cited

U.S. PATENT DOCUMENTS

| 496,663 A | 5/1893 | Miller |
|---|---|---|
| 844,615 A | 2/1907 | Palmer |
| 889,960 A | 6/1908 | Palmer |
| 1,128,770 A | 2/1915 | Gilliland |
| 1,165,784 A | 12/1915 | Klingelsmith |
| 1,244,783 A | 10/1917 | Ruckes |
| 1,833,053 A | 11/1931 | McManus |
| 1,857,249 A | 5/1932 | Marcum |

(Continued)

FOREIGN PATENT DOCUMENTS

| BE | 623587 | 4/1963 |
|---|---|---|

(Continued)

OTHER PUBLICATIONS

Chondros, T.G. et al.; *Vehicle Dynamics Simulation and Suspension System Design;* SAE Technical Paper Series, International Congress & Exposition, Detroit, MI Feb. 24-27, 1997.

(Continued)

*Primary Examiner*—Ruth Ilan
(74) *Attorney, Agent, or Firm*—Woodard, Emhardt, Moriarty, McNett & Henry LLP

(57) ABSTRACT

A low profile chassis and suspension system for a road vehicle. The chassis supports a payload section or cargo compartment, such as for a delivery truck, ambulance, or shuttle bus. The chassis includes a largely planar frame having a top surface which is located beneath the rotational axes of the rear wheels. The wheel suspension system is particularly compact and close to the road surface. A trailing arm-type wheel support supports a stub axle in a cantilevered fashion. A spring urges the wheel support apart from the frame. A planar portion of the wheel support, the wheel support pivot joints, and the spring are located beneath the rotational axis of the wheel. In another embodiment, the frame includes a recessed pocket which facilitates use of ramp for wheel chair access.

32 Claims, 45 Drawing Sheets

U.S. PATENT DOCUMENTS

| | | |
|---|---|---|
| 1,902,712 A | 3/1933 | Leipert |
| 1,930,208 A | 10/1933 | Marcum |
| 1,940,914 A | 12/1933 | Marcum |
| 1,981,593 A | 11/1934 | Fageol |
| 2,002,377 A | 5/1935 | Mayne |
| 2,060,015 A | 11/1936 | Barnes et al. |
| 2,062,233 A | 11/1936 | Poieier |
| 2,072,044 A | 2/1937 | Widman et al. |
| 2,085,662 A | 6/1937 | Johnson |
| 2,097,309 A | 10/1937 | Sanders, Jr. |
| 2,121,862 A | 6/1938 | Dodge |
| 2,172,173 A | 9/1939 | Peterman |
| 2,175,562 A | 10/1939 | Frohlich |
| 2,194,199 A | 3/1940 | Ash |
| 2,194,323 A | 3/1940 | Peterman |
| 2,194,964 A | 3/1940 | Willson |
| 2,205,723 A | 6/1940 | Hansen |
| 2,208,601 A | 7/1940 | Ronning |
| 2,217,817 A | 10/1940 | Ronning |
| 2,226,100 A | 12/1940 | Larison |
| 2,227,762 A | 1/1941 | Ronning |
| 2,236,695 A | 4/1941 | Peterman |
| 2,239,849 A | 4/1941 | Judd |
| 2,240,022 A | 4/1941 | Saives |
| 2,253,217 A | 8/1941 | Wenthe |
| 2,270,022 A | 1/1942 | Price |
| 2,297,465 A | 9/1942 | Froehlich |
| 2,308,969 A | 1/1943 | Riesing |
| 2,336,814 A | 12/1943 | Suter |
| 2,349,289 A | 5/1944 | Larison |
| 2,395,640 A | 2/1946 | Pearson |
| 2,411,885 A | 12/1946 | Larison |
| 2,453,388 A | 11/1948 | Schramm |
| 2,457,567 A | 12/1948 | Kuns |
| 2,465,098 A | 3/1949 | Inskeep |
| 2,490,311 A | 12/1949 | Levesque du Rostu |
| 2,497,072 A | 2/1950 | Cooper |
| 2,540,279 A | 2/1951 | Mosier |
| 2,554,261 A | 5/1951 | Munger |
| 2,566,393 A | 9/1951 | Wolfe |
| 2,576,824 A | 11/1951 | Bush |
| 2,597,122 A | 5/1952 | Mullen et al. |
| 2,607,431 A | 8/1952 | Buckendale |
| 2,609,212 A | 9/1952 | McMurtrie |
| 2,621,942 A | 12/1952 | Getz |
| 2,631,842 A | 3/1953 | Oppenlander et al. |
| 2,632,655 A | 3/1953 | King et al. |
| 2,641,464 A | 6/1953 | Linn |
| 2,684,237 A | 7/1954 | Kayler |
| 2,706,009 A | 4/1955 | Schramm |
| 2,706,113 A | 4/1955 | Hickman |
| 2,740,640 A | 4/1956 | Schaefer |
| 2,760,787 A | 8/1956 | Muller |
| 2,779,602 A | 1/1957 | Kimbro et al. |
| 2,806,710 A | 9/1957 | Mascaro |
| 2,807,381 A | 9/1957 | Tegeler |
| 2,822,100 A | 2/1958 | Pesta |
| 2,822,186 A | 2/1958 | Lires |
| 2,825,578 A | 3/1958 | Walker |
| 2,862,635 A | 12/1958 | Christenson et al. |
| 2,865,031 A | 12/1958 | Maloney |
| 2,870,928 A | 1/1959 | Haggard et al. |
| 2,876,466 A | 3/1959 | Baldwin |
| 2,876,922 A | 3/1959 | Holiday |
| 2,916,296 A | 12/1959 | Muller |
| 2,964,331 A | 12/1960 | Sherman |
| 2,977,132 A | 3/1961 | Bainbridge |
| 3,031,203 A | 4/1962 | Christenson et al. |
| 3,054,636 A | 9/1962 | Wessells |
| 3,064,746 A * | 11/1962 | Williamson ............... 180/54.1 |
| 3,063,737 A | 12/1962 | Coughran |
| 3,096,085 A | 7/1963 | Owens |
| 3,108,836 A | 10/1963 | Deckert |
| 3,113,686 A | 12/1963 | Sundin |
| 3,147,023 A | 9/1964 | Raymo |
| 3,149,856 A | 9/1964 | Schilberg |
| 3,171,669 A | 3/1965 | Barenyi |
| 3,180,510 A | 4/1965 | Moller |
| 3,201,142 A | 8/1965 | Dangauthier |
| 3,246,884 A | 4/1966 | Prichard et al. |
| 3,254,899 A | 6/1966 | Voorhies |
| 3,271,046 A | 9/1966 | Evans et al. |
| 3,271,077 A | 9/1966 | Timmer et al. |
| 3,332,701 A | 7/1967 | Masser |
| 3,345,104 A | 10/1967 | Ulicki |
| 3,384,384 A | 5/1968 | Diehl |
| 3,473,821 A | 10/1969 | Barenyi et al. |
| 3,477,738 A | 11/1969 | Manning |
| 3,534,977 A | 10/1970 | Wessel |
| 3,573,882 A | 4/1971 | Van Winsen |
| 3,578,352 A | 5/1971 | Heine |
| 3,601,424 A | 8/1971 | Badland |
| 3,601,426 A | 8/1971 | Hury |
| 3,610,653 A | 10/1971 | Derrwaldt et al. |
| 3,661,419 A | 5/1972 | Mitamura et al. |
| 3,662,647 A | 5/1972 | King |
| 3,672,698 A | 6/1972 | Froumajou |
| 3,685,853 A | 8/1972 | Goldsmith |
| 3,689,103 A | 9/1972 | Meulendyk |
| 3,704,029 A | 11/1972 | Bailleux |
| 3,704,896 A | 12/1972 | Buelow |
| 3,736,002 A | 5/1973 | Grosseau |
| 3,737,173 A | 6/1973 | Boissier et al. |
| 3,751,061 A | 8/1973 | Scheuerpflug |
| 3,752,493 A | 8/1973 | McWhorter |
| 3,752,496 A | 8/1973 | Meinecke, Jr. |
| 3,763,950 A | 10/1973 | Rockwell |
| 3,778,082 A | 12/1973 | Grosseau |
| 3,779,576 A | 12/1973 | Malcolm |
| 3,781,032 A | 12/1973 | Jones |
| 3,784,218 A | 1/1974 | Stone |
| 3,788,683 A | 1/1974 | Rumell |
| 3,794,343 A | 2/1974 | Hickman |
| 3,807,752 A | 4/1974 | Mauck |
| 3,811,697 A | 5/1974 | Armstrong |
| 3,820,813 A | 6/1974 | Moulton et al. |
| 3,822,908 A | 7/1974 | Gouirand |
| 3,831,210 A | 8/1974 | Ow |
| 3,866,935 A | 2/1975 | Nelson |
| 3,868,129 A | 2/1975 | Grosseau |
| 3,873,120 A | 3/1975 | Lecomte et al. |
| 3,900,119 A | 8/1975 | Olsen |
| 3,918,739 A | 11/1975 | Kirkland |
| 3,944,248 A | 3/1976 | Herrman |
| 3,966,223 A | 6/1976 | Carr |
| 3,974,926 A | 8/1976 | Kopaska |
| 3,992,027 A | 11/1976 | Legueu |
| 4,008,902 A | 2/1977 | Dill |
| 4,058,325 A | 11/1977 | Schramm |
| 4,060,145 A | 11/1977 | Kingman et al. |
| 4,063,745 A | 12/1977 | Olson |
| 4,063,779 A | 12/1977 | Martin et al. |
| 4,065,153 A | 12/1977 | Pringle |
| 4,085,945 A | 4/1978 | Bicht et al. |
| 4,114,712 A | 9/1978 | Finta |
| 4,131,209 A | 12/1978 | Manning |
| 4,155,570 A | 5/1979 | Wiley, Jr. |
| 4,168,075 A | 9/1979 | Matschinsky |
| 4,171,830 A | 10/1979 | Metz |
| 4,230,341 A | 10/1980 | Hart et al. |
| 4,231,144 A | 11/1980 | Bernacchia, Jr. |
| 4,248,455 A | 2/1981 | Manning |
| 4,261,591 A | 4/1981 | Warne, Jr. |
| 4,280,710 A | 7/1981 | Rogge |

| | | | | | | |
|---|---|---|---|---|---|---|
| 4,302,022 A | 11/1981 | Schoeffler et al. | | 5,820,156 A | 10/1998 | VanDenberg |
| 4,339,224 A | 7/1982 | Lamb | | 5,845,919 A | 12/1998 | VanDenberg |
| 4,343,506 A | 8/1982 | Saltzman | | 5,853,183 A | 12/1998 | VanDenberg |
| 4,434,998 A | 3/1984 | Kaltwasser | | 5,860,661 A | 1/1999 | Boucher et al. |
| 4,483,546 A | 11/1984 | Brearley | | 5,863,049 A | 1/1999 | Mahvi |
| 4,488,736 A | 12/1984 | Aubry et al. | | 5,868,418 A | 2/1999 | VanDenberg |
| 4,527,486 A | 7/1985 | Baird et al. | | 5,881,458 A | 3/1999 | Wolf et al. |
| 4,530,515 A | 7/1985 | Raidel | | 5,882,031 A | 3/1999 | VanDenberg |
| 4,580,808 A | 4/1986 | Smith-Williams | | 5,908,198 A | 6/1999 | VanDenberg |
| 4,596,304 A | 6/1986 | Teshima | | 5,915,705 A | 6/1999 | VanDenberg |
| 4,623,162 A | 11/1986 | Weitzenhof et al. | | 5,937,963 A | 8/1999 | Urbanczyk |
| 4,630,840 A | 12/1986 | Masuda et al. | | 5,944,339 A | 8/1999 | McKenzie et al. |
| 4,666,181 A | 5/1987 | Wegner | | 5,947,550 A | 9/1999 | Mehren et al. |
| 4,671,525 A | 6/1987 | Ribi | | 5,951,097 A | 9/1999 | Esposito et al. |
| 4,673,328 A | 6/1987 | Shiels | | D417,172 S | 11/1999 | Smith et al. |
| 4,685,858 A | 8/1987 | Manning et al. | | 5,988,672 A | 11/1999 | VanDenberg |
| 4,705,133 A | 11/1987 | Christenson et al. | | 6,050,586 A | 4/2000 | Wilson |
| 4,708,361 A | 11/1987 | Takada et al. | | 6,113,180 A | 9/2000 | Corporon et al. |
| 4,725,074 A | 2/1988 | Stevens | | 6,123,347 A | 9/2000 | Christenson |
| 4,752,177 A | 6/1988 | Zenna | | D434,701 S | 12/2000 | Patmont |
| 4,759,567 A | 7/1988 | Allen | | 6,158,750 A | 12/2000 | Gideon et al. |
| 4,762,421 A | 8/1988 | Christenson et al. | | 6,186,733 B1 | 2/2001 | Lewis et al. |
| 4,763,953 A | 8/1988 | Chalin | | 6,189,901 B1 | 2/2001 | Smith et al. |
| 4,811,972 A | 3/1989 | Wiley, Jr. | | 6,209,205 B1 | 4/2001 | Rumpel et al. |
| 4,856,839 A | 8/1989 | Scott et al. | | 6,234,502 B1 | 5/2001 | Sobina |
| 4,898,508 A | 2/1990 | Hayata | | 6,237,926 B1 | 5/2001 | Pritchard et al. |
| 4,903,209 A | 2/1990 | Kaneko | | 6,249,948 B1 | 6/2001 | Casso |
| 4,915,577 A | 4/1990 | Fraser | | 6,299,240 B1 | 10/2001 | Schroeder et al. |
| D307,732 S | 5/1990 | Level | | 6,312,205 B1 | 11/2001 | VanDenberg |
| 4,930,806 A | 6/1990 | Walker, Jr. | | 6,364,048 B1 | 4/2002 | McComber |
| 4,946,189 A | 8/1990 | Manning | | 6,371,227 B2 | 4/2002 | Bartlett |
| 4,950,031 A | 8/1990 | Mizunaga et al. | | 6,390,537 B1 | 5/2002 | DiGonis |
| 5,015,004 A | 5/1991 | Mitchell | | 6,416,136 B1 | 7/2002 | Smith |
| 5,035,462 A | 7/1991 | Page et al. | | 6,439,131 B1 | 8/2002 | Higgins |
| 5,050,897 A | 9/1991 | Strömberg | | 6,488,299 B2 | 12/2002 | Kim |
| 5,052,713 A | 10/1991 | Corey et al. | | 6,494,285 B1 | 12/2002 | Williams |
| 5,052,879 A * | 10/1991 | Wolfe ......................... 414/541 | | 6,511,078 B2 | 1/2003 | Sebe |
| 5,090,495 A | 2/1992 | Christenson | | 6,520,521 B2 | 2/2003 | Mayfield |
| 5,094,314 A | 3/1992 | Hayata | | D473,504 S | 4/2003 | Harbin |
| 5,174,628 A | 12/1992 | Hayatsugu et al. | | 6,575,485 B2 | 6/2003 | Durrin |
| 5,178,432 A | 1/1993 | Zeman et al. | | 6,575,523 B2 | 6/2003 | Votruba et al. |
| 5,195,771 A | 3/1993 | Eckert | | 6,585,223 B1 | 7/2003 | VanDenberg |
| 5,261,330 A | 11/1993 | Veit-Salomon et al. | | 6,588,778 B1 | 7/2003 | McLaughlin |
| 5,303,946 A | 4/1994 | Youmans et al. | | 6,589,098 B2 | 7/2003 | Lee et al. |
| 5,332,258 A | 7/1994 | Büttner | | 6,669,303 B2 | 12/2003 | Dodd |
| 5,364,128 A | 11/1994 | Ide | | 2002/0153690 A1 | 10/2002 | Varela |
| 5,375,880 A | 12/1994 | Fleener et al. | | 2003/0001354 A1 | 1/2003 | Pavuk |
| 5,378,010 A | 1/1995 | Marino et al. | | 2003/0010561 A1 | 1/2003 | Bartel |
| 5,380,029 A | 1/1995 | Portilla | | 2003/0015848 A1 | 1/2003 | Pham et al. |
| 5,391,041 A | 2/1995 | Stanbury et al. | | 2003/0094780 A1 | 5/2003 | Cho |
| 5,413,368 A | 5/1995 | Pong et al. | | 2003/0098564 A1 | 5/2003 | VanDenberg et al. |
| 5,415,107 A | 5/1995 | Tutzauer | | 2003/0111866 A1 | 6/2003 | Crean |
| 5,443,283 A | 8/1995 | Hawkins et al. | | 2003/0125858 A1 | 7/2003 | Lin et al. |
| 5,476,303 A | 12/1995 | Sakamoto et al. | | | | |
| 5,505,482 A | 4/1996 | VanDenberg | | FOREIGN PATENT DOCUMENTS | | |
| 5,540,454 A | 7/1996 | VanDenberg et al. | | CA | 2342680 A1 | 9/2002 |
| 5,560,639 A | 10/1996 | Nowell et al. | | DE | 467309 | 10/1928 |
| 5,577,793 A | 11/1996 | Kobasic | | DE | 654482 | 12/1937 |
| D376,564 S | 12/1996 | Mishoe | | DE | 888 217 | 8/1953 |
| 5,597,174 A | 1/1997 | Christenson et al. | | DE | 893 757 | 10/1953 |
| 5,618,151 A | 4/1997 | Rosenkranz | | DE | 895 254 | 11/1953 |
| 5,632,508 A | 5/1997 | Jacobs et al. | | DE | 1737686 | 1/1957 |
| 5,673,929 A | 10/1997 | Alatalo | | DE | 1 630 664 | 7/1971 |
| 5,676,515 A | 10/1997 | Haustein | | DE | 3031353 A1 | 3/1982 |
| 5,683,098 A | 11/1997 | VanDenberg | | DE | 90 06 249.3 U1 | 10/1990 |
| 5,690,353 A | 11/1997 | VanDenberg | | DE | 42 17 261 A1 | 12/1993 |
| 5,713,424 A | 2/1998 | Christenson | | EP | 0162511 A1 | 11/1985 |
| 5,718,443 A | 2/1998 | St. Onge | | EP | 0464412 A1 | 1/1992 |
| 5,718,445 A | 2/1998 | VanDenberg | | EP | 0955187 A1 | 11/1999 |
| 5,739,787 A | 4/1998 | Burke et al. | | EP | 0997327 A2 | 5/2000 |
| 5,788,263 A | 8/1998 | VanDenberg | | EP | 0997327 A3 | 5/2000 |
| 5,791,681 A | 8/1998 | VanDenberg | | EP | 1216859 A2 | 6/2002 |
| 5,810,544 A | 9/1998 | Wellman | | EP | 0999973 B1 | 5/2003 |

| | | |
|---|---|---|
| FR | 571499 | 5/1924 |
| FR | 825727 | 2/1938 |
| FR | 1.175.011 | 3/1959 |
| FR | 2.079.967 | 11/1971 |
| FR | 2.150.398 | 4/1973 |
| FR | 2.702.956 | 9/1994 |
| GB | 426703 | 4/1935 |
| GB | 819223 | 9/1959 |
| GB | 2 014 914 A | 9/1979 |
| GB | 2 276 128 A | 9/1994 |
| JP | 5-319262 | 12/1993 |
| JP | 9228833 A2 | 9/1997 |
| JP | 10076826 A2 | 3/1998 |
| JP | 111155182 A2 | 4/1999 |
| JP | 2001039350 A2 | 2/2001 |
| JP | 2001122153 A2 | 5/2001 |
| JP | 2001187525 A2 | 7/2001 |
| JP | 2002283998 A2 | 10/2002 |
| JP | 2002362125 A2 | 12/2002 |
| JP | 2002362408 A2 | 12/2002 |
| JP | 2002284003 A2 | 10/2003 |
| NL | 7612924 | 5/1978 |
| NL | 7805646 | 11/1979 |
| WO | WO 94/01988 A1 | 1/1994 |
| WO | WO 94/08806 A1 | 4/1994 |
| WO | WO 97/44209 A1 | 11/1997 |
| WO | WO 00/53442 A1 | 9/2000 |
| WO | WO 01/28791 A1 | 4/2001 |
| WO | WO 02/079020 A1 | 10/2002 |
| WO | WO 03/039891 A1 | 5/2003 |
| WO | WO 03/057517 A1 | 7/2003 |

OTHER PUBLICATIONS

Cole, David J.; *Fundamental Issues in Suspension Design for Heavy Road Vehicles;* System Dynamics 2001, vol. 35, No. 4-5, pp. 319-360.
Crolla, D.A. et al.; *Independent vs. Axle Suspension for On/Off Road Vehicles;* SAE Technical Paper Series, International Off-Highway & Powerplant Congress & Exposition, Milwaukee, WI, Sep. 14-17, 1992.
Dana Corporation; *Axles, Driveshafts, and Suspensions for Specialty Vehicles;* Condensed Specifications (undated).
Dana Corporation; *Axles, Transmission, Torque Converters, Electronic Controls, and Driveshafts for Off-Highway Vehicles;* Condensed Specifications, 2002.
ElMadeny, M. M. et al.; *Optimum Design of Tractor-Semitrailer Suspension Systems;* SAE Paper #801419, 1980.
Glass, Jeffrey L.; *Experimental Evaluation of a Trailing-Arm Suspension for Heavy Trucks;* Thesis submitted to the Faculty of the Virginia Polytechnic Institute and State University, Blacksburg, VA, May 8, 2001.
Henry, O. Lee; *Development of Air Suspension Systems for Highway Tractors and Trailers;* SAE, National Combined Fuels and Lubricants and Transportation Meetings, Philadelphia, PA, Nov. 4-6, 1970.
Horntrich, Herbert; *Rear Suspension Design with Front Wheel Drive Vehicles;* SAE Technical Paper Series, International Congress and Exposition, Cobo Hall, Detroit, MI, Feb. 23-27, 1981.
Locke, W.S.; *Evolution of an Air Suspension System for Trucks;* SAE, Automotive Engineering Congress, Detroit, MI, Jan. 10-14, 1972.
Michelena, Nestor et al.; *Design of an Advanced Heavy Tactical Trucks: A Target Cascading Case Study;* SAE Technical Paper Series, International Truck and Bus Meeting and Exhibition, Chicago, IL, Nov. 12-14, 2001.
Mousseau, C.W et al; *The effect of tyre and suspension dynamics on wheel spindle forces;* Heavy Vehicle Systems, Int. J. of Vehicle Design, vol. 6, Nos. 1/4, 1999.
Transportation Research Board; *Applicability of Low-Floor Light Rail Vehicles in North America;* TCRP Report 2, 1995.
5 pages from website: www.jhuapl.edu/programs/trans/ANGV.htm; Johns Hopkins University Applied Physics Laboratory, ANGV Program.
4 pages from website: www.k12.nf.ca/gc/Staff/Teachers/Crummey/fiero/bumpsteer.htm; Fiero 2m4; *The Bump Steer Story*.
1 page from website: www.geocities.com/cesargrau/suspensionwebpage_trailing ; showing a trailing arm rear suspension.
3 pages from website: www.fta.dot.gov/brt/guide/vehicle.html ; BRT Reference Guide for Vehicle Design.
4 pages from website: www.geocities.com/gkurka2001/CarTech/tech_suspension21.htm ; Suspension Geometry—Independent Suspension, *Trailing arm and Semi-trailing arm suspension*.
2 pages from website: www.ukcar.com/features/tech/suspension/trailingarm.htm ; UKCAR, *Trailing arm and semi-trailing arm suspension*.
Bosch Automotive Handbook, "Suspension linkage," pp. 620-623, 2000.
Milliken, William F; Milliken, Douglas L., *Race Car Vehicle Dynamics,* "Independent Rear Suspensions;" pp. 636-658, 1995.
Bastow, Donald; Howard, Geoffrey; and Whitehead, John P; *Car Suspension and Handling,* 4$^{th}$ ed., Chapters 7 & 8, pp. 187-229, 1993.
Bosch Automotive Handbook, 5$^{th}$ ed., pp. 612-623, 2000.
Dixon, John C.; *Tires, Suspension and Handling,* 2$^{nd}$ ed., Chapter 4, pp. 181-224, 1996.
Gillespie, Thomas D.; *Fundamentals of Vehicle Dynamics,* Chapter 7, pp. 237-274, 1992.
Goodsell, Don; *Dictionary of Automotive Engineering,* 2$^{nd}$ ed., pp. 114, 115, 190, 191, 230, and 231, 1995.
Milliken, William F. and Milliken, Douglas L; *Race Car Vehicle Dynamics,* Chapter 17, pp. 607-663, 1995.
Stone, Richard and Ball, Jeffrey K.; *Automotive Engineering Fundamentals,* Chapter 8, pp. 345-396, 2004.
*Truck and Bus Chassis, Suspension, Stability and Handling,* SP-1651, published by Society of Automotive Engineers, Inc., Nov. 2001.
*Vehicle Dynamics, Braking, Steering and Suspensions;* SP-1814, published by Society of Automotive Engineers, Inc., pp. 211-218, Nov. 2003.
www.hino.co.jp/e/invest/annual/1999/7205e_4b, Excerpt from Annual Report, 3 pages.
www.tokyo-motorshow.com/show/2000/ENGLISH/BOOTH, Booth Guide, Tokyo Motor Show 2000, 4 pages.
www.hino.co.jp.e/info/news/ne_20020927.html, Corporate Info, News from Hino, Toyota/Hino Fuel Cell Hybrid Buss 1$^{st}$ to Obtain Ministry Certification, 2 pages.
www.daihatsu.com/news/n2002/02101101/, Diahatsu: News, Toyota, Hino, Daihatsu to Highlight Environmental Technologies, Universal Mobility and Logistics systems at Toyko Motor Show, 9 pages.
www.hino.co.jp/e/info/news/ne_20040510.html, Corporate Info, News from Hino, Hino Motors Upgrades all Diesel Vehicles in the Hino Dutro Light-Duty Truck Series to Comply with Four-Star Ultra-Low PM Emission Diesel Vehicle Certification System, 3 pages.
www.hino.co.jp/e/info/news/ne_20041015.html, Corporate Info, News from Hino, Hino Motors will exhibit new concept vehicles and others under the themes, "Safety frontrunner" and Environmental frontrunner at the 38$^{th}$ Tokyo Motor Show (2004), 6 pages.

* cited by examiner

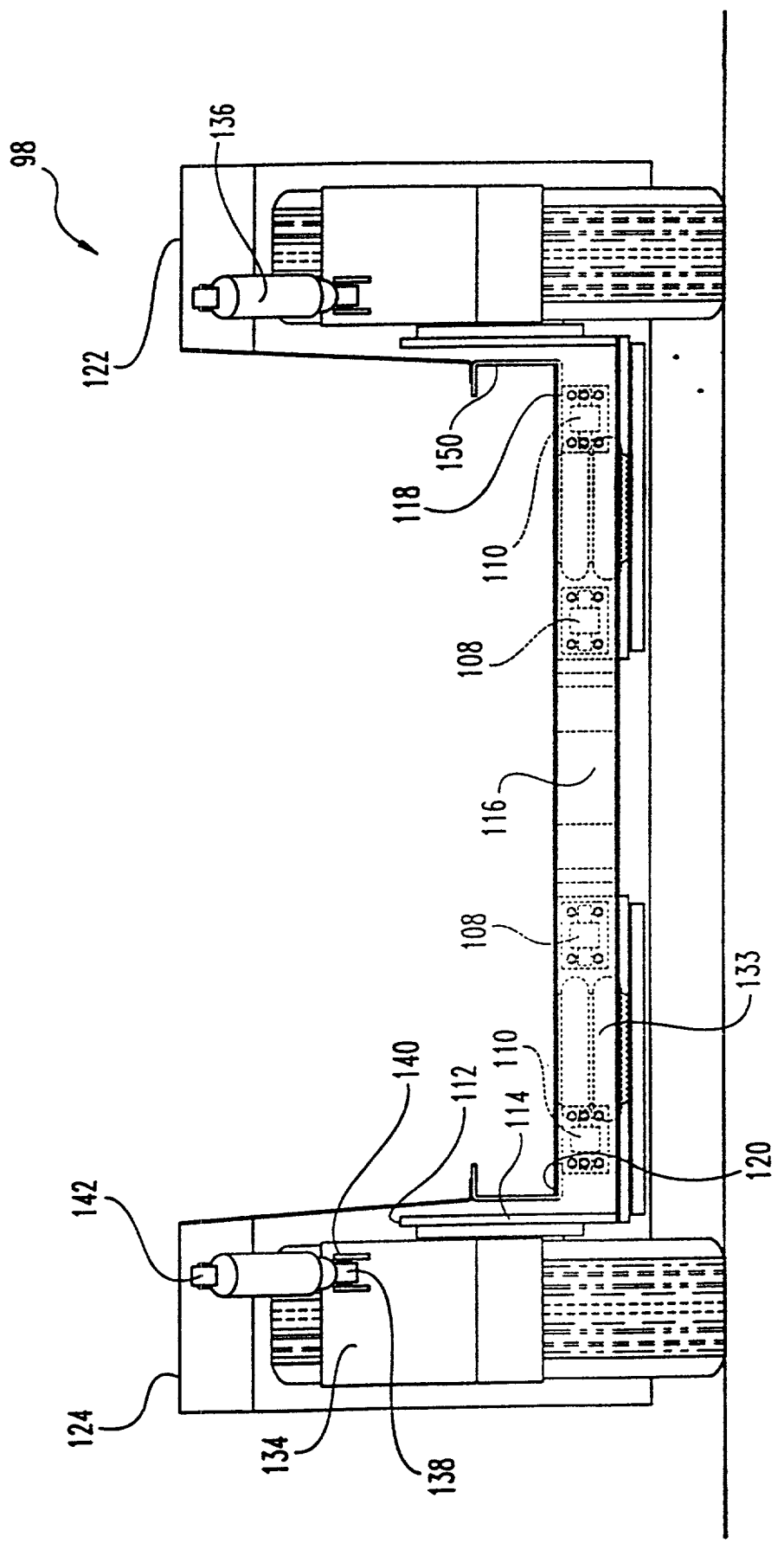

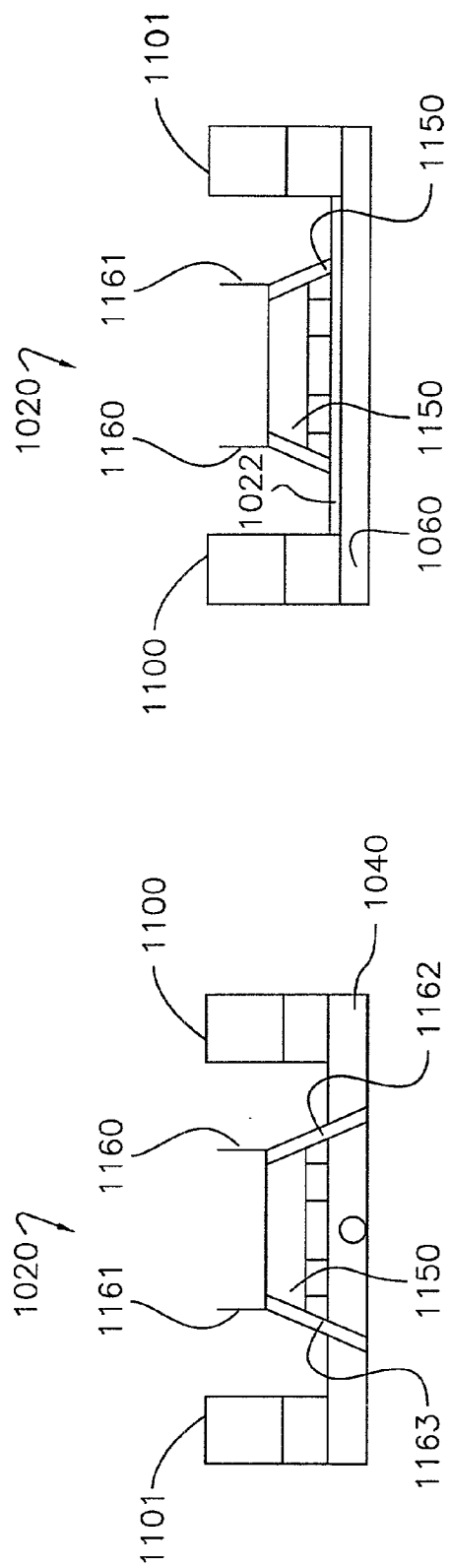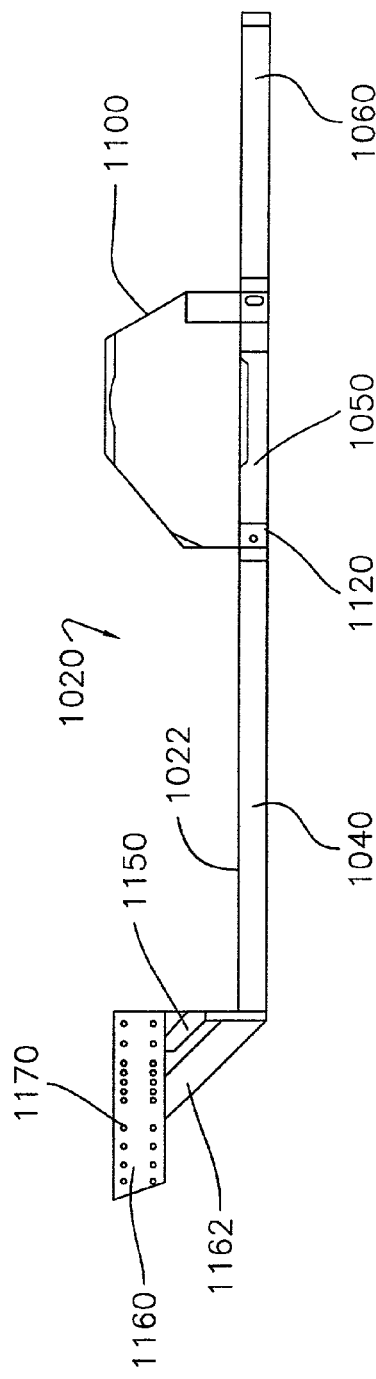

LOW PROFILE CHASSIS AND SUSPENSION

CROSS-REFERENCE TO RELATED APPLICATIONS

This application is a continuation-in-part application of my application Ser. No. 09/193,501, filed Nov. 17, 1998 now abandoned, entitled LEAF SPRING WHEEL SUSPENSION SYSTEM, which is a continuation of Ser. No. 08/792,972, filed Jan. 31, 1997, entitled LEAF SPRING WHEEL SUSPENSION SYSTEM, which issued as U.S. Pat. No. 5,839,750 on Nov. 24, 1998. This application also claims priority to U.S. provisional patent application Ser. No. 60/238,790, filed Oct. 6, 2000 and entitled LOW PROFILE CHASSIS AND SUSPENSION. This application is a continuation in part and also claims priority to my application Ser. No. 09/318,428, filed May 25, 1999 now U.S. Pat. No. 6,398,251. All of the above-referenced applications are incorporated herein by reference.

BACKGROUND OF THE INVENTION

Field of the Invention

This invention relates to the field of wheel suspensions, and particularly to wheel suspension systems that independently support the wheels of a vehicle in which a wide and low cargo floor is desired. This invention is an improvement to the wheel suspension systems described in my earlier patents, namely, U.S. Pat. No. 4,878,691, issued on Nov. 7, 1989, U.S. Pat. No. 4,934,733, issued on Jun. 19, 1990, U.S. Pat. No. 5,016,912, issued on May 21, 1991, U.S. Pat. No. 5,275,430, issued on Jan. 4, 1994, and U.S. Pat. No. 5,839,750, issued on Nov. 24, 1998, all incorporated herein by reference.

For a variety of reasons, it is frequently desirable to have the cargo floor of a trailer, van, or similar vehicle as low as reasonably possible. A low floor provides for more efficient transportation of cargo, giving a vehicle more useable, internal space for given exterior dimensions. Also, a low floor placed close to the road surface makes for easier access to the vehicle. These and other advantages of a low cargo floor have motivated various proposals for low vehicle floors.

SUMMARY OF THE INVENTION

One embodiment of the present invention is a unique apparatus for placing the floor of a cargo compartment or payload section of a vehicle close to the roadway surface. Examples of cargo compartments and payload sections include the aft section of delivery trucks, airport shuttle buses and ambulances.

In another embodiment of the present invention, there is a novel configuration for a vehicle which includes a cab section with a high mounted engine and high placed cab floor coupled to a low profile chassis.

In yet another embodiment of the present invention, there is a novel manner of supporting an exhaust pipe within a frame that rides close to the road surface.

In a still further embodiment of the present invention, there is an apparatus for a road vehicle which includes a pair of frame sections with substantially planar top surfaces, and a planar bottom surface on one of the frame sections which provides increased ground clearance. A still further embodiment of the present invention pertains to a frame section of a vehicle placed below the rotational axes of the rear wheels, the frame section defining a recessed pocket adapted and configured to provide wheelchair access to the vehicle from a ramp.

In another embodiment of the present invention, there is a front suspension for a road vehicle which includes a pair of trailing arm supports attached to a driven front axle, and a pivotal member which links a trailing arm on one side of the vehicle with a frame member on the other side of the vehicle.

Yet another embodiment of the present invention pertains to a hydraulic brake assembly for use on a wheel whose rotational axis is above the top surface of a frame section. The hydraulic ports and hydraulic lines for the brake assembly are oriented such that they do not extend inward of the inboard surface of the brake assembly.

In yet another embodiment of the present invention, a vehicle including a rear frame with a top surface below rotational axes of the rear wheels is coupled to a driven front axle. The front axle receives power from an engine which is located aft of the front axle.

Accordingly, one object of the present invention is to provide a unique apparatus for transporting people and/or cargo in a vehicle.

Further objects, embodiments, forms, benefits, aspects, features, and advantages of the present invention can be obtained from the description, drawings, and claims provided herein.

DESCRIPTION OF THE DRAWINGS

FIG. 6A is a cross-sectional view of the vehicle section of FIG. 5 as taken along line 6—6 of FIG. 5.

FIG. 25A is a front elevational view of the embodiment of FIG. 24.

FIG. 25B is a rear elevational view of the embodiment of FIG. 24.

FIG. 25C is a left side elevational view of the embodiment of FIG. 24.

DESCRIPTION OF THE PREFERRED EMBODIMENT

Figure 1:
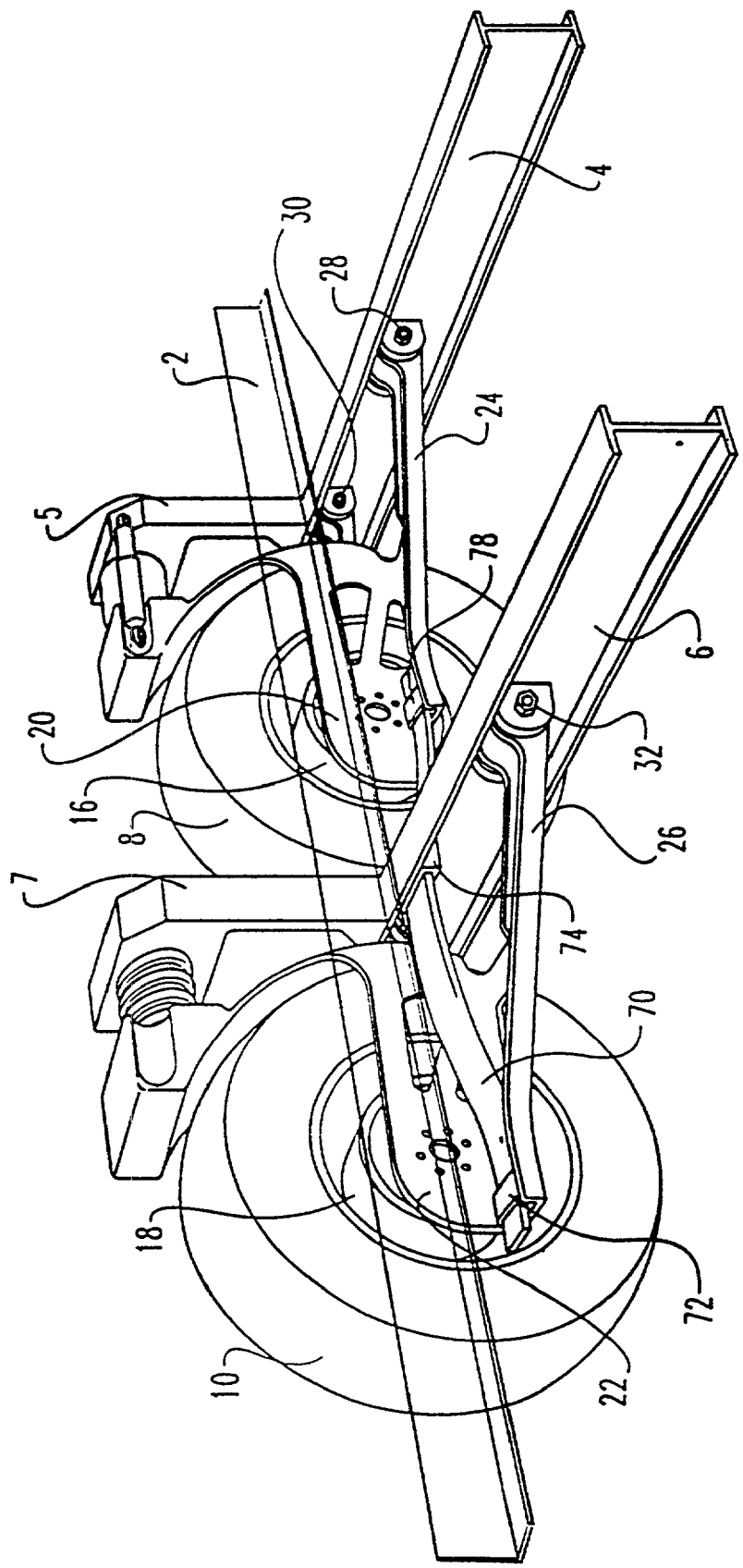
FIG. 1 is a perspective view of a pair of wheel suspension systems constructed in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a wheel suspension system which has an extremely low profile. The suspension system utilizes a wheel support that is connected with the vehicle frame at points of attachment on the frame which are spaced apart laterally, thereby providing lateral support for the wheel. The wheel support is pivotable between an uppermost position and a lowermost position. One or two biasing means are included to maintain the wheel support in an intermediate position and to absorb loads from the wheel.

Referring in particular to FIG. 1, there is shown a wheel suspension system constructed in accordance with the present invention. The system includes a pair of wheels mounted to a vehicle frame by respective wheel supports. The wheel supports are maintained in position by a leaf spring secured between the wheel support and the frame.

The two wheels are shown mounted on the same side of the vehicle, and of course similar wheels and suspension systems are used on the opposite side of the vehicle. It will further be appreciated that the present invention is equally useful when only one wheel is supported on each side of the vehicle. Also, the embodiment of FIG. 1 utilizes a single leaf spring, but could equally use separate biasing means serving the function of the spring.

The wheels are attached to cross members of the vehicle frame by wheel supports. The wheel supports attach to the cross member at a pair of pivot points, with one pivot point being inboard of the other pivot point. This lateral displacement of one pivot point relative to the other promotes the lateral stability of the wheel support. The frame cross members are held in position by a longitudinal member of the frame.

The wheel support connects to the frame cross member on a portion of the support that is largely horizontal and parallel to the roadway. The wheel support also has a section that is largely vertical relative to the roadway, to which the wheel, spring and shock absorber are attached. The spring and shock absorber attach to the vertical portion of the wheel support and also a vertical member of the frame. The upright portion of the wheel support is adaptable to springs such as the coil type, air bag type, or any other type of spring that creates a spring force when its attachment points are displaced relative to each other.

There is an additional spring that acts between the wheel support and the frame. This spring is of the leaf type, and attaches to both the horizontal portion of the wheel support and also to the frame. In a preferred embodiment, the attachment of the spring to the wheel support permits relative sliding of the spring within the wheel support in the fore and aft directions, but otherwise transmits spring forces created by the pivoting of the wheel support relative to the frame cross member. Alternative attachments of the leaf spring may be used, including an attachment by which one end of the spring is secured to a wheel support and the portion connected with the vehicle frame is allowed to slide relative thereto. Additionally, a spring configuration and attachment could be employed in which all attachments of the spring prevent or allow for sliding movement.

It is a feature of the leaf spring design that a biasing device is provided that fits generally within the typical vehicle frame. The leaf spring is located interior of the frame perimeter. It is also positioned below the upper surface of the frame, and thereby does not intrude into space available above the frame for the bed of the vehicle, i.e., the floor of a trailer or van. As shown in FIG. 1, the leaf spring is conveniently received through an opening in a frame member, thus accommodating the position of the leaf spring and minimizing the space required for the spring.

This leaf spring may be used simultaneously with adjacent wheels. The spring can attach, slidably or not, to two wheel supports and also be attached to a cross member of the frame in-between the two wheel supports.

The present invention provides a wheel suspension system useful in a variety of applications. The preferred embodiment is characterized by a wheel support with a largely vertical portion and a largely horizontal portion. The vertical portion is generally outboard of the vehicle frame. The horizontal portion is below or within much of the vehicle frame. Also, the shock absorber and springs of the preferred embodiment are similarly situated either outboard of much of the vehicle frame, or below or within much of the vehicle frame. This general arrangement permits maximum utilization of the area inboard and above most of the frame as useful cargo area. The wheel suspension system is useful, for example, for mounting the wheels of a trailer, or for the rear wheels of a front-wheel drive vehicle, such as a van.

Referring in particular to FIG. 1, there is depicted a preferred embodiment of the present invention in a perspective view. Frame outboard longitudinal member 2, shown with an "L" cross section, is a major structural member of the vehicle frame traversing fore and aft along one side of the vehicle and defining an outer perimeter of the frame. Attached to it are frame cross members 4 and 6, located fore and aft of each other, respectively. These cross members traverse the width of the vehicle, and typically terminate at the mirror image wheel suspension system on the other side of the vehicle frame. The frame cross members include frame vertical members 5 and 7, respectively, located outboard of longitudinal member 2.

Wheel suspension systems according to the present invention are mounted to the vehicle frame in the following manner. The wheel suspension systems include, for example, wheel supports 24 and 26. The supports carry stub axles or the like to support wheels thereon. In turn, the wheel supports are mounted to the vehicle frame for pivoting about a horizontal axis, thereby allowing the carried wheel to move up and down with respect to the vehicle frame.

Figure 3:
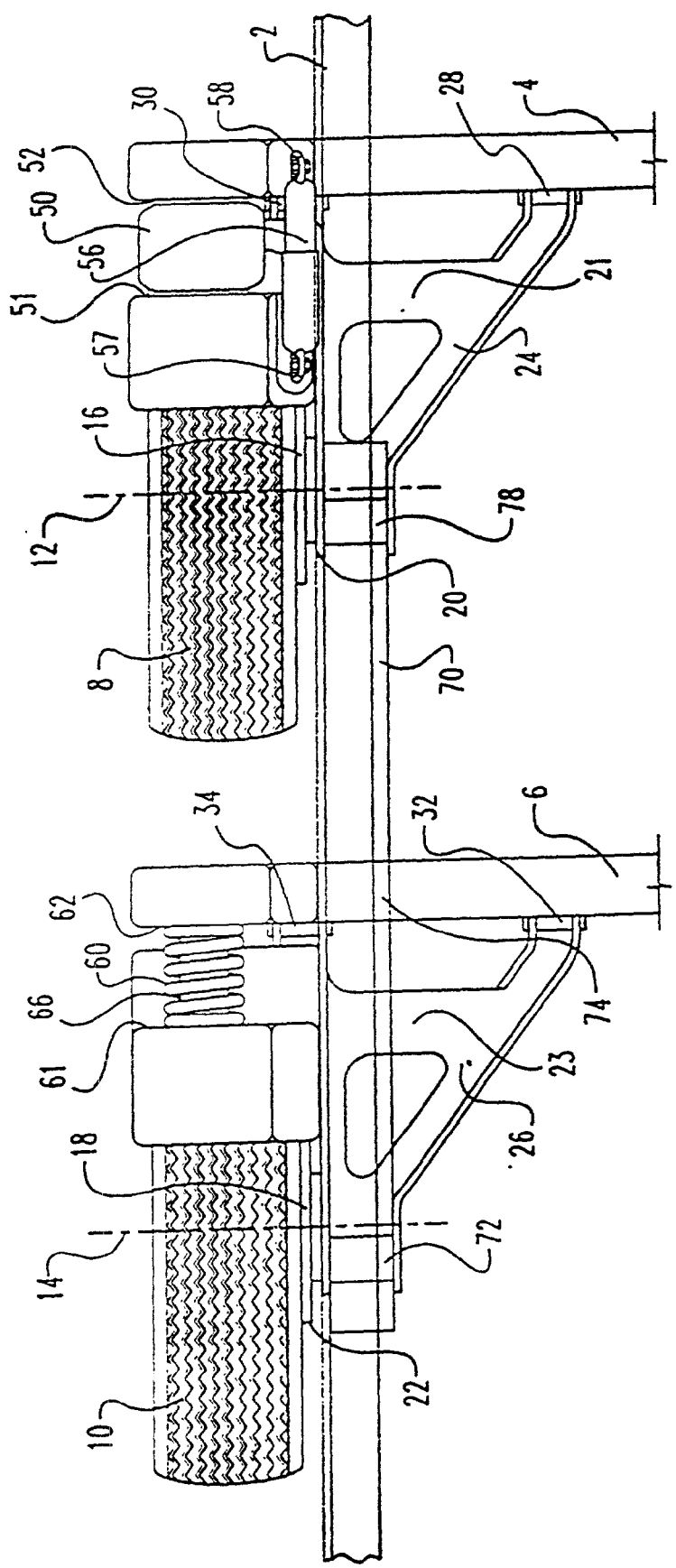
FIG. 3 is a top plan view of the wheel assemblies of FIG. 1.

Located just aft of the cross members are wheels 8 and 10. These wheels are attached to the wheel supports 24 and 26, respectively, and are free to rotate about respective hubs. For example, wheel 8 is mounted to hub 16 and is free to rotate about a horizontal axis 12 (FIG. 3). This hub is attached to upright portion 20 of wheel support 24.

The wheel support further includes means for attaching pivotally to the vehicle frame. The support preferably has a generally flat, horizontal portion 21 attached pivotally to frame cross member 4 at inboard pivotal attachment 28 and outboard pivotal attachment 30. The attachments preferably comprise a bracket secured to the frame, and a bolt and nut received through apertures in the bracket and the associated portion of the wheel support. These two pivotal attachments are aligned to provide for pivoting about a horizontal axis extending therethrough. The pivotal attachments are also displaced laterally to enhance the lateral stability of the wheel support, and therefore of the first wheel 8.

A similar method is used to attach wheel 10 to frame cross member 6. Hub 18, about which second wheel 10 is free to rotate, is attached to upright portion 22 of wheel support 26. This wheel support further includes a horizontal portion 23 which is pivotally attached to frame cross member 6 at pivotal attachments 32 and 34. The wheel support 26 is thereby pivotal with respect to the frame about a horizontal axis extending through the pivotal attachments 32 and 34, and the wheel 10 is rotatable about an axis 14 (FIG. 3) which extends parallel to the pivoting axis.

Figure 2:
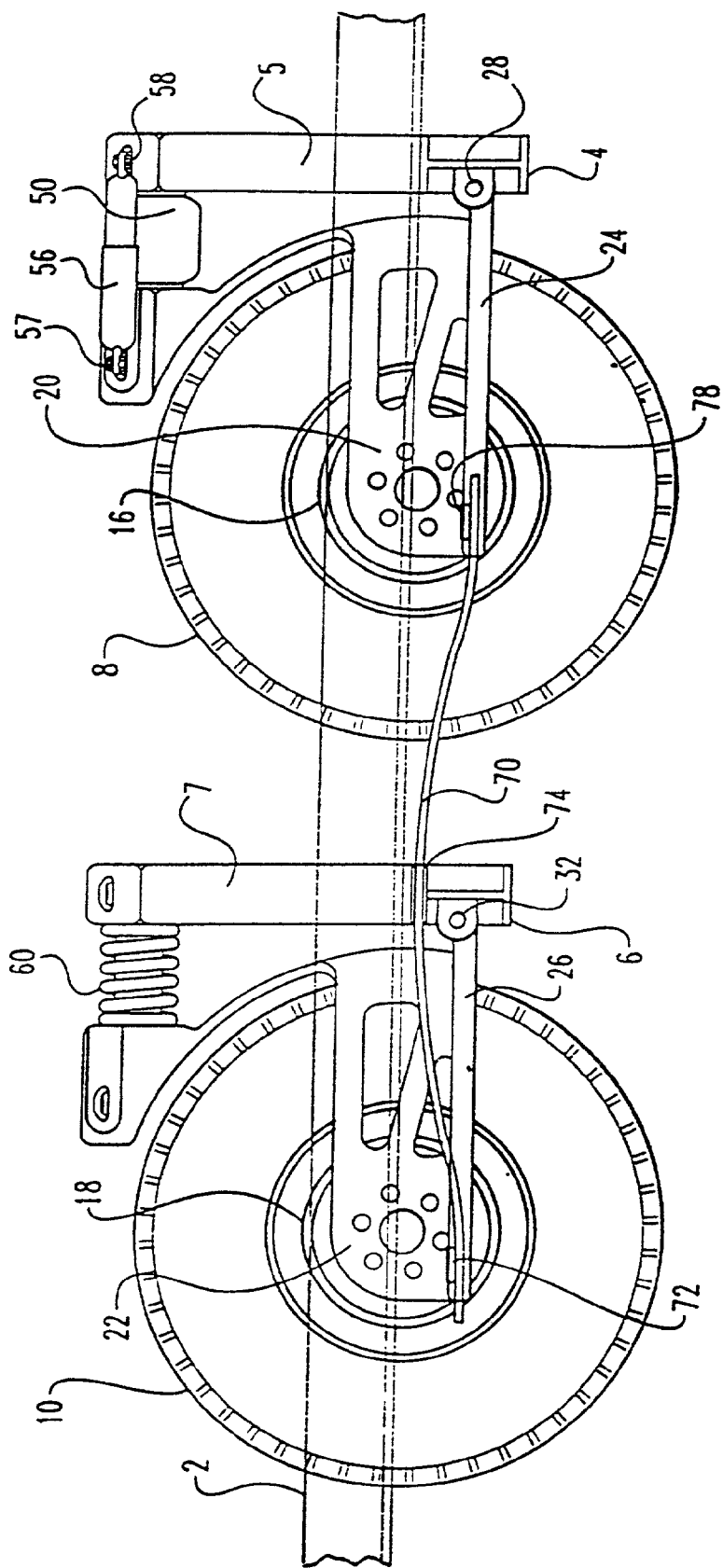
FIG. 2 is a side elevational view of the wheel assemblies and wheels of FIG. 1 mounted to a vehicle frame, viewing outwardly from inboard of the assemblies.

The upright portions of the wheel supports attach not only to the hubs, but also continue around the forward upper quadrant of the respective wheels and attach to spring and shock absorber assemblies. As shown in FIGS. 2 and 3, air spring (air bag) 50 and shock absorber 56 both connect support upright portion 20 to frame vertical member 5. Air spring 50 is attached at face 51 of first wheel support 24, and also at face 52 of first frame vertical member 5, in conventional fashion. Shock absorber 56 is mounted in a typical manner along side air spring 50, to first wheel support 24 at pivotal attachment 57, and to first frame vertical member 5 at pivotal attachment 58. As wheel support 24 rotates about pivots 28 and 30, the distance between upright portion 20 and vertical member 5 changes. The air bag and shock absorber accommodate this movement and cushion the pivoting of the wheel support.

An alternate to the spring and shock absorber arrangement utilizes a coil spring 60, as shown attached between wheel support 26 and frame vertical member 7 in conventional fashion. This spring attaches to front spring mount 62 of vertical member 7, and to rear spring mount 61 of wheel support 26. When utilizing a coil spring, the shock absorber could be attached alongside the spring, similar to the positioning shown for shock absorber 56, or it could be attached coaxially with the coil spring. Shock absorber 66 is shown mounted between frame vertical member 7 and wheel support 26 inside the coils of coil spring 60.

Additionally spring support for the wheel occurs in respect to the horizontal portions of the wheel support members. The horizontal portion is configured to be substantially flat and to underlie the vehicle frame. It is a feature of the present invention that such a compact wheel support is also supportable in a manner to further enhance the low profile of the overall suspension in comparison to the vehicle frame.

The wheel support engages a leaf spring 70 that is secured between the support and the vehicle frame. Each wheel support can be combined with an individual leaf spring. Alternatively, pairs of wheel supports can be accommodated by a single leaf spring, as shown in the drawings. In general, a wheel support includes a leaf spring receiving member for connection with an end of the leaf spring. Leaf spring 70 is shown having a forward portion received within a narrow slot comprising a leaf spring forward attachment 78. Leaf spring 70 continues in the aft direction, attaching to the frame by means of the frame attachment 74 through which it passes. Aft of that location the leaf spring includes a portion received within the rear attachment 72 defined by the wheel support 26.

Frame attachment 74 prevents lateral, longitudinal or vertical motion of the leaf spring at the point of attachment. However, pivoting is permitted about the lateral access established by frame attachment 74.

As wheel support 24 pivots about the axis defined by the attachments 28 and 30, forward attachment 78 of the wheel support moves in an arc relative to cross member 4. The distance between attachments 74 and 78 changes as the wheel support pivots. Attachment 78 permits sliding of leaf spring 70 in the fore and aft directions. Thus, a change in the fore/aft distance between attachments 74 and 78 does not result in the creation of spring load from spring 70. However, attachment 78 does resist any change in the vertical distance between attachments 78 and 74. Thus, rotation of the wheel support results in a change in spring load of spring 70 for the vertical component of movement.

Although the preferred embodiment depicts a single leaf spring attached near its center in providing support to wheel supports both in front and behind it, it is also possible to use a single leaf spring for each wheel support. For example, it would be possible to remove all portions of leaf spring 70 aft of attachment 74, and have the remainder support only first wheel support 24. Similarly, it would also be possible to remove all portions of leaf spring 70 forward of attachment 74, thus providing support only to second wheel support 26. Thus, leaf spring 70 could provide independent support for each wheel support, and the attachment of that independent leaf spring, could either be forward or aft of the respective wheel rotational axis.

Alternate embodiments of the present invention shown in FIGS. 4–18 also provide a wheel suspension system which has an extremely low profile. These alternate embodiments utilize a wheel support that is connected by a pair of pivotal attachments to the vehicle frame. The wheel support supports a wheel for rotation about a rotational axis. The rotational axis is located above the pivotal attachments and above the transverse frame structure which lowers the profile of the wheel support and permits additional cargo-carrying volume above the wheel support. The pivotal attachments are spaced apart laterally, thereby providing lateral support for the wheel. The wheel support is pivotal between a first, uppermost position and a second, lowermost position. The pivot axes of the two pivotal attachments are generally coincident, and are preferably arranged such that the wheel support pivots in a pitching direction relative to the vehicle.

Some of these embodiments incorporate a spring such as an airbag, leaf spring, or coil spring for biasing the wheel support to a position intermediate of the first and second positions. The spring is placed between a spring support of the vehicle frame and a spring support of the wheel support, and is placed beneath the rotational axis of the wheel and preferably inward of the wheel and tire. This placement of the spring helps increase useable cargo carrying volume for the vehicle and simplifies the structural support necessary to support the biasing loads by utilizing planar portions of the vehicle frame to support the spring. In addition, some embodiments orient the shock absorber in a generally horizontal position beneath the rotational axis of the wheel. This placement of the shock simplifies the structure of the wheel support and also the upright structures of the frame that houses the wheels. In some of those embodiments with horizontal shock absorbers placed below the wheel rotational axis, the biasing mechanism includes either an air bag, or one or more leaf springs coupled to both a wheel support and a cross member of the vehicle frame. In yet other embodiments, a leaf spring couples to adjacent wheel supports and to the vehicle frame.

Figure 4:
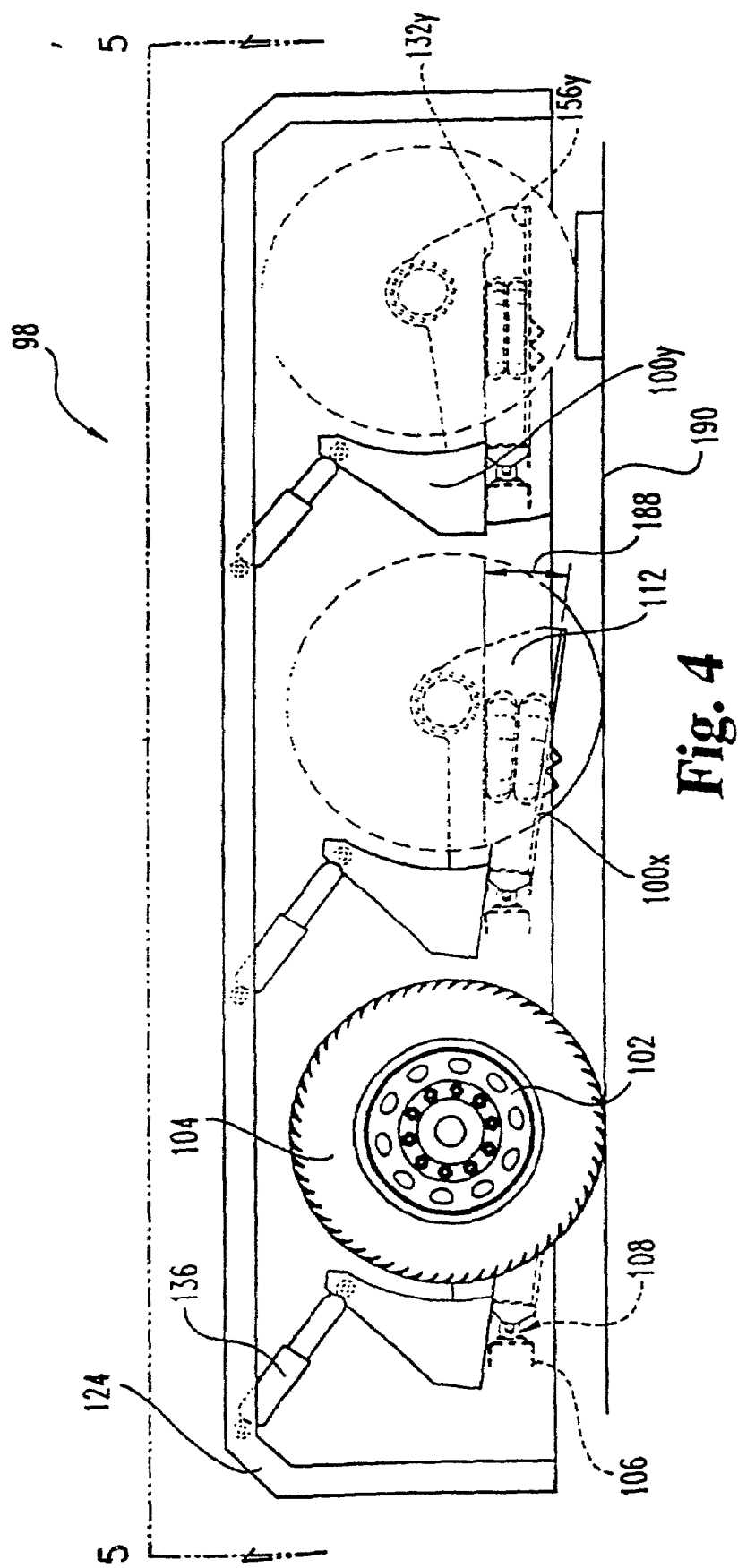
FIG. 4 is a side elevational view of a frame and suspension section of a vehicle according to another embodiment of the present invention.
Figure 5:
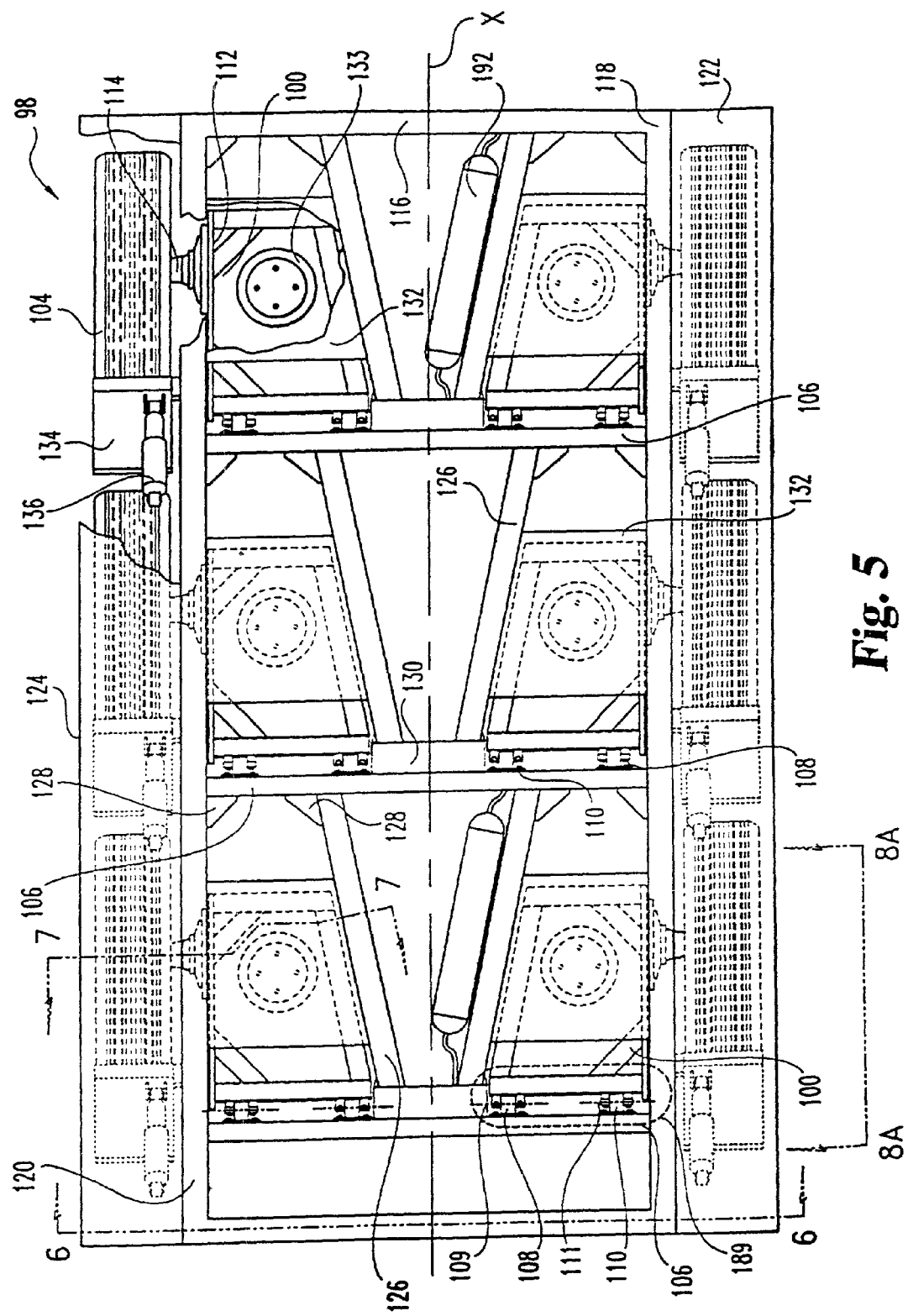
FIG. 5 is a top plan view of the vehicle section of FIG. 4 as taken along line 5—5 of FIG. 4.

Referring to FIGS. 4–6, a vehicle frame and suspension section 98 with a longitudinal axis X includes a wheel support 100 which rotatably supports a wheel 102 and tire 104. Wheel support 100 is pivotally attached to a cross member 106 of a transverse frame structure 116 by a first pivotal attachment 108 and a second pivotal attachment 110. Pivotal attachments 108 and 110 couple wheel support 100 to frame section 98, and are displaced laterally from one another so as to provide stability to wheel support 100. Pivotal attachments 108 and 110 are pivotal about first axis 109 and second axis 111, respectively. Pivotal axes 109 and 111 are preferably coincident with each other and are preferably oriented transverse to the direction of motion of the vehicle. Wheel support 100 is thus pivotally attached so as to permit pitching motion of wheel support 100. Wheel support 100 includes a generally upright portion 112 which supports a spindle, or stub axle, 114 about which wheel 102 rotates. The present invention contemplates spindles, hubs, stub axles, and other similar devices known to those of ordinary skill in the art as means for rotatably supporting a wheel on the wheel support.

Figure 12:
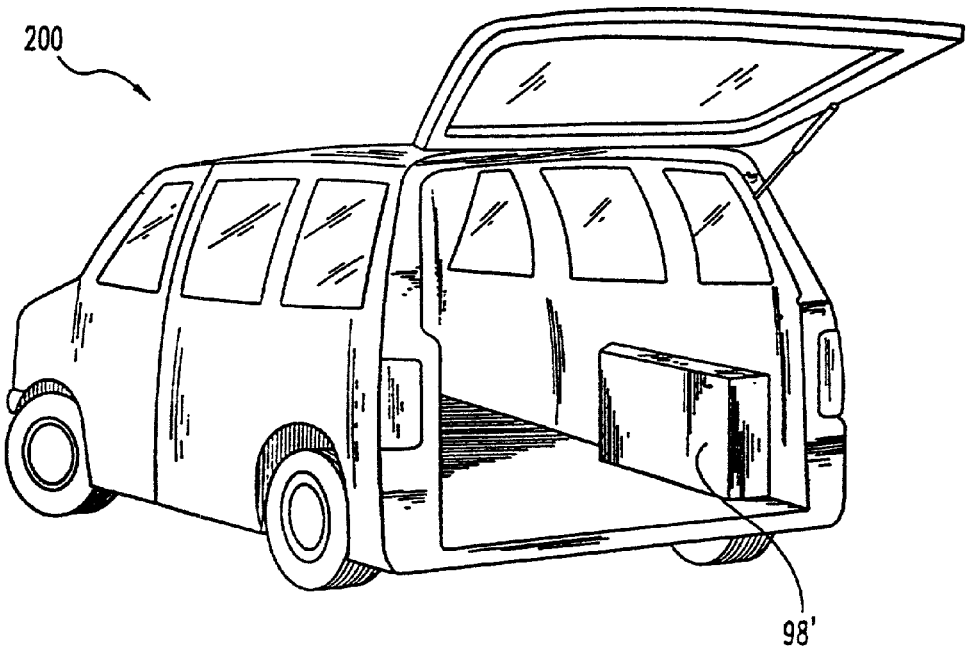
FIG. 12 is a perspective view of a two-wheeled embodiment of the present invention as used within a van.
Figure 13:
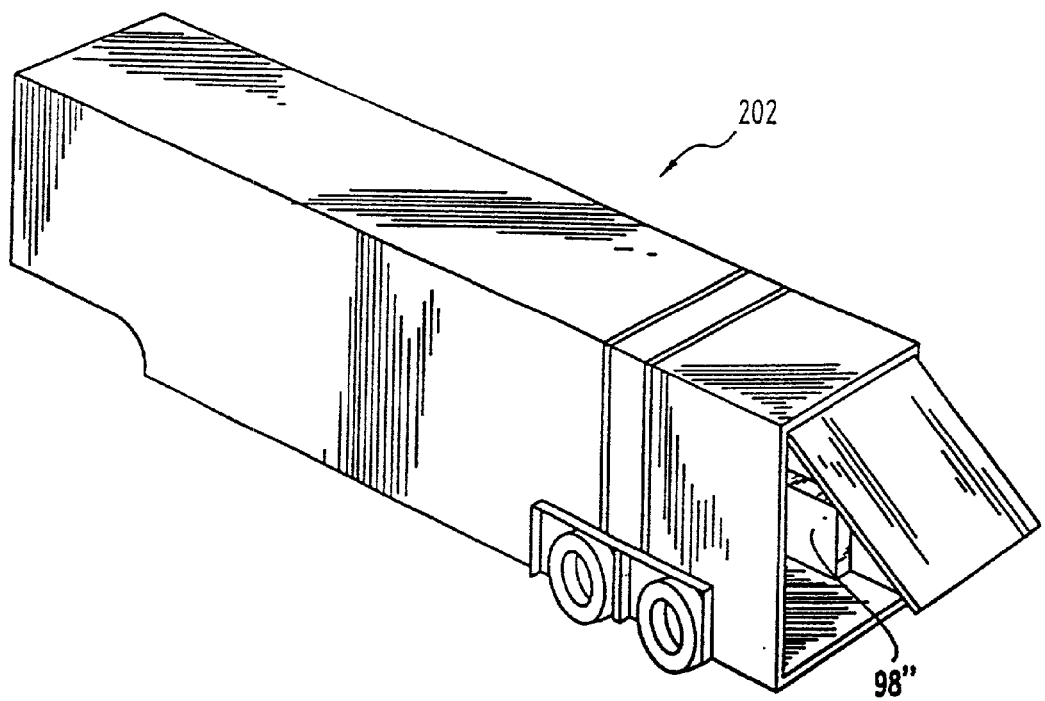
FIG. 13 is a perspective view of a four-wheeled embodiment of the present invention as used within a trailer.

Frame and suspension section 98 includes a row of tires 104 on either side of a transverse frame structure 116. Transverse frame structure 116 generally supports the vehicle cargo or utility section directly above it, as best seen in FIGS. 12 and 13. Referring again to FIGS. 5 and 6A, transverse frame structure 116 includes laterally disposed transverse frame sides 118 and 120. Attached to first transverse frame side 118 is a first upright frame structure 122. Attached to second transverse frame side 120 is a second upright frame structure 124. Frame structures 124, 116, and 122 form a generally U shape, as best seen in FIG. 6A, with transverse structure 116 being attached to the bottoms of the opposing upright frame structures 124 and 122. The top surface of transverse structure 116 preferably defines a plane that is located generally at or below the rotational axis of the wheels.

Wheels 102, shock absorbers 136, spindles 114, and upright portion 112 of wheel support 100 are disposed within upright structures 122 and 124. Spindle 114 supports one or more wheels 102 disposed within the upright frame structures. Spindle, or stub axle, 114 is not an axle that extends across transverse frame structure 116. By not having an axle spanning between upright frame structures 122 and 124, it is possible to have more cargo-carrying volume within the vehicle. Transverse frame structure 116 can thus be located below the rotational axes of the wheels 102, and cargo can be carried below the rotational axes also.

Transverse frame structure 116 preferably includes a cross member 106 for each pair of wheel supports 100. Cross members 106 are attached to longitudinal members 126 and sides 120 and 118 by corner reinforcements 128. In addition, longitudinal members 126 are also interconnected to members 106 preferably with reinforcements 130. Frame spring supports 132 of transverse frame structure 116 are generally planar portions in one embodiment which extend inward preferably from either first side 118 or second side 120 to longitudinal members 126. Preferably, spring supports 132 are laterally disposed inwardly from the wheel being supported. Portions of wheel supports 100 for supporting a spring are located below frame spring supports 132. Disposed between each wheel support 100 and frame spring support 132 in one embodiment is an air spring 133. Frame spring support 132 provides a support for air spring 133.

Although what has been shown and described is a specific arrangement of cross members and longitudinal members with reinforcements, the present invention also contemplates other arrangements for a transverse frame structure as would be known to one of ordinary skill in the art. Although welding is a preferable means of joining various members of frame and suspension section 98, the present invention also contemplates other joining and integrating methods, including fusion, bonding, brazing, bolting, casting, molding, and similar methods known in the art. Also, those of ordinary skill in the art will recognize that the cross members and longitudinal members can have a variety of cross sectional shapes, such as for C channels, I beams, L shapes, rectangular shapes, and others.

Wheel support 100 is pivotally attached to cross member 106 by a pair of pivotal supports 108 and 110. Supports 108 and 110 permit pivoting of wheel support 100 in a pitching direction about a pivotal axis that coincides with first axis 109 of support 108 and second axis 111 of support 110. Inboard pivotal attachment member 180 of support 100 is preferable releasably fastened to inner pivot 108*a* of support 108. Inner pivot 108*a* is coupled to outer support housing 108*c* through a rubber bushing 108*b*. Inner pivot 108*a* is able to pivot relative to housing 108*c* by twisting rubber bushings 108*b*. In a similar fashion, an inner pivot 110*a* of pivotal attachment member 110 is able to pivot relative to the housing 110*c* by twisting a rubber bushing 110*b*.

Figure 8A:
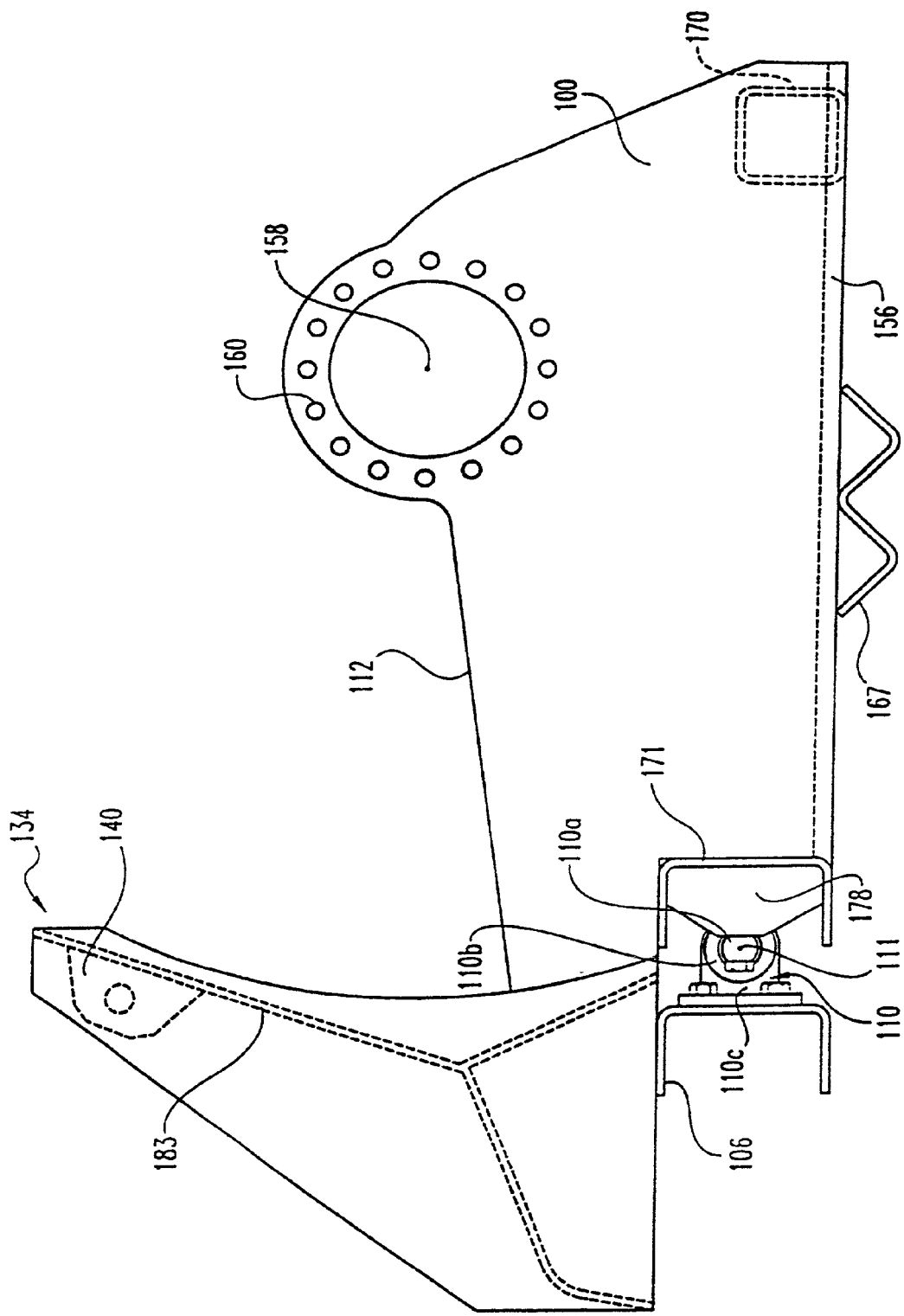
FIG. 8A is a side elevational view of a wheel support and a portion of the vehicle section of FIG. 5 as viewed along line 8A—8A of FIG. 5.

Wheel support 100 supports a wheel for rotation about a rotational axis 158, and is arranged and constructed such that there is usable cargo volume below the rotational axis of the wheel, as best seen in FIGS. 6A, 12, and 13. Horizontal portion 168 of wheel support 100 lies generally below the volume useful for cargo. Pivotal attachments 108 and 110, which pivotally support wheel support 100, have pivot axes 109 and 111, respectively, that are located below rotational axis 158. In one embodiment of the present invention, pivot axes 109 and 111 are preferably parallel to rotational axis 158, as best seen in FIG. 8A.

Wheel support 100 pivots about pivot axis 109 and 111 in a pitching direction relative to the vehicle, and is pivotal between an uppermost position and a lowermost position. Wheel support 100 is biased to a position between the uppermost and lowermost positions, preferably by air spring 133. However, the present invention also contemplates the use of other means for biasing the wheel support, including by way of example one or more coil springs or one or more leaf springs. The one or more springs bias wheel support 100 to a position between the uppermost and lowermost positions by urging spring support 156 of wheel support 100 apart from frame spring support 132 of the vehicle frame.

In one embodiment, spring supports 156 and 132 generally face each other and are part of a structural load path for the spring forces from spring 133. Preferably, spring supports 156 and 132 are disposed laterally inward from the wheel being supported, although the present invention also contemplates spring supports disposed laterally inward from the tire being supported. Spring supports 156 and 132 are preferably generally planar in those embodiments utilizing air springs with planar attachment surfaces. However, the present invention also contemplates those embodiments in which spring supports 156 and 132 are constructed and arranged to compatibly support other types springs, including, for example, leaf springs and coil springs.

Figure 7:
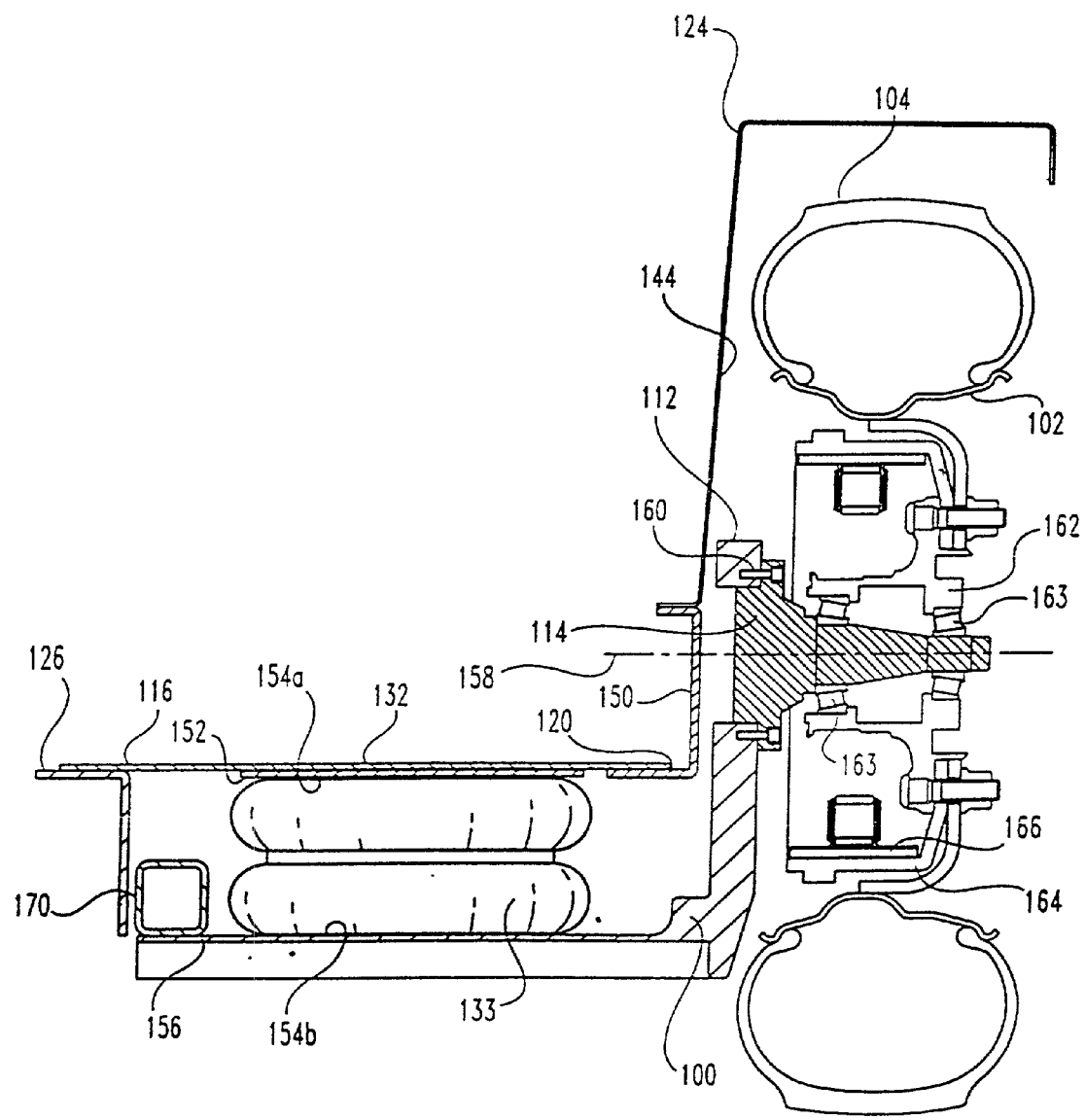
FIG. 7 is a partial cross-sectional view of a portion of the vehicle section of FIG. 5 as taken along the line 7—7 of FIG. 5.

Referring to FIG. 7, upright frame 124 is joined to transverse frame structure 116 along second side 120 of frame structure 116. In one embodiment, vertical wall section 144 of upright structure 124 is angled outwardly about 4 degrees from the vertical, so as to permit additional cargo space. Wall section 144 is preferably fused to a longitudinal member 150 in the shape of a C channel that extends along side 120.

Air spring 133 is preferably fastened to attachment plate 152 by fasteners (not shown) along upper contact face 154*a* of air spring 133, contact face 154*a* being one end of air spring 133. Attachment plate 152 is preferably fastened to spring support 132 of frame section 116 by fasteners (not shown). One side of spring support 132 is preferably welded to a longitudinal member 126, and the other side of spring support 132 is preferably welded to longitudinal member 150, the present invention contemplating other means known to those of ordinary skill in the art for coupling the spring support to the transverse fame section.

Air spring 133 is preferably fastened by fasteners (not shown) to spring support 156 of wheel support 100 along a lower contact face 154*b* of air spring 133, contact face 154*b* being the other end of air spring 133, this end of air spring 133 being between the second spring support 156 and the rotational axis of the wheel. Thus, upper contact face 154*a* is coupled to and in contact with a first spring support 132 and lower contact face 154*b* is coupled to and in contact with a second spring support 156.

Although it is preferable to couple lower face 154*b* of the air spring with fasteners to attachment member 156, coupling is not necessary provided lower face 154*b* is in contact with spring support 156. Attachment members 156 and 132 support biasing loads from spring 133.

Upright portion 112 of wheel support 100 supports spindle 114. Spindle 114 is attached at a fastener attachment pattern 160 to upright portion 112. Spindle 114 defines a rotational axis 158 that is generally horizontal and preferably parallel to the pivotal axis of wheel support 100. However, the present invention also contemplates those embodiments in which the rotational axis of the wheel and the pivotal axis of the wheel support are not parallel. A hub 162 is mounted to spindle 114 by a pair of bearings 163. A brake drum 164 is fastened to hub 162, and provides a braking surface for a pair of brake shoes 166.

Figure 8B:
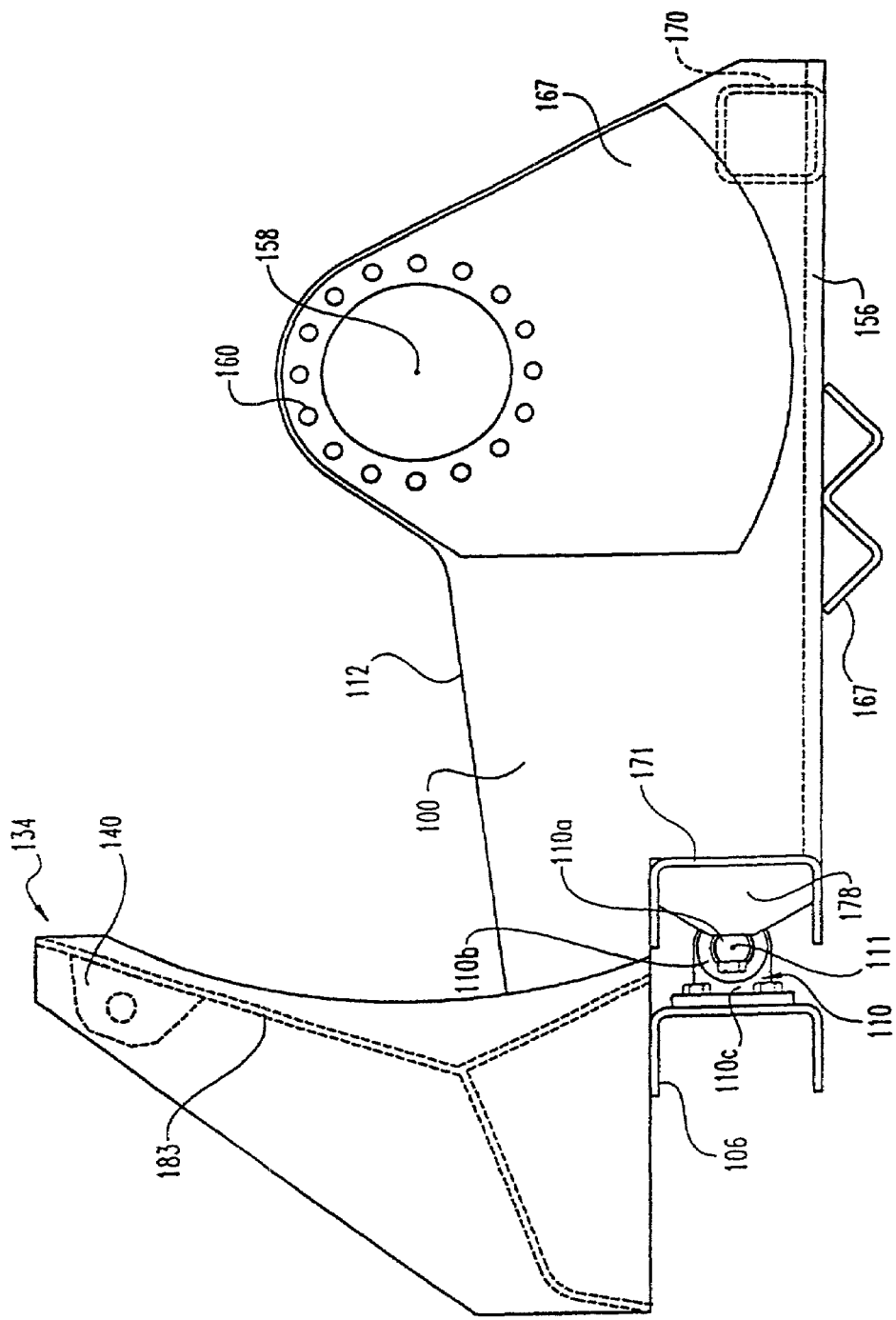
FIG. 8B is a side elevational view of the wheel support and portion of the vehicle section of FIG. 8A including a reinforcing doubler.

Upright portion 112 of wheel support 100 in one embodiment includes a support structure 134. A shock absorber 136 is pivotally coupled to support structure 134 by a coupling end 138 that attaches to ears 140 of support structure 134. Attachment ears 140 for coupling to shock absorbers 136 are attached to support plate structure 183 of support structure 134 as best seen in FIGS. 8A and 8B. As seen in FIGS. 6A–7, the other coupling end 142 of shock absorber 136 is pivotally coupled within upright frame structures 124 and 122. Shock absorber 136 and support structure 134 are located forward of the rotational axis of wheel 102, and above the pivot axis of wheel support 100 in some embodiments.

Figure 9:
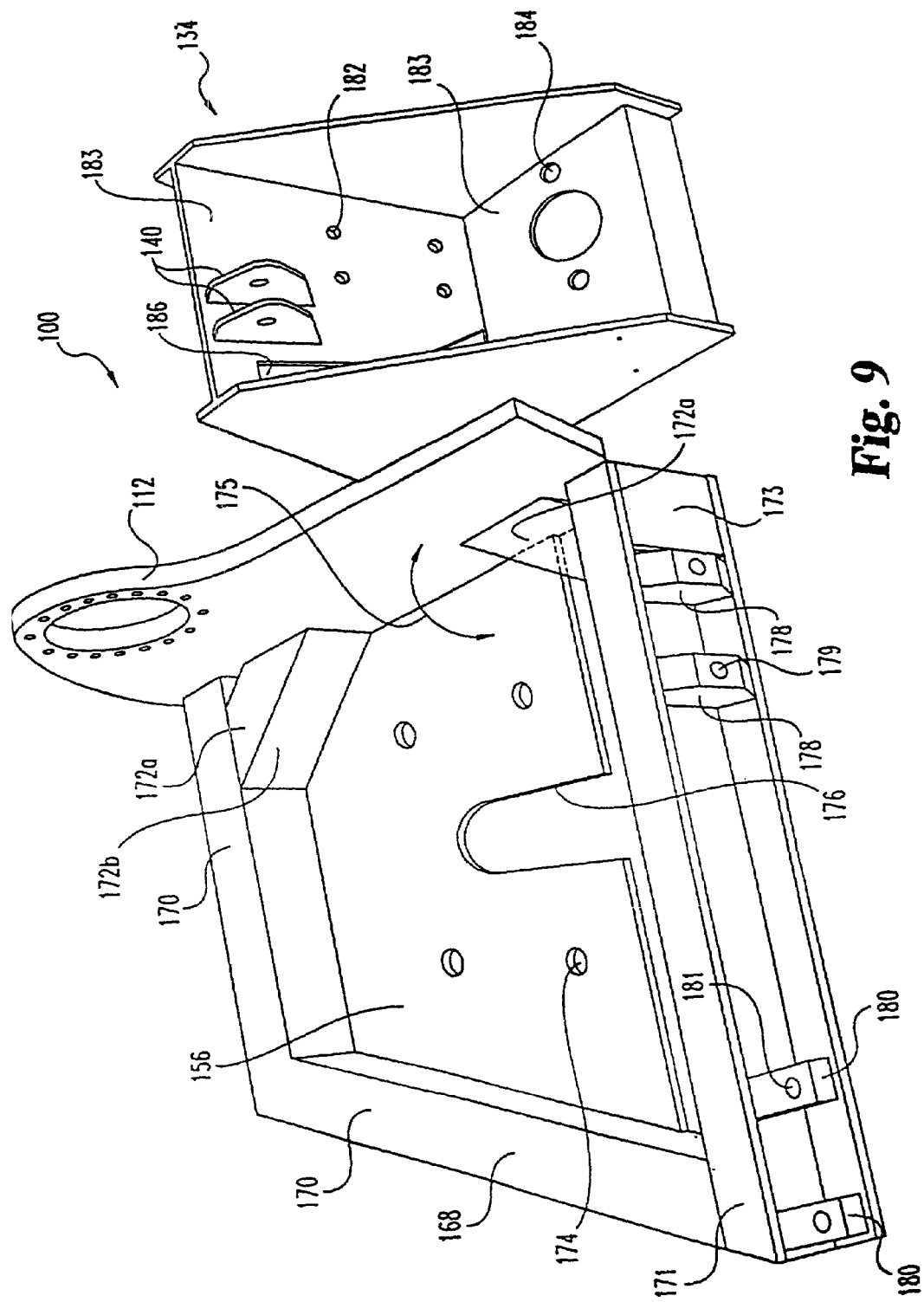
FIG. 9 is a perspective view of a wheel support according to one embodiment of the present invention.

Support structure 134 preferably provides features for attachment of various components, including braking system components (not shown). As best seen in FIG. 9, support 134 includes support plates 183 which incorporate fastening patterns 182 and 184 for support and attachment of various components, including braking system components (not shown). Top support plate 183 also defines a slot 186 through which brake system linkages (not shown) pass onto the braking system components for wheel 102.

Referring to FIG. 8A, a side elevational view of wheel support 100 and a portion of frame 116 is shown. Some embodiments of wheel support 100 include a stiffening member 167 generally in the shape of a "W" to provide stiffness and strength along spring support 156 and to better distribute loads from air spring 133 into wheel support 100. However, the present invention also contemplates those wheel supports 100 in which alternative structure is used to provide sufficient support for spring biasing loads imposed upon spring support 156, including by way of example only, increased thickness for spring support 156, stiffening ribs attached or incorporated into spring support 156, V-shaped and I-shaped structural members, and various other equivalents known to those of ordinary skill in the art.

FIG. 8B depicts a side elevational view of an embodiment of wheel support 100 capable of supporting two wheels. A doubler plate 167 is installed on upright section 112 between section 112 and wheel spindle 114. Doubler plate 167 provides an improved distribution of load from spindle 114 within upright section 112. In one embodiment of the present invention, upright section 112 is constructed from A-36 steel plate of about one and one quarter inch thickness. Doubler plate 167 is constructed from A-36 steel plate of approximately one half inch thickness. In other embodiments the doubler may not be needed, upright portion 112 being fabricated from thicker material or higher strength material, incorporating reinforcing ribs, or otherwise suitably strengthened.

FIG. 9 is a perspective view of a wheel support according to one embodiment of the present invention. Wheel support 100 includes a generally horizontal portion 168 attached to upright portion 112. Horizontal portion 168 includes spring support 156 for supporting air spring 133. In one embodiment, spring support 156 includes a fastener pattern 174 for fastening air spring 133 to wheel support 100. However, in some embodiments of the present invention spring support 156 is not fastened to air spring 133. Horizontal portion 168 also preferably includes a slot 176 or other means to provide clearance for an air line for pressurizing and depressurizing air spring 133. In some embodiments, the center of air spring 133 is located between the rotational axis of the wheel and the pivotal axis of the wheel support, as best seen in FIG. 4.

Referring again to FIG. 9, a reinforcing member 170, which may include one or more distinct pieces, has a generally square cross-section in one embodiment and supports some of the edges of spring support 156. A reinforcing member 171 with a C-shaped cross-section is attached to one end of reinforcement member 170 and also to upright portion 112. Reinforcement member 171 includes a pair of inboard pivotal attachment members 180 and a pair of outboard pivotal attachment members 178. Inboard attachment members 180 define holes 181 for coupling to second pivotal attachment 108. Outboard pivotal attachment members 178 preferably define threaded holes 179 for fastening to first pivotal attachment 110. In one embodiment, holes 179 are oriented about ninety degrees from holes 181.

Multiple corner reinforcements 172a and 172b attach reinforcement member 170 to upright portion 112 in one corner. A corner reinforcement 172a similarly attaches member 171 to upright portion 112. A reinforcement plate 173 is fused to one end of reinforcement member 171 near upright portion 112 so as to better distribute stresses within support 100. Plate member 173 and corner reinforcement 172a enhance the stiffness and strength of the load path from spindle 114 to outboard pivotal attachment members 180. In one embodiment of the present invention, the included angle 175 from upright section 112 to spring support 156 is about ninety and three fourths degrees, so as to provide about three fourths of a degree of positive camber when not loaded by the weight of the vehicle. Although a specific arrangement of reinforcement members has been shown and described for wheel support 100, those of ordinary skill in the art will recognize equivalent methods of providing sufficient strength and stiffness.

Figure 10A:
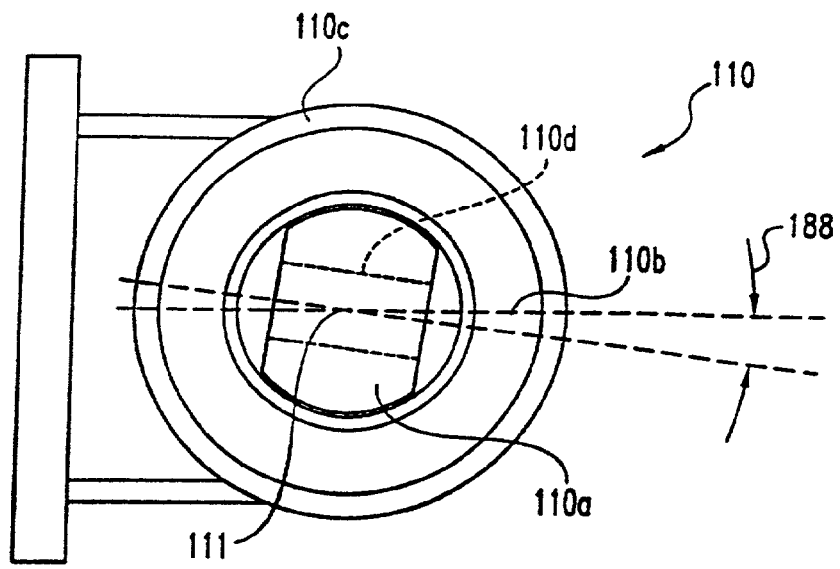
FIG. 10A is a side elevational view of a pivotal attachment according to one embodiment of the present invention.
Figure 10B:
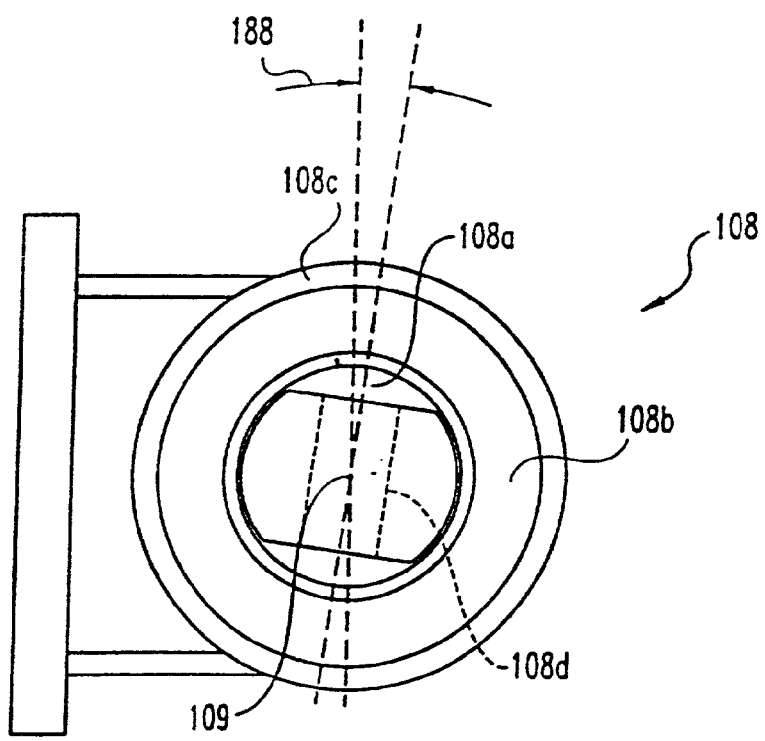
FIG. 10B is a side elevational view of another pivotal attachment according to one embodiment of the present invention.

FIGS. 10A and 10B depict side elevational views of pivotal attachments according to one embodiment of the present invention. Pivotal attachments 108 and 110 include pivotal inner support members 108a and 110a, respectively, that are supported from stationary outer members 108c and 110c, respectively, by elastomeric bushings 108b and 110b, respectively. Inner supports 108a and 110a are able to pivot about pivot axes 109 and 111, respectively. Inner pivotal member 108a includes a pair of through holes 108d for coupling attachment assembly 108 by fasteners to attachment members 180 of wheel support 100. In one embodiment fastener holes 108d are oriented such that their centerlines are inclined from the horizontal as indicated by angle 188. Fastener holes 110d of pivotal inner member 110a, likewise used for fastening pivotal attachment 110 to attachment members 178 of support 100, are inclined from vertical in one embodiment as indicated by angle 188. In one embodiment of the present invention angle 188 is about seven and one half degrees, and may be as large as about fifteen degrees. The offset angle 188 of the pivotal attachments preferably corresponds to a similar offset angle for wheel support 100', as seen in FIG. 4, as will be discussed later. In other embodiments, angle 188 is about zero degrees.

Although what has been shown and described are pivotal attachment assemblies in which an inner pivoting member is elastomerically mounted to an outer housing, the present invention contemplates other types of pivotal attachment assemblies. By way of example only, the present invention also contemplates pivotal attachment assemblies in which a pivotal inner member is coupled by a bearing, such as a ball bearing or plane bearing, to an outer casing. By further way of example, the outer casing may be a cast, molded, adhered, welded, or otherwise fixedly attached member to the transverse frame section 116. By further way of example, the inner pivoting member may be cast, molded, adhered, welded, or otherwise fixedly attached or otherwise made integral with wheel support 100, thus eliminating the need for attachment members such as members 180 and 178. Yet other varieties of pivotal attachments are known to those of ordinary skill on the art. It is preferable that the pivotal attachments include a feature that permits spacing apart of the pivotal attachment from either frame section 116 or wheel support 110 so as to permit adjustment of wheel camber and toe-in. One embodiment of the present invention which includes such adjustment features will now be described.

Figure 11:
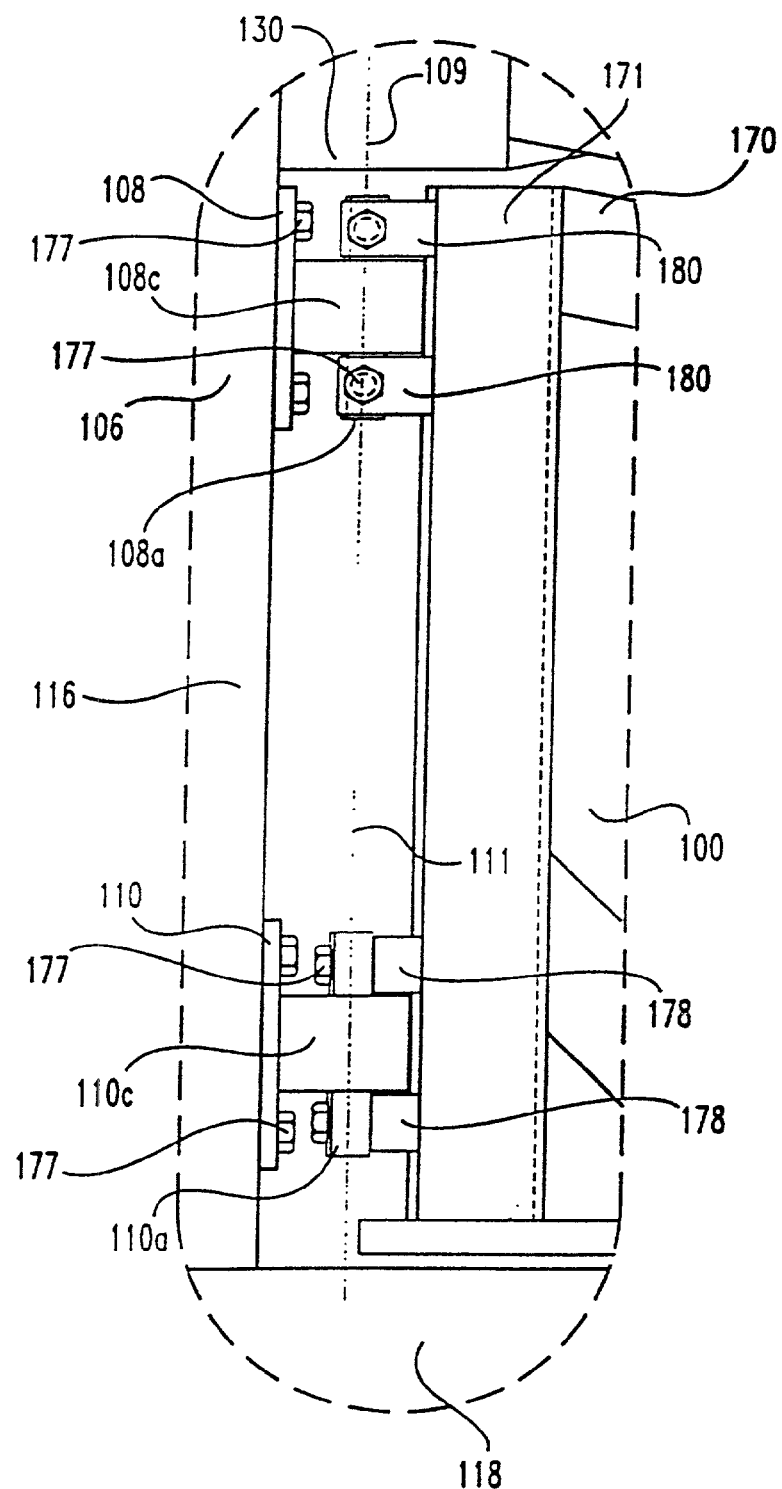
FIG. 11 is an enlargement of the area within dotted oval 189 of FIG. 5.

Pivotal attachments 108 and 110 are preferably attached by readily removable fasteners 177 to cross member 106, as seen in FIG. 11. Pivotal attachment 110 supports the outboard side of wheel support 100 via outboard pivotal attachment members 178. Pivotal attachment 108 supports the inboard side of wheel support 100 through L-shaped inboard pivotal attachment members 180. Pivotal attachment members 178 and 180 are preferably welded or otherwise attached, cast, or molded within channel member 171 of wheel support 100, as best seen in FIGS. 8A and 9.

Referring again to FIG. 11, pivotal attachment 110 is capable of being spaced apart from cross member 106 of frame 116 so as to move pivot axis 111 in a longitudinal direction relative to the vehicle. This spacing may be accomplished, for example, by insertion of a shim between pivotal attachment 110 and cross member 106. In addition, wheel support 100 may be spaced apart from pivotal attachment 110 by insertion of shims between attachment members 180 and pivotal inner member 110a. By spacing apart attachment assembly 110 from frame 116, and/or spacing apart wheel support 100 from attachment assembly 110a, the toe-in of the supported wheel 102 can be adjusted.

Second pivotal attachment 108 is similarly coupled to cross member 106 of frame 116, and may be spaced apart from frame 116 so as to move pivot axis 109 longitudinally relative to the vehicle. Thus spacing apart pivotal attachment 108 from frame 116 adjusts the toe-in of the wheel 102 supported by support 100. In one embodiment the present invention contemplates the use of shims for adjusting both camber and toe-in, including shims fabricated from sheet or plate material, and also shims in which the shim faces are not parallel, but are angled in proportion to the desired toe-in or camber angle. Further, the pivotal attachments are releaseably coupled to the transverse frame section and also to the wheel support so that the shimming may be performed easily and repeatedly, as desired, without the need, for example, to remove welded attachments.

Fastener attachment holes 108d are positioned about ninety degrees relative to fastener holes 110d. Also, fastener holes 181 of inboard attachment members 180 are oriented about ninety degrees relative to fastener holes 179 of outboard attachment members 178, as best seen in FIG. 9. As a result, spacing apart inner pivotal member 108a from attachment members 180 moves wheel support 100 in a different direction than that achieved by shimming between inner member 110a and attachment members 178. Spacing apart inner pivot 108a from attachment members 180 adjusts the camber of the wheel 102 supported by wheel support 100.

Although what has been described is an embodiment which includes a pivotal attachment 108 which can be shimmed or otherwise manipulated so as to adjust camber or toe-in and another pivotal attachment 110 which can be manipulated to adjust toe-in, the present invention also contemplates those embodiments in which there are two pivotal attachments each permitting adjustment of camber or toe-in or two pivotal attachments each permitting adjustment of only camber or toe-in. Further the present invention also contemplates embodiments in which neither pivotal attachment permits adjustment of either camber or toe-in, or in which only one pivotal attachment permits adjustment of either camber or toe-in.

In one embodiment of the present invention, spring support 156 of wheel support 100 is preferably inclined from the horizontal for improved airbag characteristics, as indicated by angle 188 of FIG. 4. Wheel support 100x is shown in the inclined position during operation of frame and suspension section 98 on a level surface. The tire rotatably supported from wheel support 100y is shown at full jounce over an irregularity in the roadway such that wheel support 100y has pitched up and second spring support 156y is generally parallel to first spring support 132y and also to roadway 190.

In this embodiment pivotal attachments 108 and 110 include inner pivoting members 108a and 110a, respectively, which have an included angle 188, as best seen in FIGS. 10A and 10B. By incorporating an offset angle 188 into pivotal attachments 108 and 110 that is the same as the offset angle 188 of wheel support 100', stress within elastomeric bushing 108b and 110b is kept to a minimum during normal operation. Other embodiments of pivotal attachments incorporating by way of example plane, roller, or ball bearings in place of the elastomeric bushings would not need an offset angle 188. The present invention also contemplates pivotal attachments 110 and 108 in which the offset angle of the pivotal attachments is different than the offset angle of the wheel support relative to the roadway during normal operation, with the difference in the pivotal attachment offset angle and the wheel support offset angle being provided by angled attachment faces to attachment members 180 and 178.

One embodiment of the present invention contemplates an angle 188 of about 7.5 degrees between first spring support 132 and second spring support 156 during typical operation of the suspension system on a level roadway 190. Having an included angle 188 of about 7.5 degrees provides an acceptable range of air spring characteristics and internal air pressure in one embodiment, and permits placement of certain types of air springs below the cargo compartment of the vehicle. However, the present invention contemplates a range for angle 188 from about 0 degrees to about 15 degrees. For example, a cast wheel support with different dimensions provides equally acceptable air spring characteristics and internal pressure with an angle 188 of about zero degrees, such that faces 154a and 154b of air spring 133 are generally parallel during operation of the suspension on a level road.

In another embodiment of the present invention, there is a suspension control system for maintaining the ride height of the vehicle as the weight of the vehicle changes, and also for changing the air pressure in the air spring in response to pivoting of the wheel support. A linkage (not shown) attached to both wheel support 100 and the upright frame structure provides a control input to a pneumatic valve (not shown), such as a Neway Model 9005-4007 leveling valve. In response to movement of the linkage, the valve places air spring 133 in fluid communication with either ambient air or with a source of air pressure such as air tank 192, which is provided pressurized air from an air compressor. Movement of wheel support 100 relative to the vehicle frame causes the valve to increase or decrease the air pressure in air spring 133. The control system adjusts the air pressure within air spring 133 so as to maintain the wheel support at a predetermined angle relative to the vehicle frame, and also to maintain a predetermined orientation of the vehicle.

Although FIGS. 4, 5 and 6A depict an embodiment of the present invention which includes six wheel supports 100 supporting six wheels 102, some embodiments of the present invention include a single wheel support 100 supporting a single wheel 102. Other embodiments of the present invention, such as frame and suspension section 98' shown as part of a van vehicle 200 in FIG. 12, include two wheel supports 100 each supporting a single wheel 102. In yet another embodiment of the present invention shown in FIG. 13, a frame and suspension section 98" including four wheel supports 100 supporting four wheels 102 is shown in a trailer section of a vehicle 202. Further, some other embodiments of the present invention include a wheel support 100 that support a pair of wheels 102 to maintain adequate load margin in the tires when supporting a heavy cargo load.

Figure 6B:
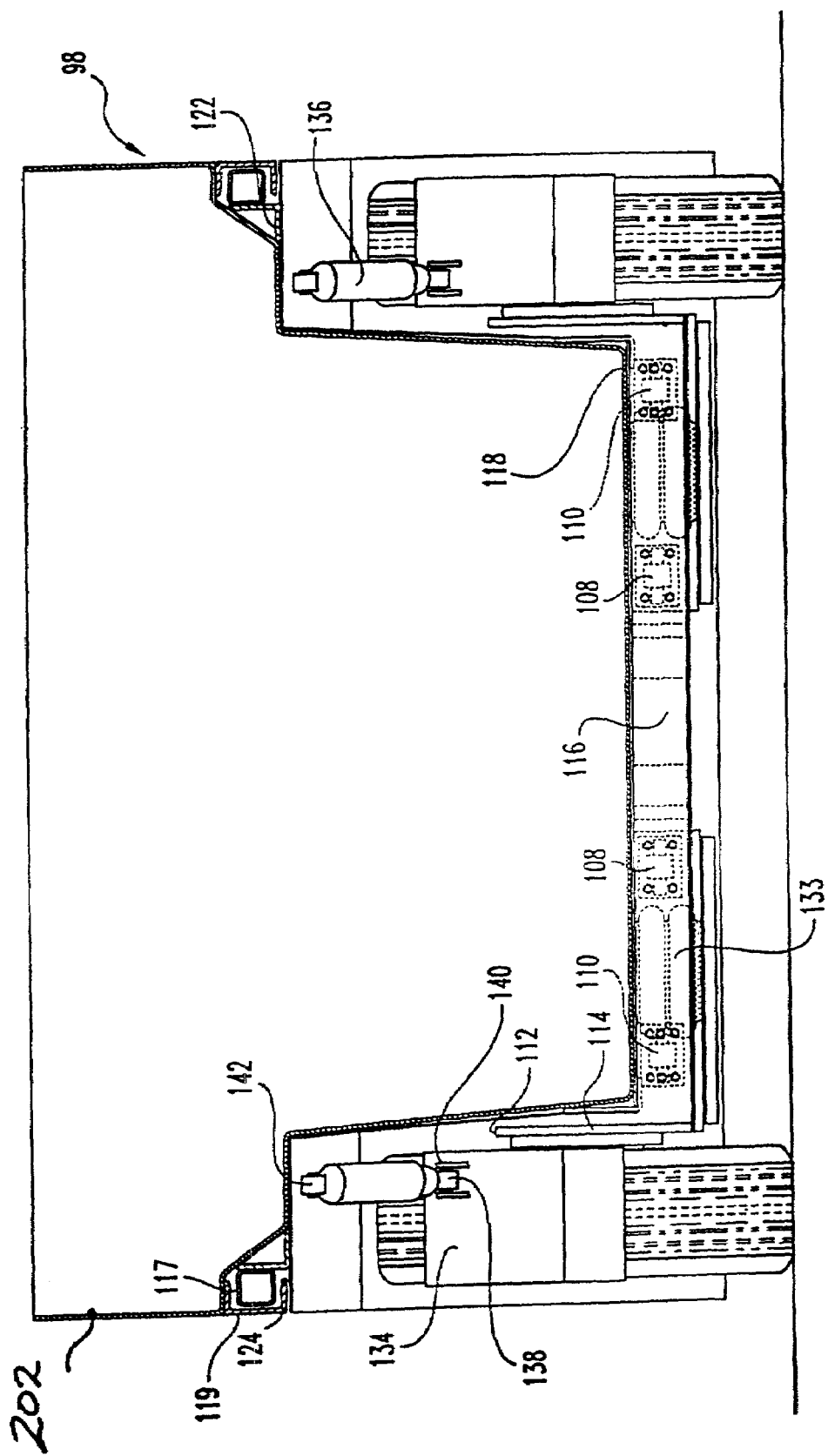
FIG. 6B shows the vehicle section of FIG. 6A supporting a cargo compartment.

The frame and suspension sections shown herein may be built modularly and slidingly coupled to a cargo compartment. As shown in FIG. 6B, some embodiments of frame and suspension section 98 include a pair of rails 117 coupled to upright frame structures 122 and 124. These rails 117 slidingly engage a pair of receiving C-channels 119 arranged on the underside of the trailer section of vehicle 202. After the sliding insertion, the floor of the trailer section is below the rotational axes of the wheels, the C-channel of longitudinal member 150 being replaced with an L-angle longitudinal member. The coupling of rails 117 and C-channels 119 limits lateral and vertical motion of the frame and suspension section relative to the cargo compartment. A locking arrangement (not shown) such as a plurality of locking shear pins inserted through matched holes limits fore and aft relative movement. Although a particular arrangement has been shown for coupling a frame and suspension section of the present invention to a trailer, those of ordinary skill in the art will recognize other arrangements, including those in which the frame and suspension section and trailer are not slidingly coupled.

Figure 14:
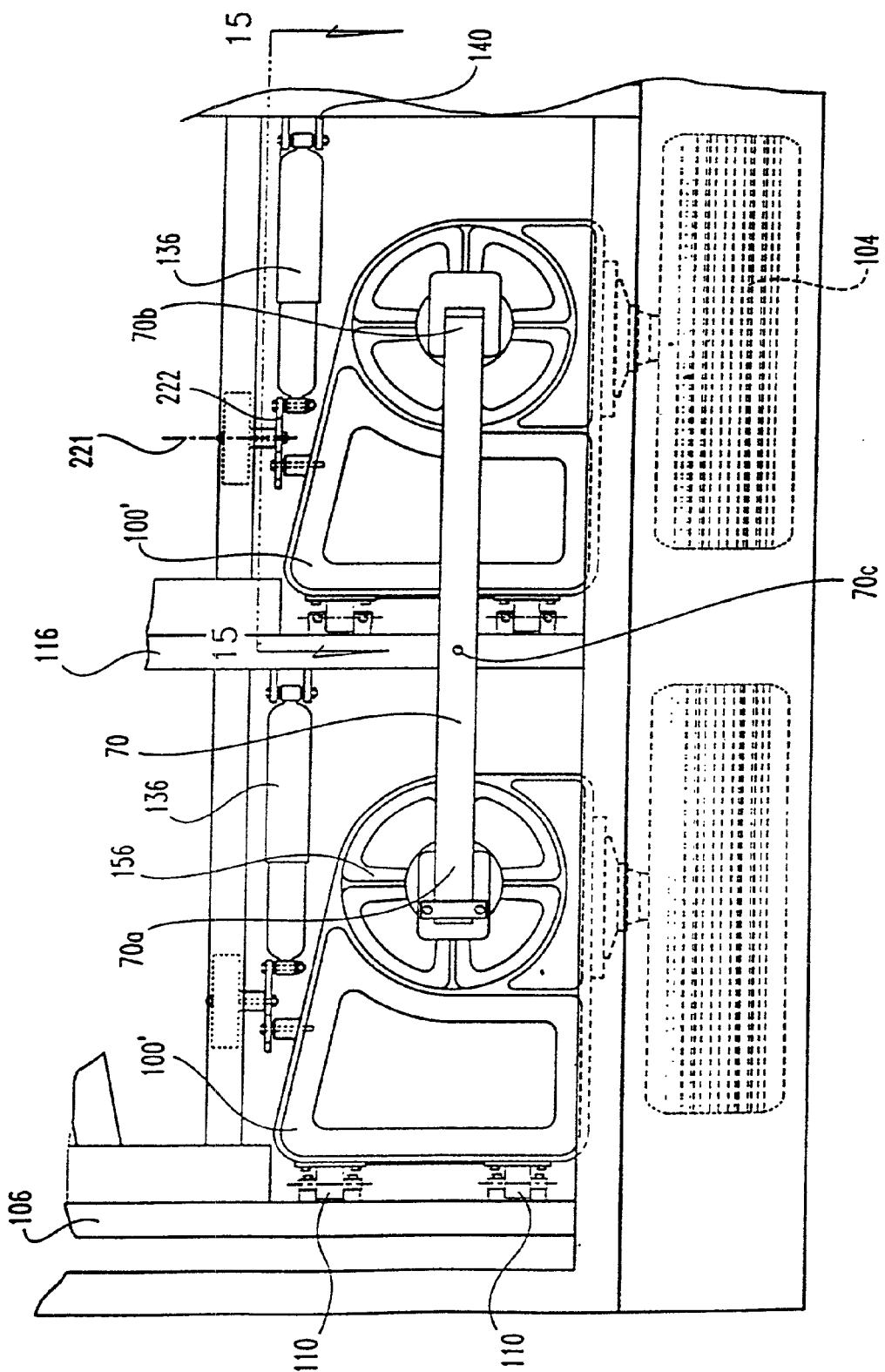
FIG. 14 is a top plan view of a vehicle section in accordance with another embodiment of the present invention.
Figure 15:
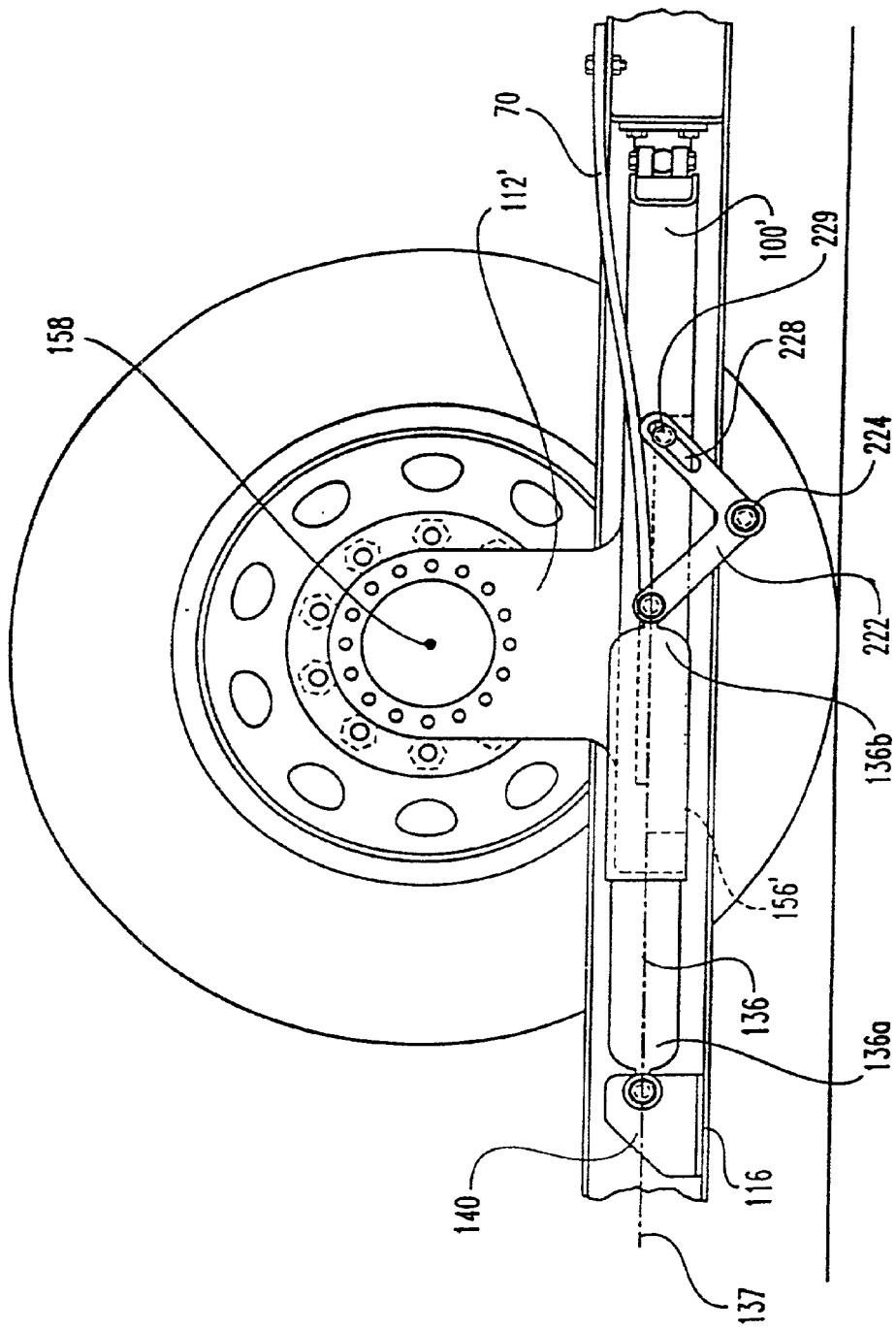
FIG. 15 is a partial side view of the vehicle section of FIG. 14 as taken along line 15—15 of FIG. 14.
Figure 16:
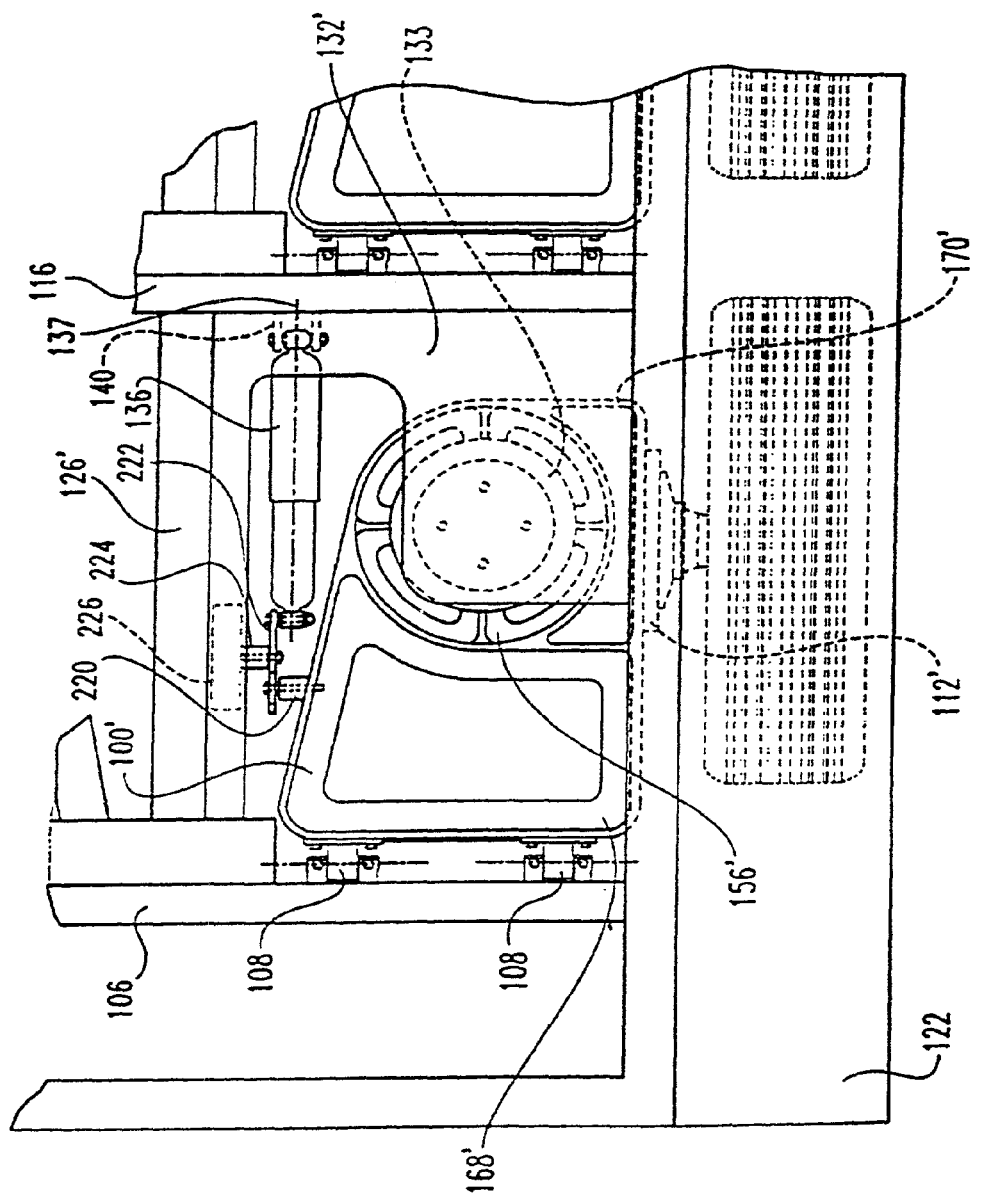
FIG. 16 is a top plan view of a vehicle section in accordance with another embodiment of the present invention.

FIGS. 14–16 depict another embodiment of the present invention in which the shock absorber is located below the rotational axis of the wheel. A wheel support 100' includes a horizontal portion 168' coupled to an upright section 112'. Horizontal portion 168' includes a spring support 156' receiving and coupling to a spring which urges wheel support 100 away from transverse frame structure 116. The use of (') and (") indicate elements of the invention substantially the same as previously described for that element, except for the changes as noted.

FIGS. 14–15 depict an embodiment in which a leaf spring 70 urges a pair of wheel supports 100' from transverse frame structure 116. Leaf spring 70 includes a first end 70a clamped by a pair of bolts to spring support 156'. A second end 70b is in sliding contact with spring support 156' of the aft-most wheel support. Ends 70a and 70b are located between their respective second spring support 156' and the rotational axis of the wheel. The center 70c of leaf spring 70 is fastened to a portion of cross-member 106 of transverse frame structure 116 which is the frame spring support. Pitching movement of either the forward-most wheel support 100' or the aft-most wheel support 100' is resisted by a biasing force from the center of the leaf spring.

Although a particular arrangement for contacting leaf spring 70 with wheel supports 100 and transverse frame structure 116 has been shown and described, those of ordinary skill in the art will recognize other suitable arrangements. For example, both ends of spring 70 could be clamped to the wheel supports, or both ends could be slidable on the wheel support. Further, the method of clamping leaf spring 70 can be one or more through fasteners, an example of which is depicted at 70c, or a fastened strap, as depicted at 70a, or other methods known in the art for clamping a leaf spring to a structure. As another example, spring 70 can pass through a frame attachment 74 as shown in FIG. 1. Further, although FIG. 14 depicts a leaf spring 70 acting upon two adjacent wheel supports, the present invention also contemplates those embodiments in which a leaf spring acts upon a single wheel support. As depicted in FIG. 16, an alternate embodiment includes an air spring 133 acting on both spring support 156' of wheel support 100' and also on spring support 132' of transverse frame structure 116.

Referring to FIGS. 14–15, shock absorber 136 is located beneath the rotational axis of the wheel so as to further simplify the structure of the wheel support, upright frame structures 122 and 124, and to further increase the cargo-carrying capability of the vehicle. Placement of shock absorber 136 is such that it acts upon horizontal portion 168' at wheel support 100', and permits elimination of support structure 134 and a generally simplified upright structure 112'. Shock absorber 136 is actuatable about an axis 137a, which is generally oriented horizontally as best seen in FIG. 15.

Shock absorber 136 has a first end 136a which is pivotally coupled to a portion of transverse frame structure 116, such as cross-member 106 or longitudinal member 126', through an attachment ear 140. A second end 136b of shock absorber 136 is pivotally attached to one end of a lever arm 222. Lever arm 222 is pivotally secured to pivot 224 which is attached to transverse frame structure 116, such as by a bracket 226 in a manner well known in the art. Lever arm 222 pivots about pivot axis 221. The other end of lever arm 222 defines a slot 228. Pinned bushing 229 is slidable in slot 228. Pinned bushing 229 is secured into a boss 220 of wheel support 100'.

Upward pitching of wheel support 100' results in compression of shock absorber 136 and sliding of pin 229 within slot 228. Downward pitching of wheel support 100' relative to transverse frame section 116 results in extension of shock absorber 136. Pinned bushing 229 and lever arm 222 are fabricated from hardened steel so as to minimize wear from sliding. Further, although an embodiment has been described and depicted in which shock absorber 136 compresses during upward pitching of wheel support 100', those of ordinary skill in the art will recognize other arrangements of pivoting lever arms that will suitably dampen the motion of wheel support 100' by extending during upward pitching.

Figure 17:
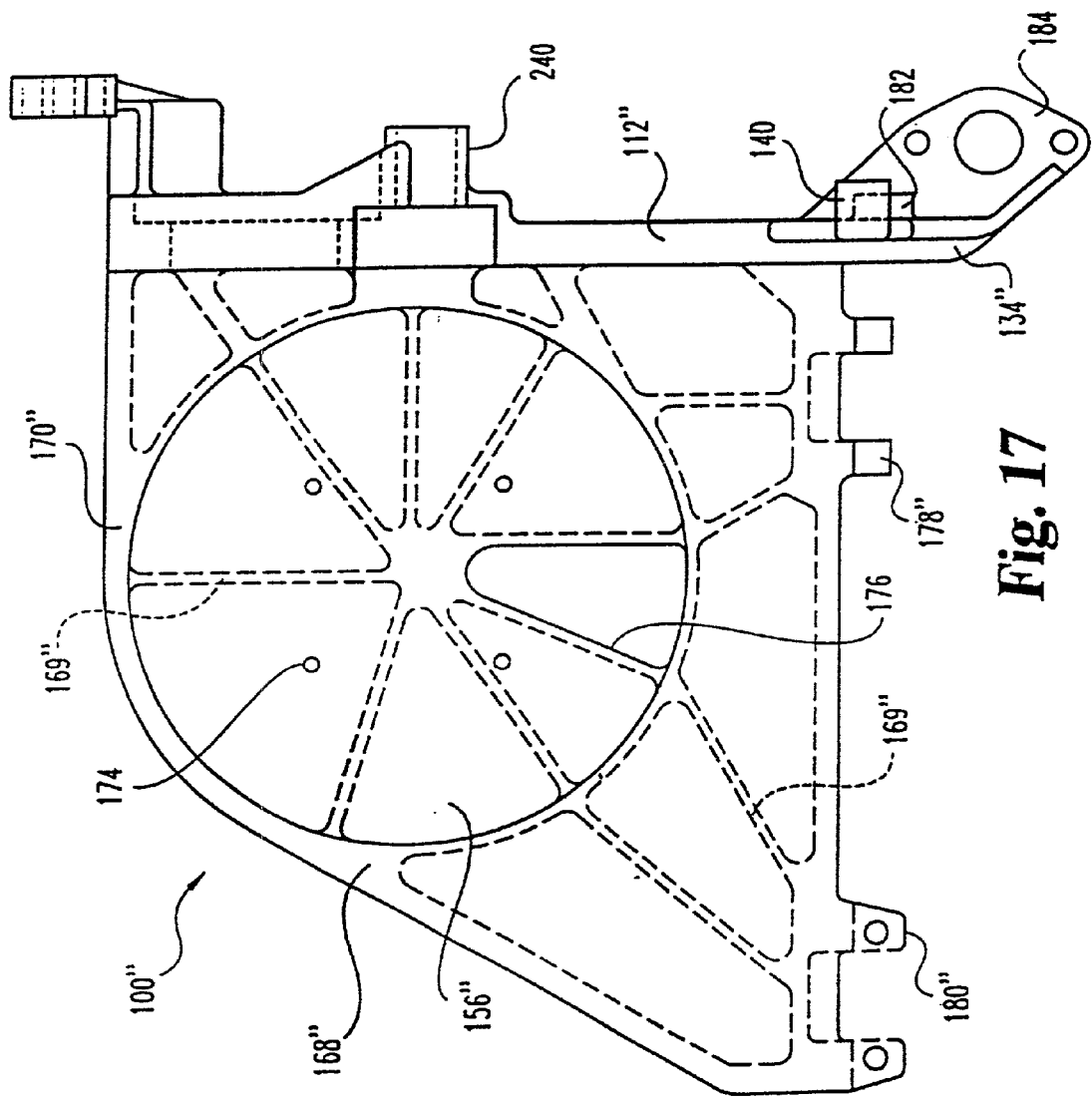
FIG. 17 is a top plan view of a wheel support according to one embodiment of the present invention.
Figure 18:
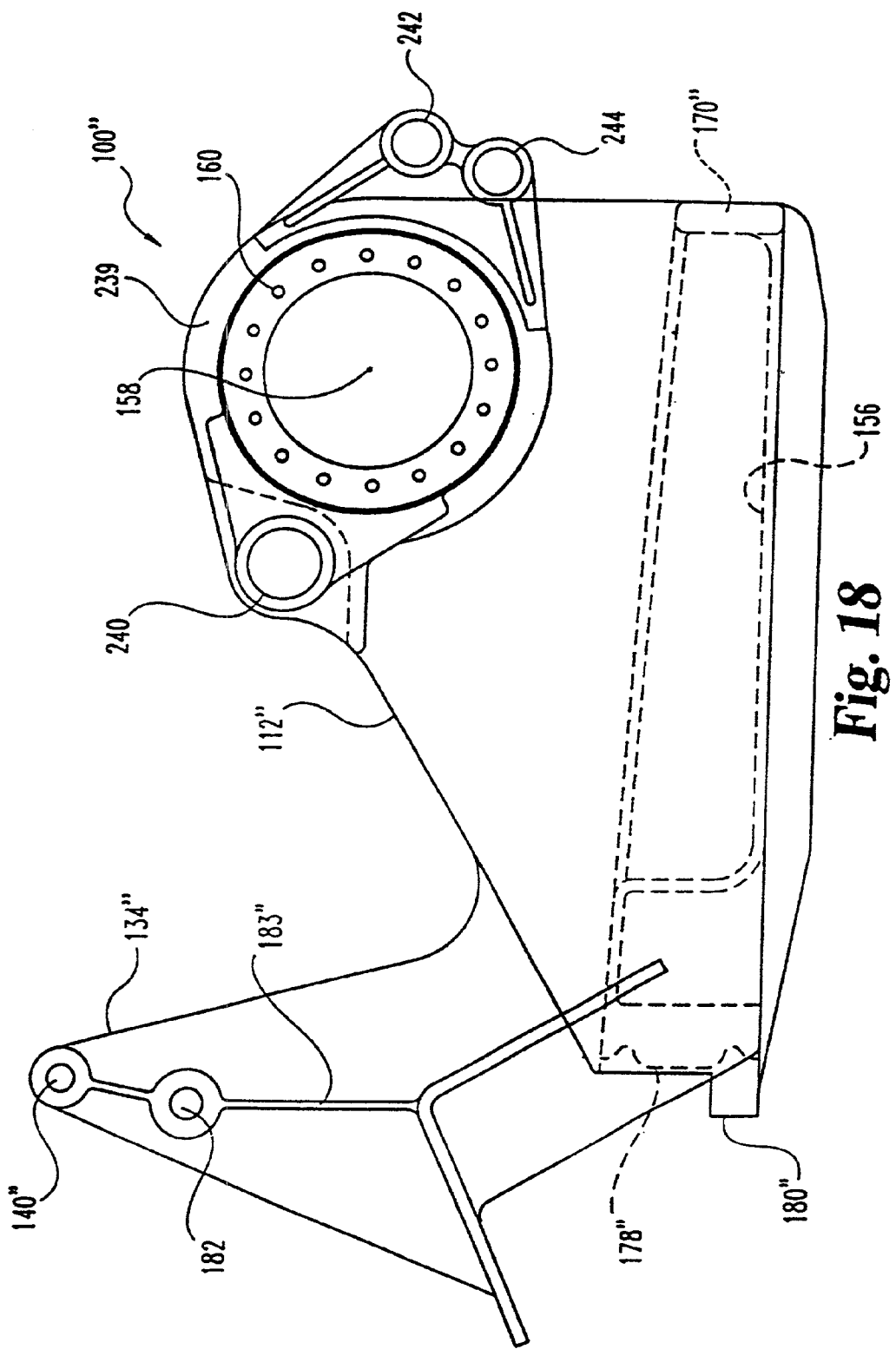
FIG. 18 is a side elevational view of the wheel support of FIG. 17.

FIGS. 17–18 depict a substantially cast wheel support 100" according to another embodiment of the present invention. Wheel support 100" includes a horizontal portion 168" cast integrally with an upright portion 112". A spring support 156" within horizontal portion 168" receives loads from a spring, and is reinforced by a plurality of cast stiffening ribs 169". A cast reinforcing member 170" stiffens and strengthens wheel support 100". Attachment members 178" and 180" are cast integrally with wheel support 100".

A support structure 134" for attaching a shock absorber and brake system components is integrally cast with upright portion 112". Upright portion 112" also includes a cast spider 239 which includes an attachment pattern of holes 240, 242, and 244 for support of brake system components (not shown) including brake shoes and an S-cam. The toe-in of wheel support 100" is adjustable by shimming in a manner as previously described. Camber is adjustable by incorporating slots in stationary outer members 108c and/or 110c of the pivotal attachments. The slots permit the orientation of outer member 108c or 110c to be adjusted relative to cross-member 106. This orientation is maintained by a friction fit provided by fasteners 177.

Figure 19:
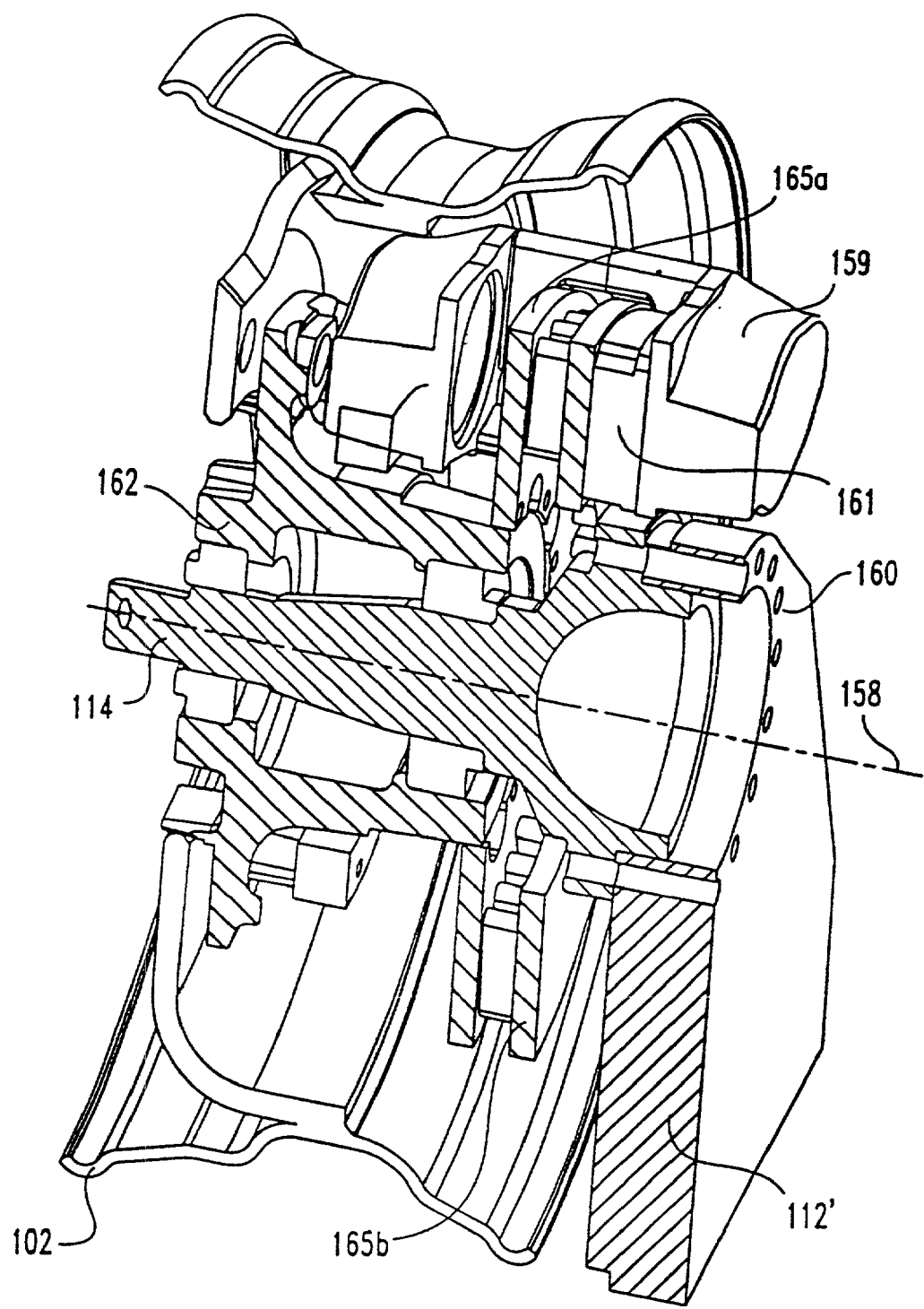
FIG. 19 is a cross-sectional, perspective view of another embodiment of the present invention.

Yet other alternate embodiments of the present invention include a wheel support and a disc brake as part of a wheel suspension system. As shown in FIG. 19, an upright section 112' is bolted to a spindle 114 by fasteners through fastener attachment pattern 160. A rotating hub 162 is bearingly supported on spindle 114. Coupled to hub 162 is a vented disc assembly 165 comprised of opposing rotor plates 165a and 165b. A caliper assembly 159 supported by upright portion 112' includes two friction pads 161 which are actuated against vented disc 165 so as to slow the vehicle. For sake of clarity, only one friction pad 161 is shown. Those of ordinary skill in the art will recognize the applicability of disc brakes to the many embodiments of the present invention.

Figure 20:
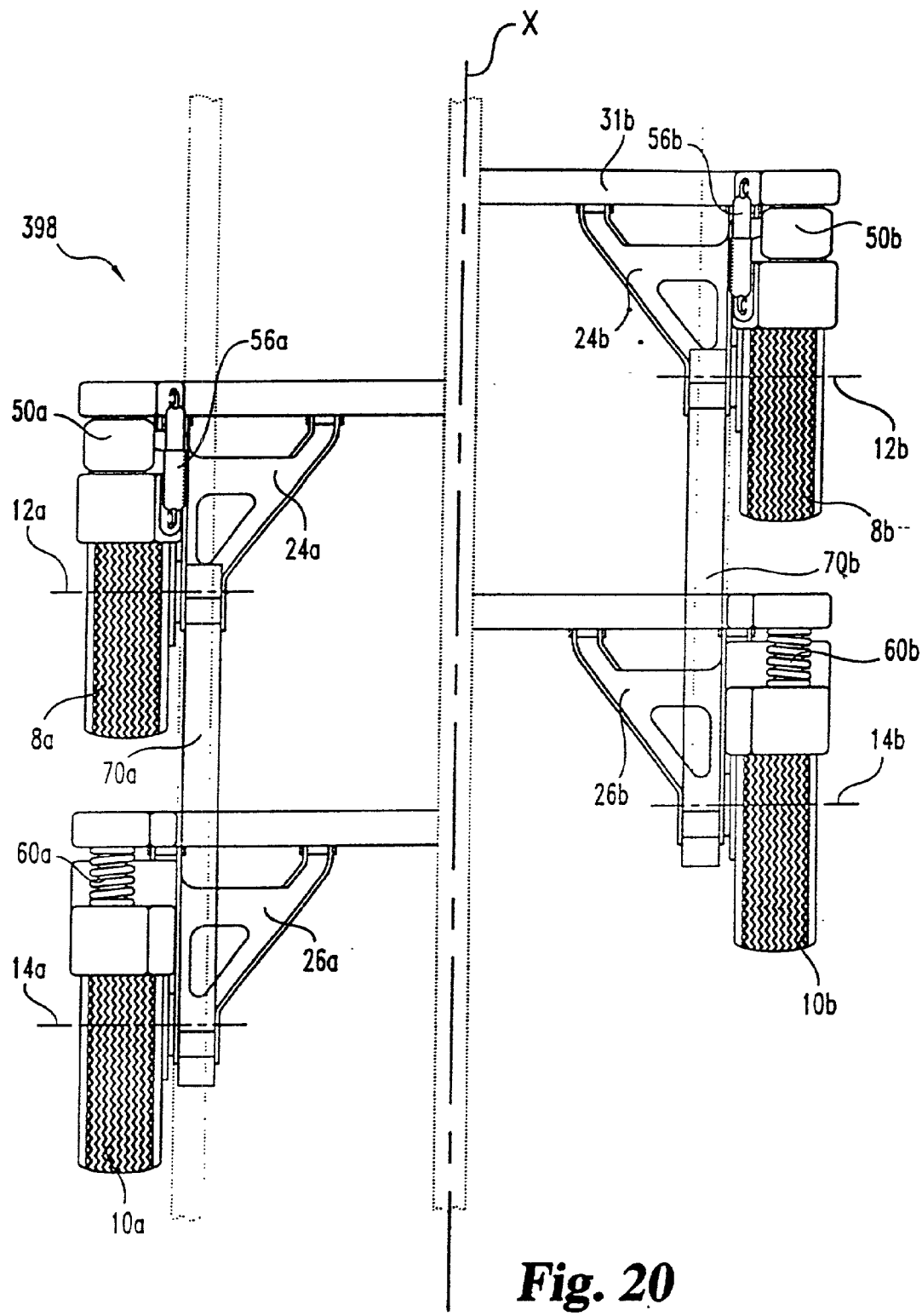
FIG. 20 is a top plan view of a frame and suspension system according to another embodiment of the present invention.
Figure 21:
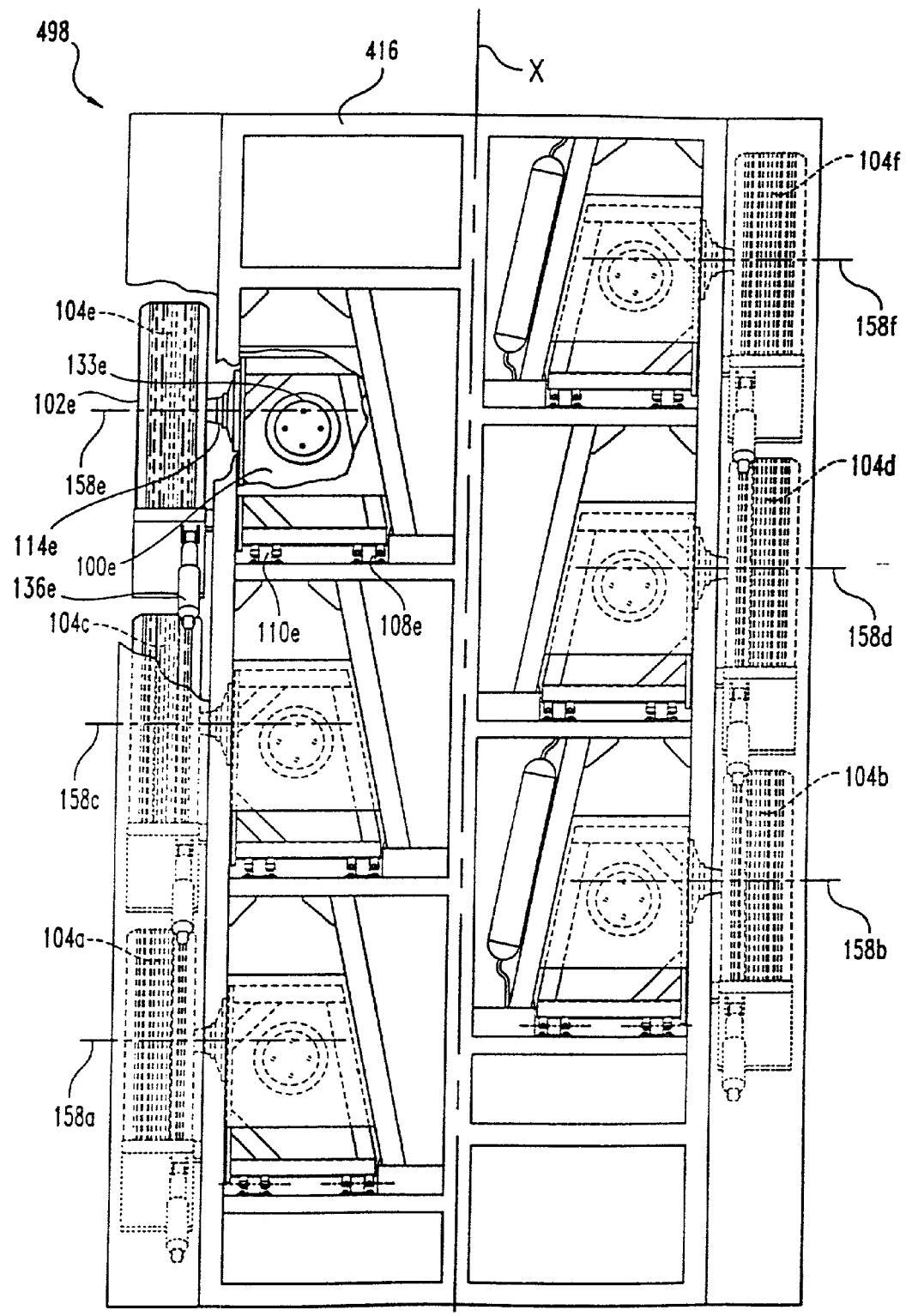
FIG. 21 is a top plan view of a frame and suspension system according to another embodiment of the present invention.
Figure 22:
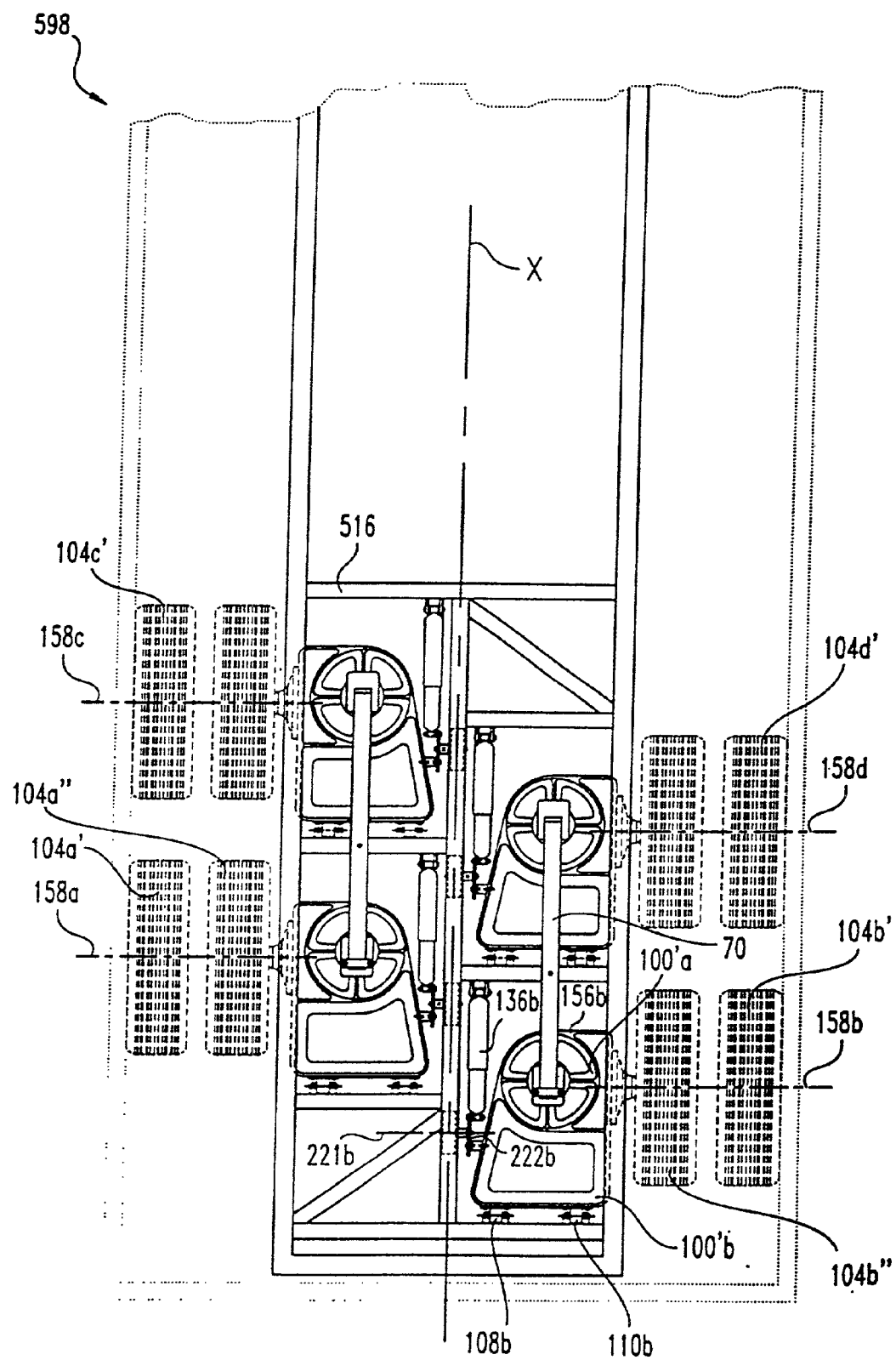
FIG. 22 is a top plan view of a frame and suspension system according to another embodiment of the present invention.

FIGS. 20, 21 and 22 depict variations of the suspension systems shown in FIGS. 3, 5 and 14, respectively, in which the wheels on one side of the vehicle are longitudinally staggered, or spaced apart, relative to wheels on the other side of the vehicle. By staggering the wheels as shown, a softer ride can be presented to the cargo or occupants, and less wear is imposed upon the roadway, especially a roadway with a disturbance that passes under the wheels on both sides of the vehicle In the embodiments depicted in FIGS. 20 and 22 wheel supports on a given side of the vehicle (same-side wheel supports) include one or more springs that couple the forward wheel support to the aft wheel support. In these embodiments, the motion of a same-side wheel support thereby depends, at least partly, on the motion of the other same-side wheel support. However, the present invention also includes embodiments such as the one depicted in FIG. 21, in which the motion of each wheel support is substantially independent of the motion of each other wheel support.

In some embodiments of the present invention, the extent of stagger between opposite side wheels is as great as half the distance between rotational axes of same-side wheels. However, the present invention also includes those embodiments in which the extent of stagger is less.

In the embodiments depicted in FIGS. 20–22, an even total number of rotational axes are arranged on both sides of the vehicle in an alternating longitudinal pattern, with no rotational axis being coincident with any other rotational axis. However, those of ordinary skill in the art will recognize that the present invention contemplates not only embodiments in which there is a forward-most wheel on the right side of the vehicle with an aft-most wheel on the left side, but also embodiments in which the forward-most wheel is located on the left side and the aft-most wheel is located on the right side. Further, the present invention also contemplates those embodiments in which both the forward-most and aft-most wheels are on the same side of the vehicle, and also those embodiments in which one side of the vehicle has an even number of wheels and the other side of the vehicle has an odd number of wheels, such as by way of example, a vehicle with two wheels on one side and one wheel on the other side. Further, the total number of rotational axes per frame section is as low as two, and is as great as required in the particular application.

The use of element numbers the same as numbers previously used, including element numbers with letter suffixes, indicates that the element referred to is the same, except as described.

FIG. 20 depicts an embodiment of the present invention to which the discussion herein relative to FIGS. 1, 2 and 3 is applicable, except as now described. Although a description of the "a" side components is given, those of ordinary skill in the art will recognize applicability of the description to the "b" side components. Frame and suspension section 398 of a vehicle frame includes a forward-most wheel 8a and a rear-most wheel 10a located on one side of the vehicle frame. Wheels 8a and 10a are pivotally supported by wheel supports 24a and 26a, respectively, in a manner as previously described. Wheel supports 24a and 26a are coupled together by a leaf spring 70a, also in a manner as previously described. Further, biasing members 50a, 56a and 60a are located generally above the rotational axes of the wheels, also as previously described.

The rotational axes 12a and 14a of wheels 8a and 10a, respectively, are staggered, or longitudinally spaced apart, from the rotational axes 12b and 14b of wheels 8b and 10b, respectively. In one embodiment, the four rotational axes are arranged in an alternating longitudinal pattern, with no rotational axis being coincident with any other rotational axis. Rotational axis 12a is located in this embodiment aft of rotational axis 12b, and forward of rotational axis 14b. Rotational axis 14a is located aft of all other rotational axes.

FIG. 21 depicts an embodiment of the present invention to which the description herein relative to FIG. 5 and related figures is applicable, except as now described. Although a description of the "e" components is given, those of ordinary skill in the art will recognize applicability of the description to the "a," "b," "c," "d," and "f," components. As previously described, frame and suspension section 498 of a vehicle frame includes a wheel 102e and tire 104e rotatably supported by a spindle 114e coupled to a wheel support 100e. The wheel support is pivotally attached to frame section 498 by pivotal attachments 108e and 110e. An air spring 133e biases wheel support 100e and wheel 102e to a position intermediate of an uppermost position and a lowermost position. An optional shock absorber 136e for dampening motion of wheel 102e is pivotally coupled to both wheel support 100e and frame structure 416. The rotational axes 158a, 158c, and 158e, of wheels 104a, 104c, and 104e, respectively, are staggered, or longitudinally spaced apart, from the rotational axes 158b, 158d, and 158f, of wheels 104b, 104d, and 104f, respectively. The present invention also contemplates patterns of stagger other than that shown in FIG. 21, for example, including an asymmetric pattern in which rotational axis 158b is located forward of rotational axis 158a, or in which rotational axis 158e is located aft of rotational axis 158f.

FIG. 22 depicts an embodiment of the present invention that is the same as the embodiments described herein relative to FIGS. 14, 15 and 16, except as now described. Although a description of the forward-most "b" components is given, those of ordinary skill in the art will recognize applicability of the description to the "a," "c," and "d," components. Further, although an embodiment with a leaf spring linking adjacent, same-side wheel supports is shown, those of ordinary skill in the art will recognize that the present invention also includes the embodiments depicted in FIG. 16, which include an air spring.

As shown in FIG. 22, a wheel set comprising a pair of wheels 104b' and 104b" rotatable about an axis 158b are supported by a wheel support 100b' pivotally attached to frame structure 516 by pivotal attachments 108b and 110b. The pitching movement of wheel support 100b' is dampened by shock absorber 136b, which is pivotally coupled to both frame section 516 and wheel support 100b'. Shock absorber 136b is substantially horizontal.

The rotational axes 158b and 158d of wheels 104b' and 140d', respectively, are staggered, or longitudinally spaced apart, from the rotational axes 158a and 158c of wheels 104a' and 104c'. As shown, the four rotational axes are arranged in an alternating or longitudinally spaced apart pattern, with no rotational axis of any one wheel set being coincident with the rotational axis of any other wheel set. Those of ordinary skill in the art will recognize that the present invention also contemplates those embodiments in which only wheel sets "a," "b," and "d," are present.

Figure 23:
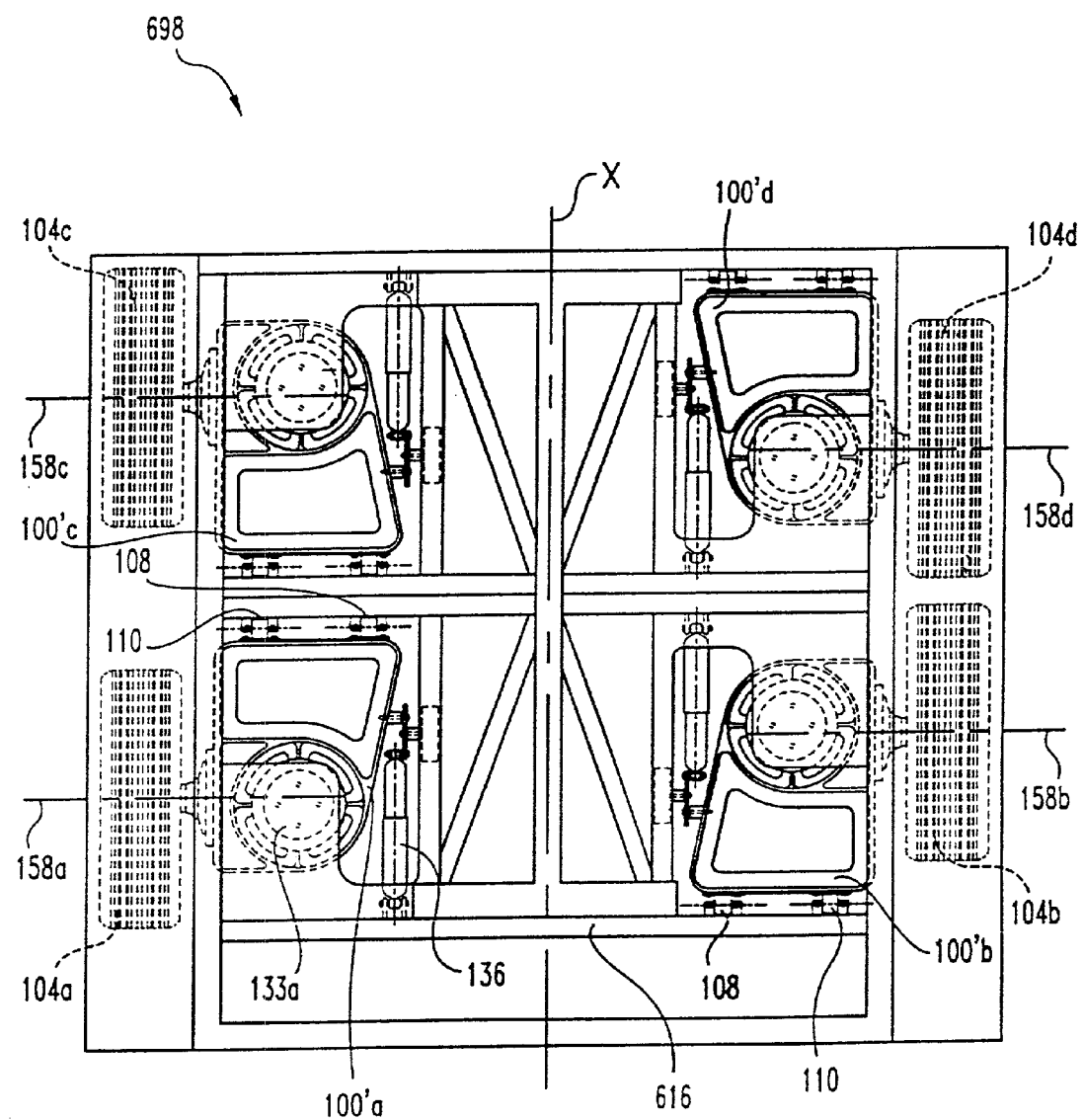
FIG. 23 is a top plan view of a frame and suspension system according to another embodiment of the present invention.
Figure 24:
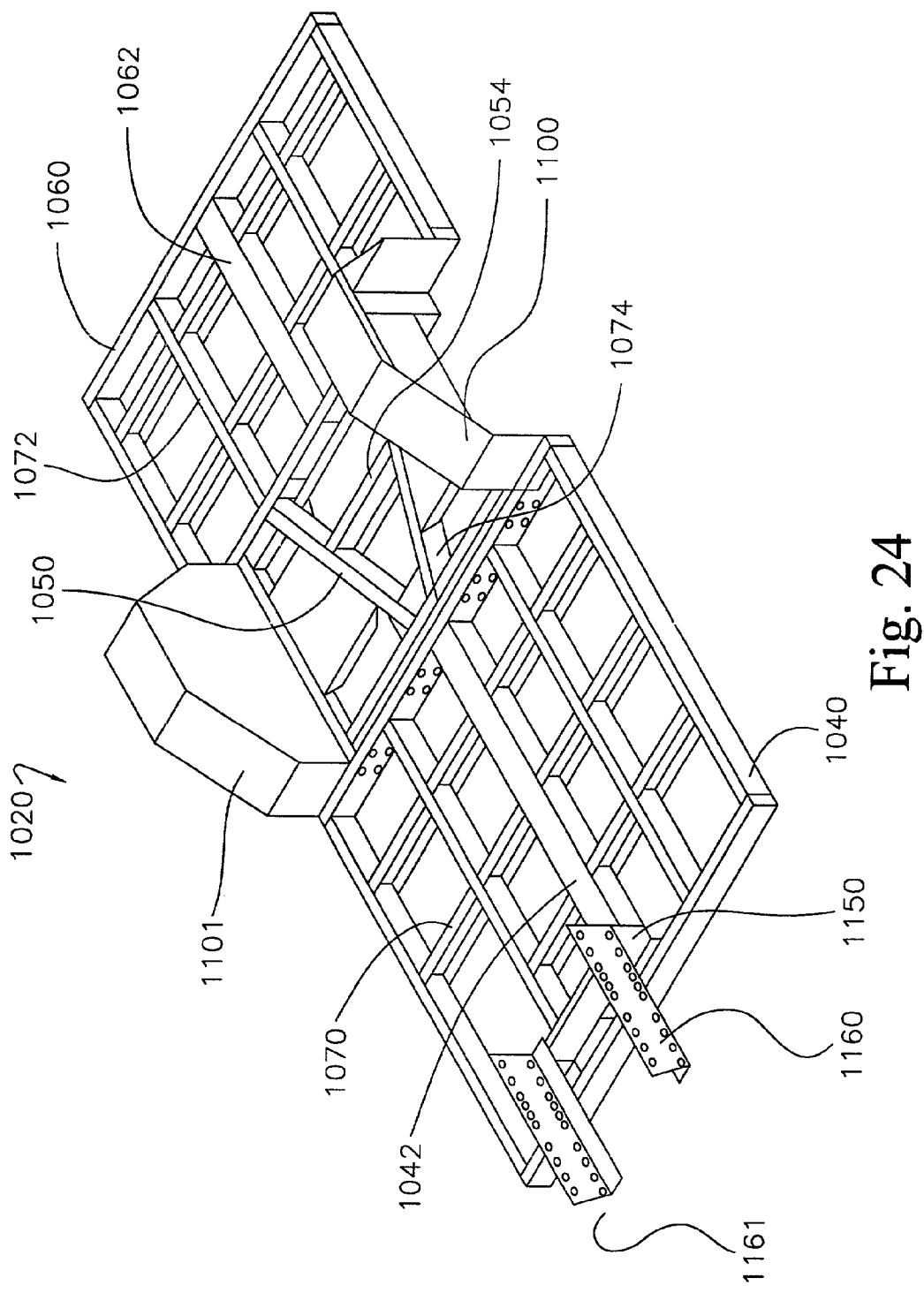
FIG. 24 is a front, left side, and top perspective view of another embodiment of the present invention.
Figure 26:
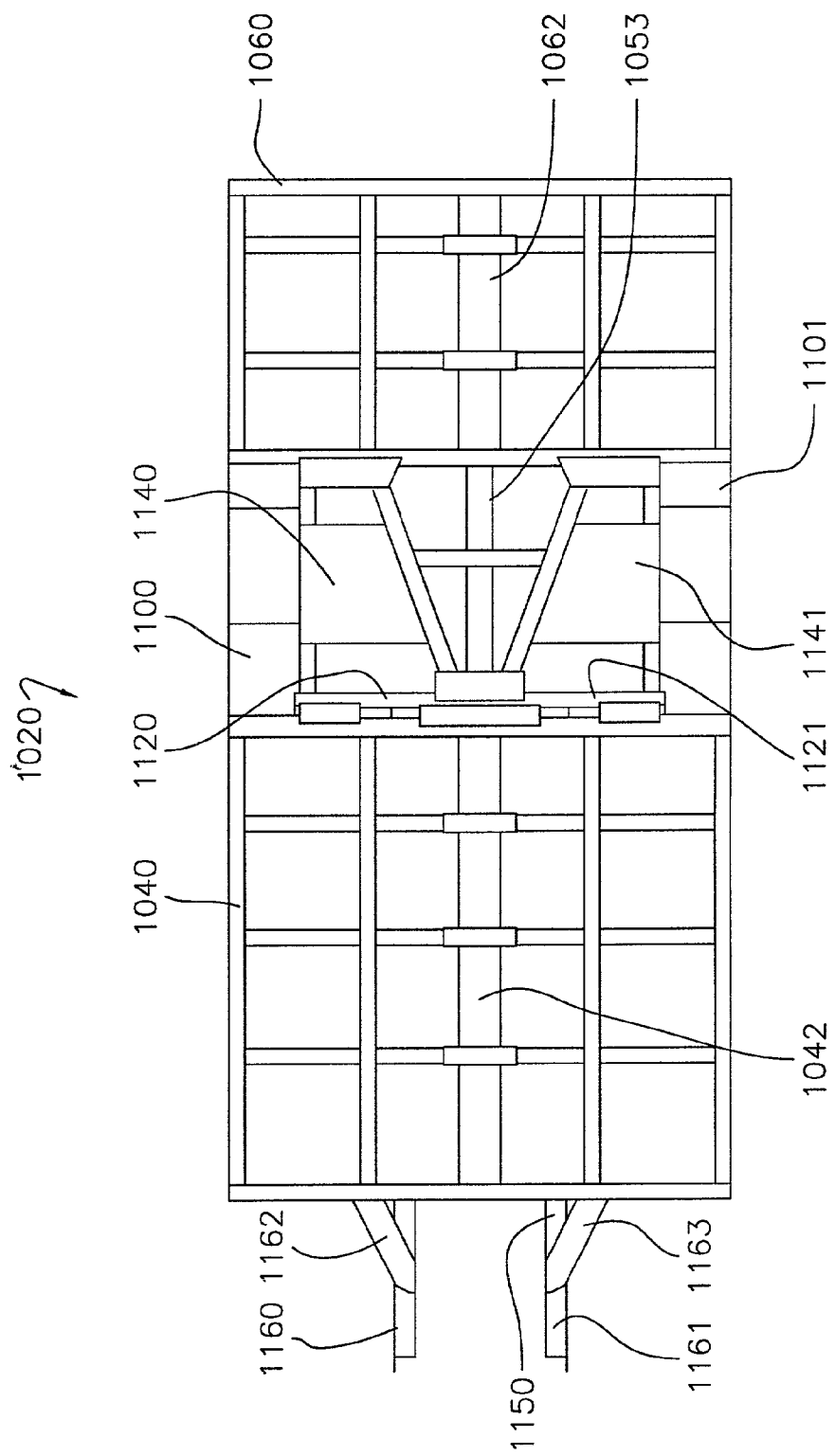
FIG. 26 is a bottom planar view of the embodiment of FIG. 26.

FIG. 23 depicts an embodiment of the present invention that is the same as the embodiments described herein relative to FIGS. 14, 15 and 16, except as now described. The wheel support described herein may be pivotally attached to a frame as trailing-arm wheel supports, in which the pivotal attachment of the wheel support to the frame is located forward of the rotational axis of the wheel, or as leading-arm wheel supports, in which the pivotal attachment of the wheel support to the frame is located rearward of the rotational axis of the wheel.

As seen in FIG. 23, a first wheel support 100'a rotatably supporting a wheel 104a on a first side of frame 516 has inboard pivotal attachment 108 and outboard pivotal attachment 110 located forward of rotational axis 158a. A spring, preferably an air spring 133a, urges first wheel support 100'a apart from a portion of frame 516. An end of air spring 133a is coupled to frame 516 below rotational axis 158a.

A second wheel 104b is pivotally supported by a second wheel support 100'b on the other side of frame 516 in a manner similar to that for the "a" components described above. However, inboard pivotal attachment 108 and outboard pivotal attachment 110 of wheel support 100'b are placed rearward of rotational axis 158b. By this arrangement of a trailing arm wheel support 100'a on one side of the frame and a leading-arm wheel support 100'b on the other side, it is possible to use an identical wheel support for opposing sides of the vehicle, and thus benefit from a reduction in cost of the frame and suspension section 698, and also a reduction in the number of different parts for building a frame and suspension section 698.

The present invention also contemplates those embodiments in which other combinations of leading and trailing wheel supports are utilized on a frame and suspension section. Wheels 104a and 104c are shown supported by wheel supports 100'a and 100'c, respectively, both wheel supports being pivotally supported by a common portion of frame 616. Other embodiments of the present invention include wheel supports arranged as shown in FIG. 23 with wheels 104b and 104d. Those wheels, supported by wheel supports 100'b and 100'd, respectively, may be placed close together by arranging the pivot axes of the respective wheel supports as shown. Those of ordinary skill in the art will recognize that frame and suspension section 698 as shown in FIG. 23 is but one arrangement combining leading and trailing wheel supports, and that many other arrangements are contemplated by the present invention.

The inventions described in my other patent applications, namely U.S. patent application Ser. No. 09/318,428, filed May 25, 1999 and entitled AXLELESS VEHICLE SUSPENSION SYSTEM; U.S. patent application Ser. No. 09/654,584, filed Sep. 1, 2000, and entitled STAGGERED INDEPENDENT SUSPENSION; U.S. Provisional Patent Application Ser. No. 60/202,237, filed May 5, 2000, and entitled ELECTRIC CAR SUSPENSION; and U.S. Provisional Patent Application 60/222,478 filed Aug. 2, 2000 and entitled SINGLE ARM VEHICLE SUSPENSION; are incorporated herein by reference.

In another embodiment, the present invention relates to a low profile chassis section for the center and rear portion of a vehicle. The chassis section includes a low profile suspension system that supports the rear wheels with independent trailing arm wheel supports. Preferably, the trailing arm wheel support has a pivot axis below the rotational axis of the wheels. The chassis includes a frame section having a substantially planar top surface. Trailing arm wheel supports according to the present invention permit the top surface of the frame section to be located below the rotational axes of the rear wheels. Preferably, the rear wheels are not powered by the engine of the vehicle, and are not steerable. Preferably, the rear wheels are constrained to pitching motion describable with a single degree of freedom.

A chassis section according to the present invention preferably is rigidly coupled to a cab section having a high profile sub-frame and floor. The cab section preferably includes steerable front wheels, an engine to drive the front wheels, and a driver's seat and controls. In one embodiment of the present invention the cab section is separated from an existing vehicle which typically includes a high profile frame throughout the length of the existing vehicle. The center and rear portion of the high profile frame section of the existing vehicle is separated from the cab section, and the low profile chassis section according to an embodiment of the present invention is rigidly coupled to the high profile cab section, resulting in a new vehicle.

A separate payload section, such as an ambulance compartment, passenger compartment, or cargo compartment can be coupled to the top of the center and rear chassis section and also to the rear of the cab section. The payload compartment can have a floor that is close to the roadway by placement of the top surface of the underlying chassis section below the rotational axes of the rear wheels, in the case of an ambulance compartment, having a low floor permits easier entrance and exit from the compartment as compared to a standard ambulance with a high profile floor. A low profile chassis according to the present invention permits easier movement of wheelchairs and gurneys into and out of the ambulance compartment. As another example, a payload compartment for carrying passengers around airports and hotels can have a low profile floor which makes ingress and egress easier for elderly and handicapped passengers. As another example, a payload compartment comprising a low profile floor cargo compartment such as for a short haul delivery truck permits the delivery person to bring cargo into and out of the compartment with less fatigue. A payload compartment attached to a chassis according to the present invention can also have a lower overall height than an existing vehicle with high profile chassis, yet have a useful interior height from floor to ceiling that is about the same as for an existing vehicle. Therefore the present invention permits the use of a payload compartment with a large interior that can pass underneath a low hanging obstruction, such as those found at the arrival and departure areas of some hotels.

In one embodiment of the present invention, the chassis section is fastened by bolts or other fasteners to a sub-frame of the cab section. Fastening is useful where the members of the cab sub-frame are heat treated, in which cases welding the chassis to the cab subframe lessens the material properties of the subframe.

Referring to FIGS. 24–29, vehicle chassis 1020 according to one embodiment of the present invention includes a substantially planar forward frame portion 1040, a substantially planar rearward frame portion 1060, and an intermediate frame portion 1050 located therebetween. Chassis 1020 further includes a support section 1150 located forward of forward frame portion 1040, section 1150 bolting to a front sub-frame 1220 supporting a front suspension/engine module 1230. Forward frame 1040, intermediate frame 1050, and rearward frame 1060 are preferably of the ladder-type, each comprising a plurality of lateral structural members 1070, longitudinal structural members 1072, and/or diagonal structural members 1074. The various structural members 1070, 1072, and 1074 are preferably welded together into a ladder-type or box structure such that the top surfaces of the structural members define a substantially planar top surface 1022 that extends generally across frame sections 1040, 1050, and 1060 (as best seen in FIG. 25c). Chassis 1020 preferably includes hollow structural members 1042 and 1062 which run in a generally longitudinal direction. Structural members 1042 and 1062 provide housing and protection for an exhaust pipe 1053 carried therein.

Although a ladder-type or box structure has been shown and described, the present invention also contemplates other configurations of frame structure, with the top surface of the frame portions being generally located below the rotational axes of the rear wheels. A separable vehicle body or payload portion 1300 including an interior with a floor 1302 and exterior body panels attaches to frames section 1040, 1050, and 1060, preferably by bolting or use of other fasteners, including riveting, or by welding or other attachment methods.

Intermediate frame 1050 preferably includes a substantially planar center frame section 1054 and left and right wheel housings 1100 and 1101, respectively, on either side of section 1054. Left and right rear wheels 1130 and 1131 for the vehicle are located within their respective wheel housings. A left wheel 1130 is pivotally supported from intermediate section 1050 by a wheel support 100" which pivotally couples to a forward portion 1120 of intermediate frame portion 1040 by inboard and outboard pivot joints 108 and 110, respectively. The pivotal attachment of the wheel support to the frame permits pivoting motion of the supported wheel in a pitching direction only, and constrains the wheel against yawing motion such as the type necessary for steering control. Although what has been shown and described is a wheel support 100" pivotally coupled to intermediate section 1050, the various embodiments of the present invention shown and described herein contemplate use of any of the various wheel supports shown and described herein.

In one embodiment, a spring 133 such as an inflatable air spring is placed between a portion of the wheel support and the bottom side of spring support member 1140. The spring provides resilient support of the vehicle from the roadway, the spring urging apart the frame from the wheel support. Spring support 1140 has a top surface within frame section 1054 that is at or below plane 1022. Although what has been shown and described pertains to the left wheel, it is understood that there is preferably a mirror image wheel support supporting the vehicle from a right wheel 1131 located within wheel housing 1101, right wheel 1131 being pivotally supported from portion 1121 of frame 1050.

In one embodiment of the present invention, the wheel supports are trailing arm supports, such that the pivot axes 109 and 111 of the wheel supports 100" are forward of the rotational axes 158 of the wheels 1130 and 1131. Further, as can be best seen in FIG. 29, rotational axes of the wheels are located above plane 1022. Preferably, a wheel support according to the present invention supports a stub axle 114, and stub axle 114 supports one or more wheels from a single side in cantilever fashion such that the wheel is located outboard of the wheel support, leaving the space inboard of the wheel and stub axle for the wheel support, spring, and cargo compartments. Further, pivot joints 108 and 110 which pivotally couple the wheel support to the frame are located inboard of the supported wheel. Preferably, the pivot axes 109 and 111 of the wheel support are parallel to the rotational axis of the supported wheel, but the present invention also contemplates a wheel support pivotable about an axis that is not perpendicular to the longitudinal centerline of the vehicle and not parallel to the rotational axis of the supported wheel. The present invention also contemplates suspension systems located generally within the wheel housings, such as the type shown in my issued patents referenced above and incorporated herein by reference.

A support section 1150 is preferably coupled to sub-frame 1220 which supports front suspension and engine module 1230 located in front of forward frame 1040. Support section 1150 includes a pair of support members 1160 and 1161 which are cantilevered from the forward portion of forward frame 1040 and which are further supported by a pair of lateral braces 1162 and 1163. Support arms 1160 and 1161 preferably include a plurality of holes 1170. Sub-frame 1220 and other structural components which support the front suspension and engine module 1230 are rigidly coupled to frame portion 1150 by the use of fasteners 1171 in conjunction with holes 1170. In one embodiment of the present invention the subframe supporting the engine and front suspension is cut away from or otherwise removed from an existing vehicle. The frame portion of the existing vehicle aft of the cab section is discarded, and the sub-frame of the cab section is bolted to chassis 1020.

Figure 29:
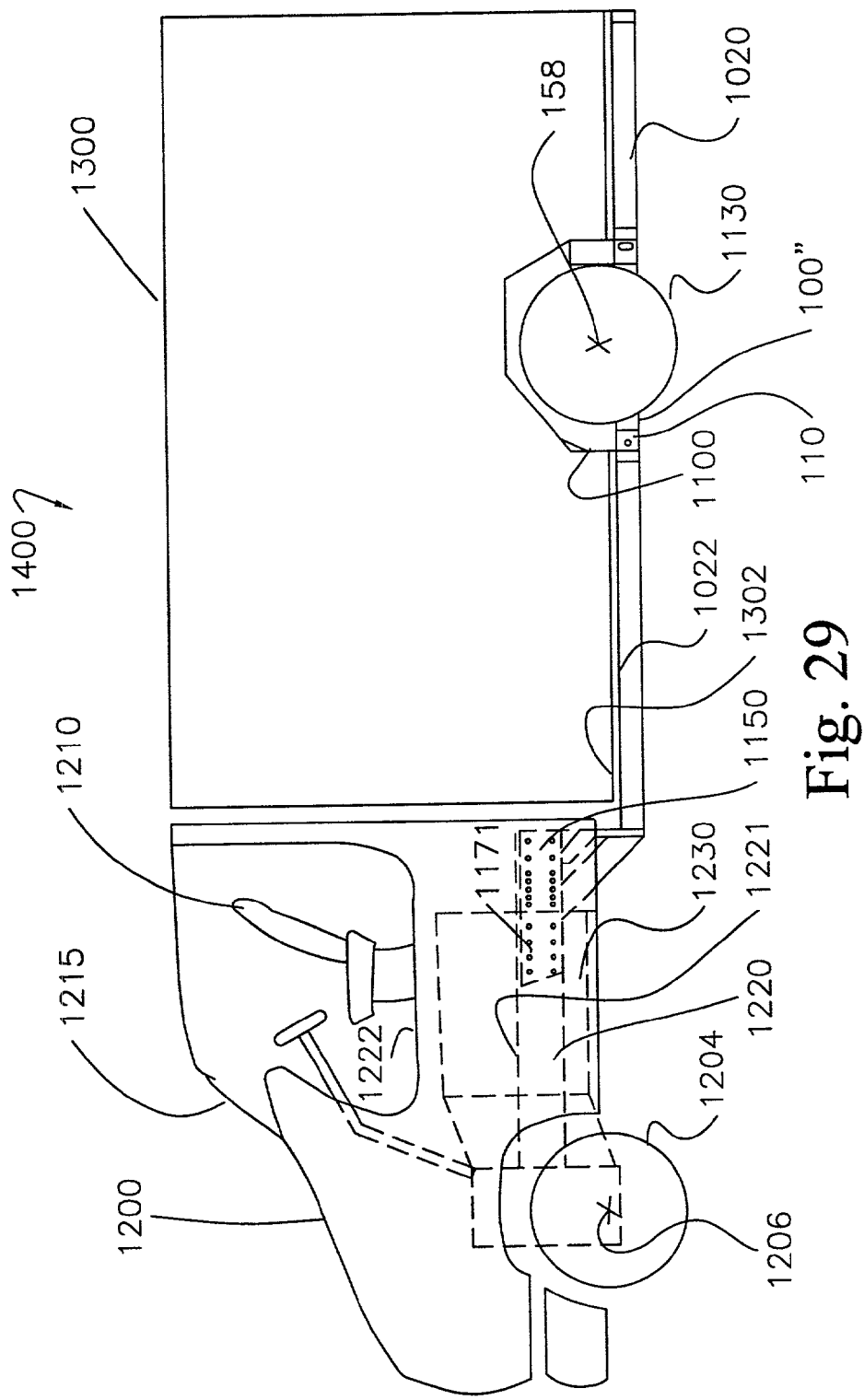
FIG. 29 is a partly sectional schematic representation of a side elevational view of another embodiment of the present invention.

Sub-frame 1220 of cab section 1200 provides "high profile" support of at least one of the engine or front suspension of cab section 1200. Typically, the structural members of sub-frame 1220 are above rotational axis 1206 of front wheel 1204. The floor 1222 of cab section 1200 is also located above the rotational axis 1206. As can be seen in FIG. 29, a vehicle 1400 according to one embodiment of the present invention includes a top surface 1221 of the frame of the cab section that is above rotational axes 1206 and 158 of wheels 1206 and 1130, respectively, and a top surface 1022 of the frame supporting the payload section 1300 that is below rotational axes 1206 and 158. The combined frame for vehicle 1400 includes a forward-most sub-frame 1220 with a top surface that is at a first elevation above the rotational axes of the wheels, and a center and rear-most frame section 1020 with a top surface that is at a second elevation below the rotational axes of the wheels.

Although what has been shown and described is a support section that couples the front frame section to the sub-frame of the cab section, the present invention also contemplates those embodiments in which portions of the sub-frame and vehicle chassis section are unitary. For example, the present invention contemplates those embodiments in which the one or more central longitudinal frame members of the rear vehicle chassis are integrally formed with longitudinal frame members of the sub-frame. In another embodiment, one or more frame members of the rear vehicle chassis are welded to one of more frame members of the sub-frame, and the welded assembly is heat treated as a unitary assembly.

Figure 27:
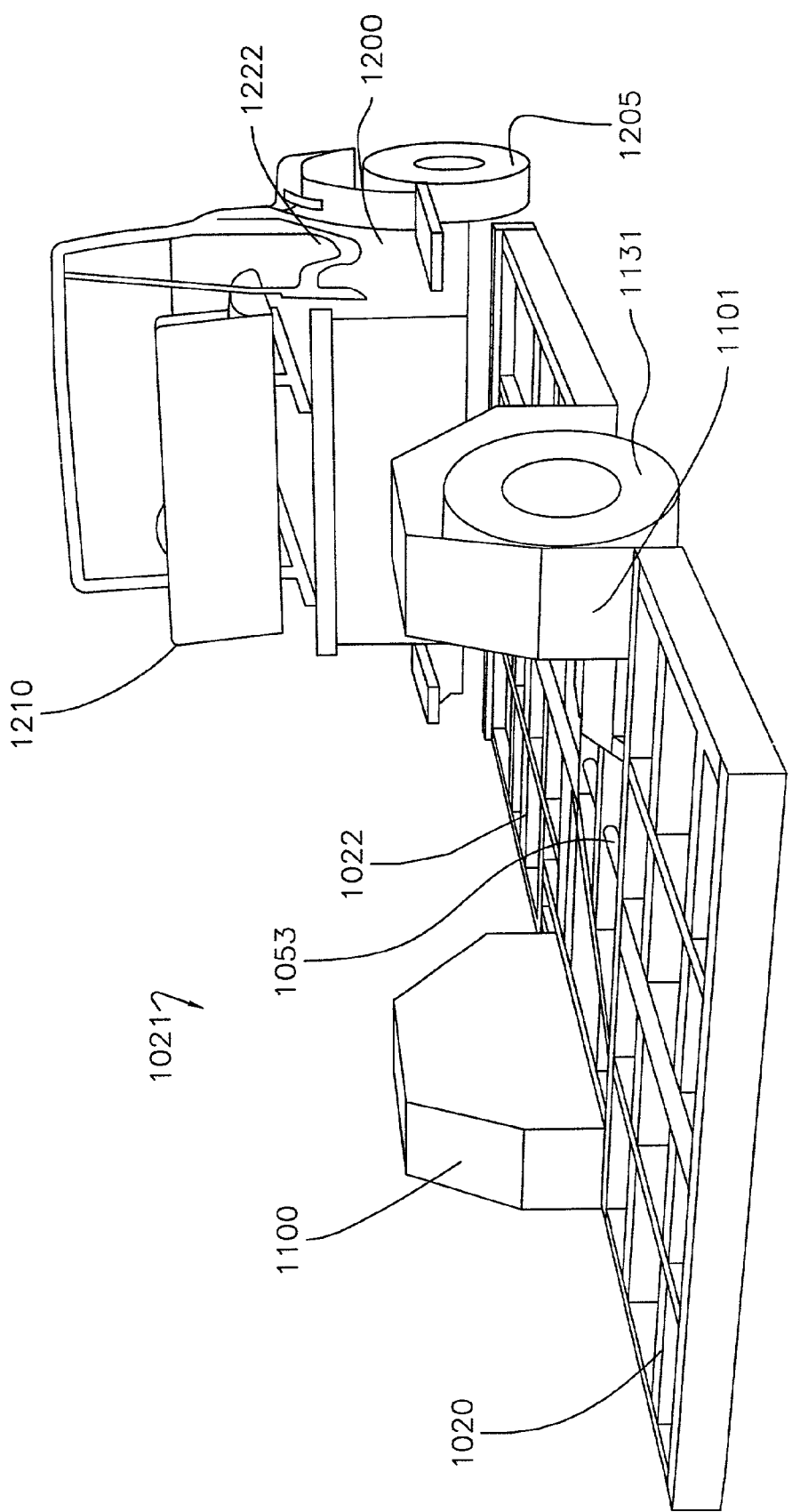
FIG. 27 is a rear, top, and right side photograph of another embodiment of the present invention.
Figure 28:
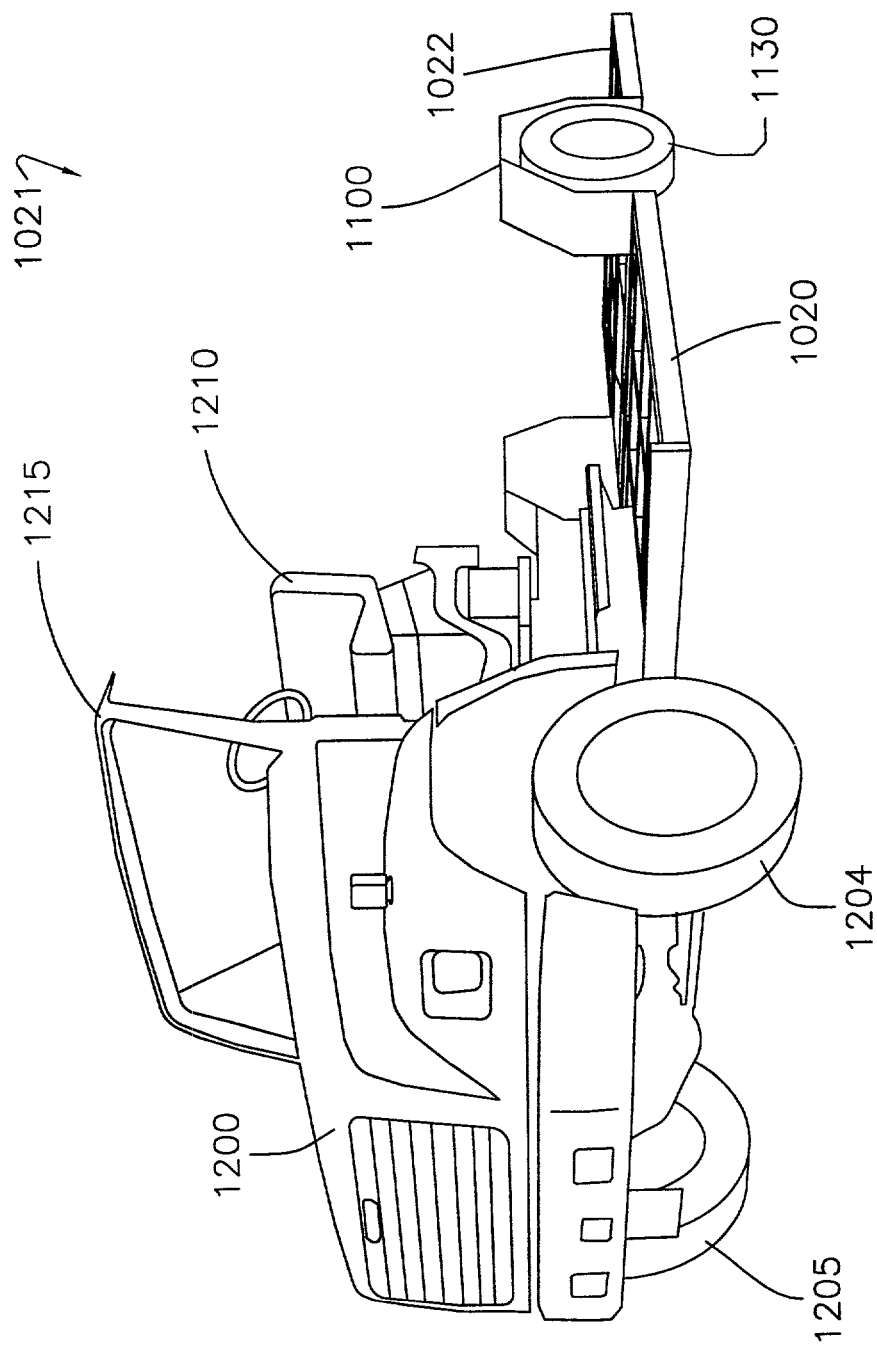
FIG. 28 is a front, top, and left side photograph of the embodiment of FIG. 27.

FIGS. 27 and 28 are photographs of a chassis coupled to a cab section according to another embodiment of the present invention. FIG. 29 is a partly sectional and partly side schematic representation of a cab section coupled to a chassis which supports a payload section according to another embodiment of the present invention. Vehicle chassis 1020 is shown coupled to a cab section 1200. Cab section 1200 includes an engine and a pair of front wheels 1204 and 1205 which are both steerable and which both apply the power provided by the engine to the roadway. Cab section 1200 includes a driver's seat 1210, windshield 1215, and other features necessary for the powering and control of the vehicle. Cab section 1200 includes a cab floor 1222 that is at an elevation above the rotational axes of the front and rear wheels, and also above plane 1022 of chassis 1020 and floor 1302 of payload compartment 1300. In the embodiment depicted in FIGS. 27 and 28 a passenger compartment, cargo compartment, ambulance section, or other payload section 1300 can be attached above chassis section 1020 and behind cab section 1200. FIG. 29 schematically shows a payload section 1300 attached to a chassis section 1020. FIG. 29 also shows cab section 1200 in part sectional view, with the front suspension and engine module 1230 visible, and being supported by sub-frame 1220.

The use of two thousand prefixes (2XXX) or three thousand prefixes (3XXX) designate the same element as the one thousand prefix (1XXX) previously described except as shown and described differently.

Figure 30:
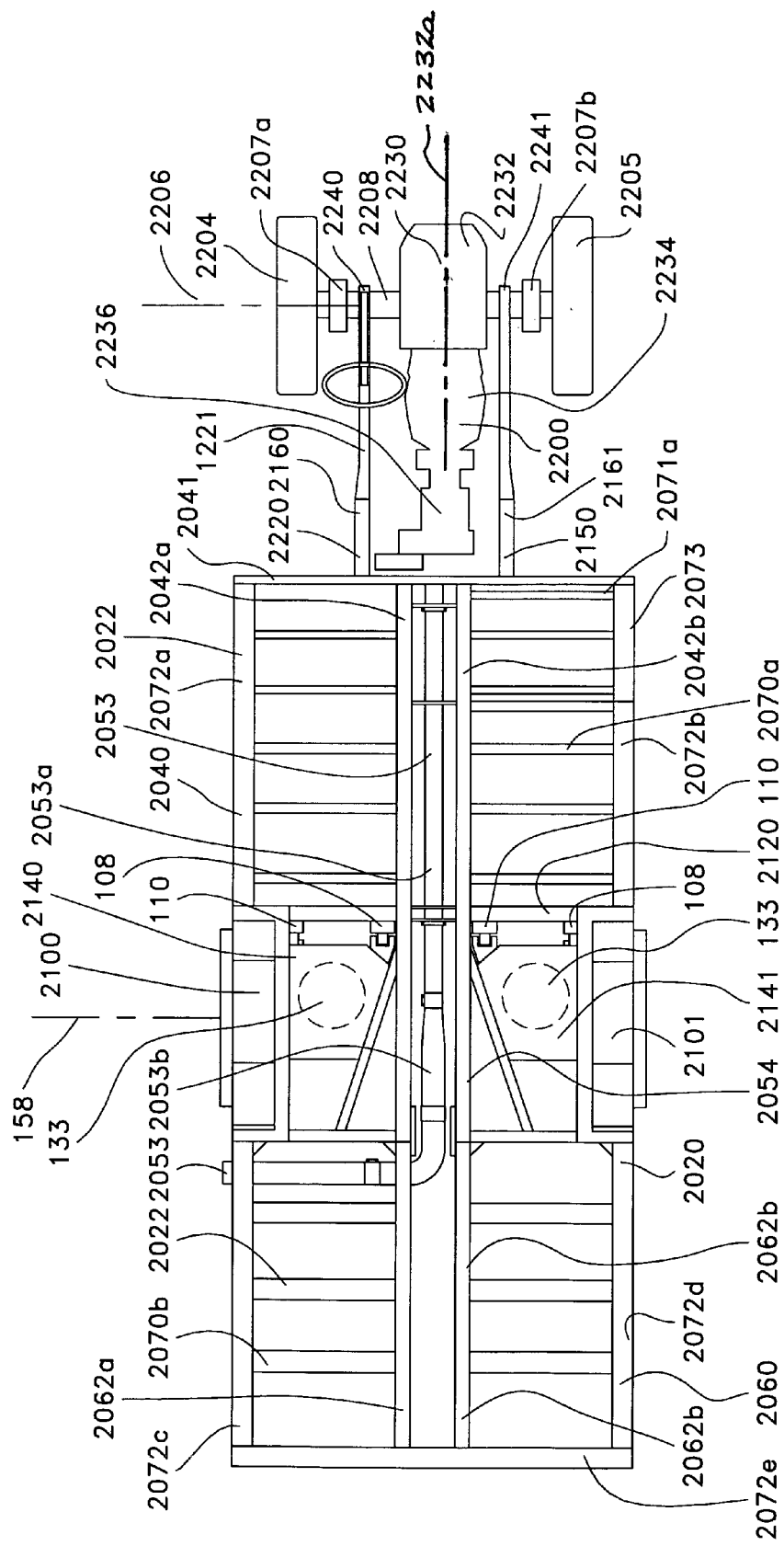
FIG. 30 is a top plan view of an apparatus according to another embodiment of the present invention.
Figure 31:
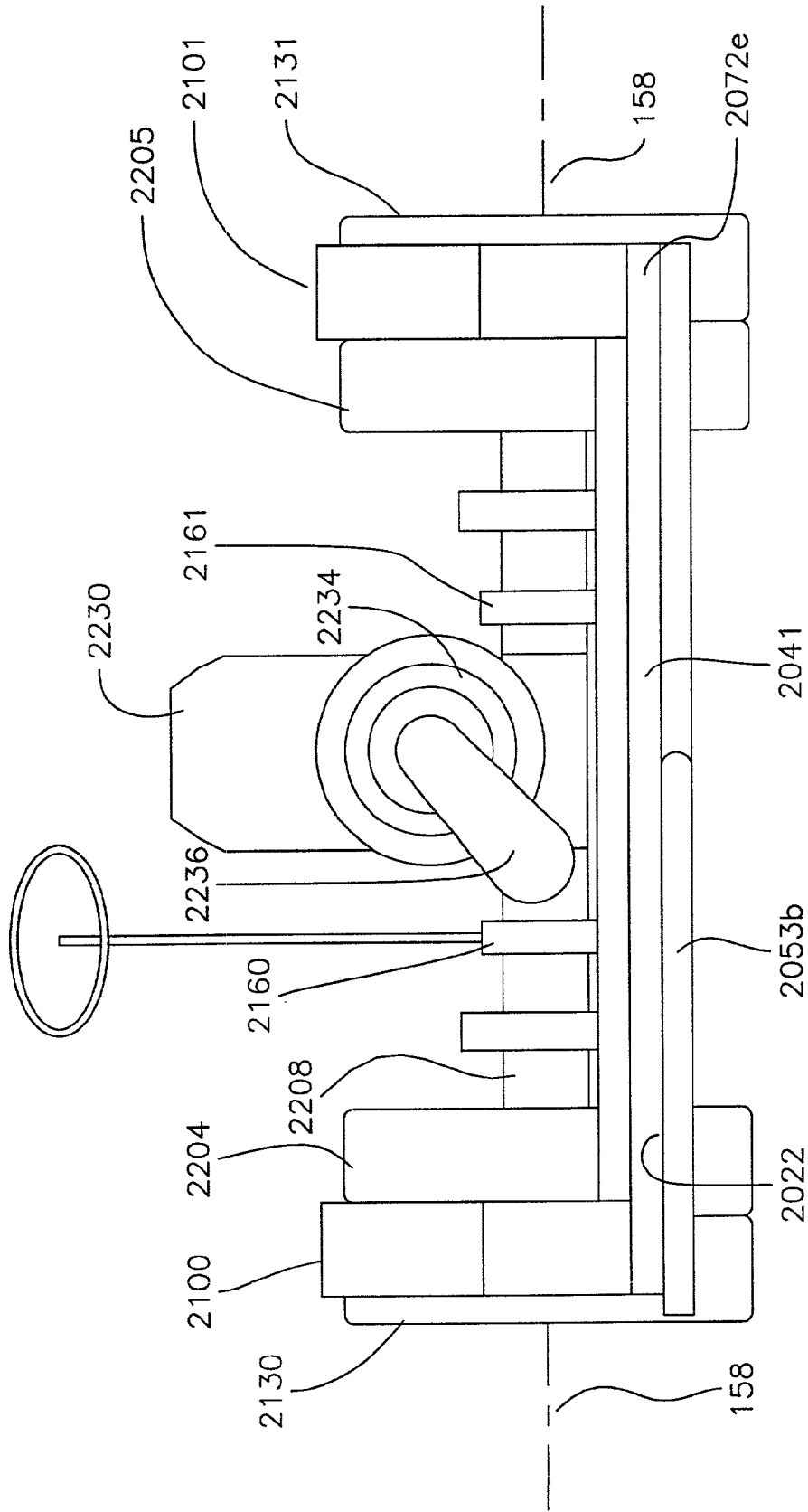
FIG. 31 is an end elevational view of the apparatus of FIG. 30 as taken along line 31—31 of FIG. 30.
Figure 32:
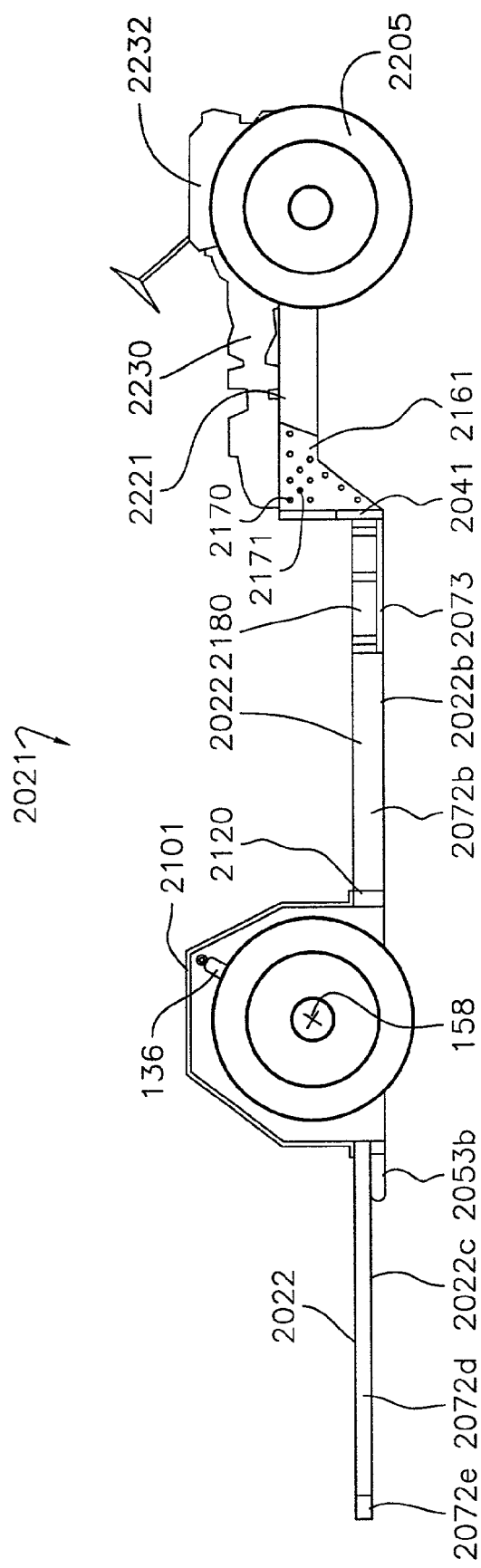
FIG. 32 is a side elevational view of the apparatus of FIG. 30 as taken along line 32—32.

FIGS. 30, 31, and 32 depict top plan, rear and side elevational views of an apparatus 2021 including a vehicle chassis 2020 coupled to a simplified cab section 2200. Cab section 2200 is shown with a front suspension and engine module 2230, a front axle 2208, left and right wheels 2204 and 2205, respectively, and left and right brake assemblies 2207a and 2207b, respectively. These features of cab 2200 are shown schematically. Other features of cab section 2200 have been removed for sake of clarity.

Referring to FIGS. 30–33, vehicle chassis 2020 according to one embodiment of the present invention includes a substantially planar forward frame portion 2040, a substantially planar rearward frame portion 2060, and an intermediate frame portion 2050 located therebetween, and also between wheel housings 2100 and 2101. Chassis 2020 further includes a support section 2150 located forward of forward frame portion 2040, section 2150 bolting to a front sub-frame 2220 supporting a front suspension/engine module 2230.

Forward frame 2040, intermediate frame 2050, and rearward frame 2060 are preferably of the ladder-type, each comprising a plurality of lateral structural members 2070, longitudinal structural members 2072, and/or diagonal structural members 2074. The various structural members 2070, 2072, and 2074 are preferably welded together into a ladder-type or box structure such that the top surfaces of the structural members define a substantially planar top surface 2022 that extends generally across frame sections 2040, 2050, and 2060 (as best seen in FIGS. 31 and 32).

Forward frame portion 2040 includes a plurality of lateral structural members 2070a that extend transversely from the outboard surface of one of the central longitudinal members 2042a or 2042b to the inboard surface of the adjacent outboard longitudinal member 2072a or 2072b, respectively. As best seen in plan view 30, forward frame portion 2040 resembles a pair of "ladder-type" structures that extend from either side of the central "backbones" 2042a and 2042b. In one embodiment, frame members 2041, 2042a, 2042b, 2072a and 2072b have closed-off, rectangular cross-sections. Preferably, transverse structural members 2072a have an "I" or "H" cross-sectional shape. However, the present invention further contemplates various types of common cross-section structural members.

Chassis 2020 preferably includes a pair of hollow structural members 2042a and 2042b which run in a generally longitudinal direction from forward-most transverse beam 2041 to aftmost transverse beam 2072e. Structural members 2042a and 2042b provide protection for an exhaust pipe 2053 carried therebetween. As best seen in FIG. 30, exhaust pipe 2053 begins at the forwardmost end of forward frame portion 2040, passing through a hole within transverse beam 2041. Exhaust pipe 2053 extends fore to aft down the longitudinal centerline of chassis section 2020, to a point just aft of intermediate frame portion 2050. Exhaust pipe 2053 has a diameter which is less than the height of central structural members 2042a and 2042b. Exhaust pipe 2053 is located below the top surface of members 2042a and 2042b, and above the bottom surface of members 2042a and 2042b. By being nested between members 2042a and 2042b, exhaust pipe 2053 is protected from many types of debris and irregularities on the road surface.

Pipe 2053 has a round cross section in portion 2053a which extends through front frame portion 2040 and a portion of intermediate frame portion 2054. This circular cross section changes to an oval cross section within portion 2053b, which begins within intermediate frame portion 2054 and extends a short distance into rear frame portion 2060. Exhaust pipe 2053b includes a right angle section, such that the exhaust exits at a location aft of wheel housing 2100.

Intermediate frame 2050 preferably includes a substantially planar center frame section 2054 and left and right wheel housings 2100 and 2101, respectively, on either side of section 2054. Left and right rear wheels 2130 and 2131 for the vehicle are located within their respective wheel housings. Although what has been shown and described are various chassis sections that include wheel housings, the present invention also contemplates those embodiments in which the wheel housings are not part of the chassis, but are integrated into the separable vehicle body or payload portion which is supported by the chassis.

A left wheel 2130 is pivotally supported from intermediate section 2050 by a wheel support 100" which pivotally couples to a forward portion 2120 of intermediate frame portion 2040 by inboard and outboard pivot joints 108 and 110, respectively, in a manner as previously described herein. The pivotal attachment of the wheel support to the frame permits pivoting motion of the supported wheel in a pitching direction, and preferably constrains the wheel against yawing motion such as the type necessary for steering control. The various embodiments of the present invention shown and described herein contemplate use of any of the various wheel supports shown and described herein.

In one embodiment, a spring 133 such as an inflatable air spring is placed between a portion of the wheel support and the bottom side of spring support member 2140, in a manner as previously described herein. The spring provides resilient support of the vehicle from the road surface, the spring urging apart the frame from the wheel support. Spring support 2140 has a top surface within frame section 2054 that is at or below plane 2022. Although what has been shown and described pertains to the left wheel, it is understood that there is preferably a mirror image wheel support supporting the vehicle from a right wheel 2131 located within wheel housing 2101, right wheel 2131 being pivotally supported from portion 2121 of frame 2050.

In one embodiment of the present invention, the wheel supports are trailing arm supports, such that the pivot axes 109 and 111 of the wheel supports 100" are forward of the rotational axes 158 of the wheels 2130 and 2131. Further, as can be best seen in FIGS. 31 and 32, the rotational axes of the wheels are located above plane 2022. Preferably, a wheel support according to the present invention supports a stub axle 114, and stub axle 114 supports one or more wheels from a single side in cantilever fashion such that the wheel is located outboard of the wheel support, leaving the space inboard of the wheel and stub axle for the wheel support, spring, and cargo compartments. Further, pivot joints 108, 109, 110 and 111 which pivotally couple the wheel supports to the frame, are located inboard of the supported wheel. Preferably, the pivot axes of the wheel supports are parallel to the rotational axis of the supported wheel, but the present invention also contemplates a wheel support pivotable about an axis that is not perpendicular to the longitudinal centerline of the vehicle and not parallel to the rotational axis of the supported wheel. The present invention also contemplates suspension systems located generally within the wheel housings, such as the type shown in my issued patents referenced above and incorporated herein by reference.

Rearward frame portion 2060 extends aft from wheel housings 2100 and 2101, and supports the aftmost part of a separable vehicle body or payload portion. Forward longitudinal frame members 2042a and 2042b terminate just aft of intermediate frame section 2050, where each frame member is welded to an aft longitudinal frame member 2062a and 2062b, respectively. These aft longitudinal frame members extend through rear portion 2060, and are welded to rear transverse member 2072e. A pair of outboard longitudinal members 2072c and 2072d interconnect wheel housings 2100 and 2101, respectively, to aft transverse member 2072e. A plurality of interconnecting transverse members 2070b are welded at one end to outboard longitudinal members 2072c or 2072d, and at the other end to central longitudinal members 2062a or 2062b, respectively.

In a preferred embodiment, chassis section 2020 has a substantially planar top surface which extends throughout frame sections 2040, 2050, and 2060. For example, the top surfaces of forward and intermediate members 2042a, 2042b, 2072a, 2072b, 2070a, 2120, 2140, and 2141 are preferably located in a single plane 2022 which is lower than rotational axes 158 of the rear wheels, as best seen in FIG. 31. The top surfaces of aft members 2062a, 2062b, 2070b, 2072c, 2072d, and 2072e are preferably also located in a plane 2022. However, in one embodiment of the present invention, the lower surfaces of these same members are preferably arranged such that the bottom surfaces of the aft members have increased clearance from the road surface. The bottom surface of the forward and intermediate members are closer to the road surface, thus allowing the forward and intermediate sections to include channel sections with a greater vertical height and thus stronger cross-sectional properties.

Referring to FIGS. 30 and 32, the bottom surfaces of forward and intermediate members 2042a, 2042b, 2072a, 2072b, 2070a, 2120, 2140, and 2141 are preferable located in a single lower plane 2022b. Further, the bottom surfaces of aft members 2062a, 2062b, 2070b, 2072c, 2072d, and 2072e are preferably located in a single plane 2022c that is elevated more above the road surface than plane 2022b. Preferably, plane 2022c including the bottom surfaces of the aft members is spaced apart and parallel to plane 2022 containing the top surfaces of the same aft members (refer to FIG. 32). Similarly, the bottom surfaces of the forward and intermediate members located in plane 2022b are spaced apart and parallel to plane 2022 containing the top surfaces of the same forward and intermediate members.

Thus, chassis 2220 includes a forward section with a preferably planar body surface 2022b spaced apart from top planar surface 2022 by a first amount, and a bottom planar surface 2022c which is spaced apart from top surface 2022 by a second amount. Preferably the second amount is less than the first amount, thereby giving increased ground clearance to the aft portion 2060 of the chassis. This increased ground clearance makes it less likely that a road vehicle incorporating this embodiment of the present invention will strike or rub against the road surface when the road vehicle begins to climb an elevated road surface. In one embodiment, the distance between top plane 2022 to bottom plane 2022b is about 4–6 inches, and top plane 2022 is about 10–12 inches from the road surface. However, the present invention also contemplates those embodiments in which the top surfaces of structural members 2042a, 2042b, 2070a, 2072a, and 2072b do not lie in a common top plane, but are all beneath the rotational axes of the rear wheels.

Figure 33:
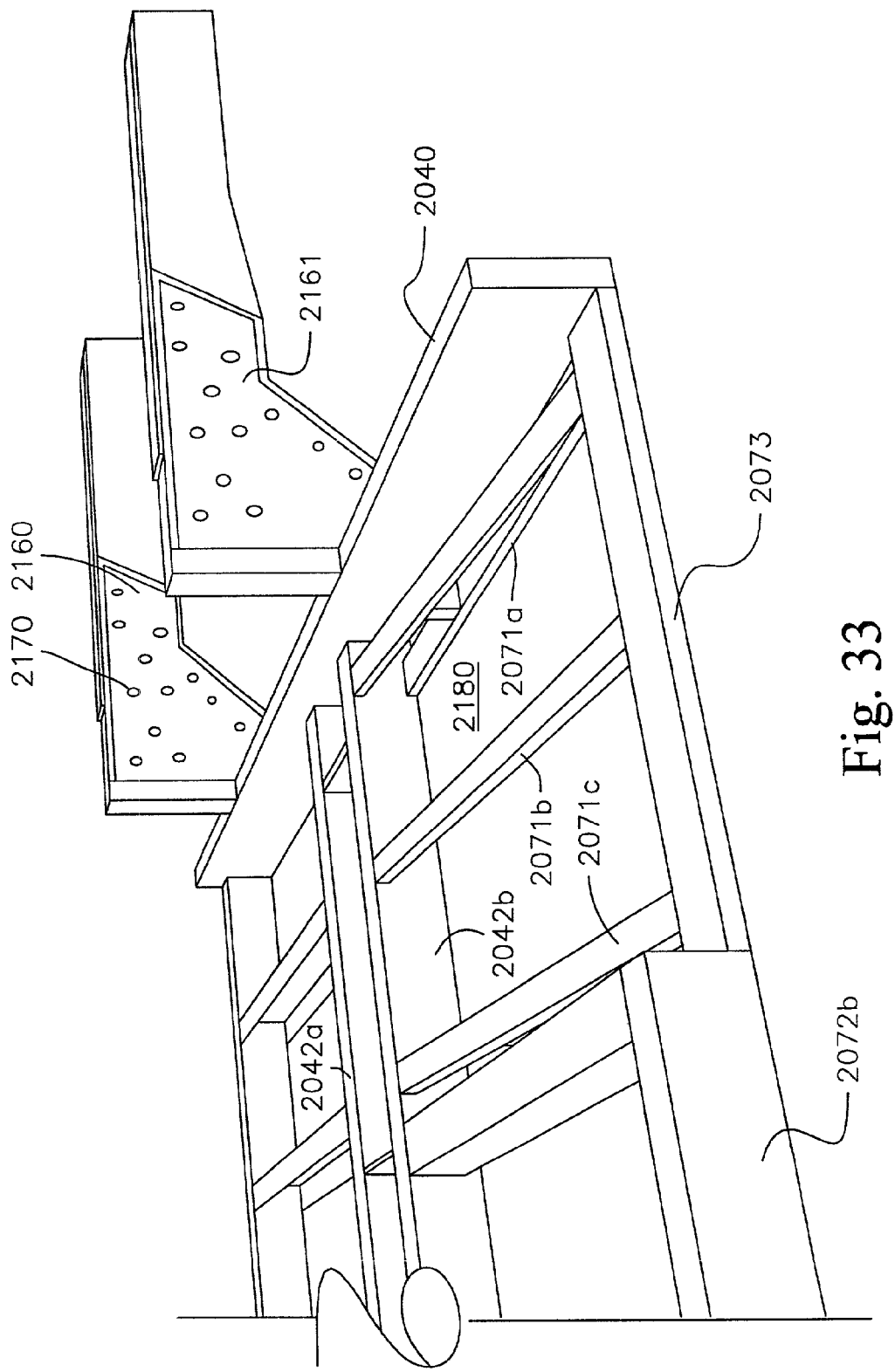
FIG. 33 is a top, side perspective view of a portion of the apparatus of FIG. 30.

In one embodiment of the present invention, forward frame portion 2040 includes unique provisions for incorporating a ramp to facilitate wheelchair access to a payload portion of the road vehicle. As best seen in FIGS. 32 and 33, frame portion 2040 defines a recessed pocket 2180 on one side of forward frame portion 2040. Recessed pocket 2180 includes a bottom boundary established by the top surface of structural members 2071a, 2071b, and 2071c. These three members transition on a downward angle from an inboard portion of frame section 2040, such as from the outboard surface of central longitudinal member 2042b. The other end of members 2071a, 2071b, and 2071c are attached to an outboard portion of frame 2040, such as outboard longitudinal member 2073.

As best seen in FIG. 33, longitudinal member 2073 has a vertical height which is less than that of adjacent longitudinal member 2072b. This cutaway portion along the outboard side of chassis 2020 presents a lower height for those passengers boarding on wheel chairs. In one embodiment of the present invention, the bottom boundary of recessed pocket 2180 is inclined more than about 11.5 degrees and less than about 17.5 degrees, as indicated by angle 2181 of FIG. 34. More preferably, angle 2181 is more than about 14 degrees and less than about 15 degrees. This angle is chosen so that the subsequent vertical rise of the bottom boundary, as would be experienced by a person in a wheelchair entering the vehicle, is about 1 inch for every 4 inches of lateral travel.

In another embodiment of the present invention, the bottom surface 2022b of frame portion 2040 is established to facilitate use of recessed pocket 2180 as part of a wheelchair ramp. In this embodiment, bottom surface 2022b is about 6.5 inches from the road surface. Using the previously mentioned ratio of a 4:1 declining angle, a ramp pivotably hinged to longitudinal member 2073 would have to be about 25–27 inches long. By maintaining the bottom surface of the chassis close to the road surface, it is possible to incorporate a ramp of moderate length, which can be hinged from beam 2073. When not in use, the ramp can be stored inside the vehicle, being supported on the top of beams 2071a, 2071b and 2071c. When in use, the ramp can be folded out to extend from the edge of beam 2073 to the ground. Thus by being low to the ground, it is possible to incorporate a folding wheelchair ramp for ingress and egress of disabled passengers. The weight, complexity and cost of a lifting device is not required.

A support section 2150 is preferably coupled to sub-frame 2220 which supports front suspension and engine module 2230 located in front of forward frame 2040. Support section 2150 includes a pair of support members welded 2160 and 2161 which are cantilevered from the forward transverse beam 2041. Support arms 2160 and 2161 preferably include a plurality of holes 2170. Sub-frame 2220 and other structural components which support the front suspension and engine module 2230 are rigidly coupled to support section 2150 by the use of fasteners 2171 in conjunction with holes 2170.

In some embodiments of the present invention, some portions of sub-frame 2220 are heat treated for improved strength. In these embodiments, the use of fasteners such as bolts, rivets, and related fasteners obviates the need to weld a portion of chassis 2020 to sub-frame 2220. Welding of a sub-frame 2220 that has been heat treated could result in an undesirable change to the heat treated properties. Therefore, some embodiments of the present invention include joining of a chassis to a sub-frame by methods that do not use sufficient heat to change the heat treated properties. However, the present invention also contemplates those embodiments in which there is a negligible or acceptable affect of welding support section 2150 to forward frame portion 2040.

In one embodiment of the present invention the sub-frame supporting the engine and front suspension is cut away from or otherwise removed from an existing vehicle. The rear frame portion of the existing vehicle aft of the cab section is not used, and the sub-frame of the cab section is bolted to chassis 2020. In other embodiments of the present invention, the sub-frame, engine and front suspension unit, and other forward portions of the vehicle are taken from several different existing vehicles, or fabricated specifically for use with chassis section 2020.

Sub-frame 2220 of cab section 2200 provides "high profile" support of at least one of the engine or front suspension of cab section 2200. In some embodiments, the structural members of sub-frame 2220 are above rotational axis 2206 of front wheel 2204. The floor of cab section 2200 is also located above the rotational axis 2206. A vehicle 2400 according to one embodiment of the present invention includes a top surface of the frame of the cab section that is above rotational axes 2206 and 158 of wheels 2206 and 2130, respectively, and a top surface 2022 of the frame supporting the payload section that is below rotational axes 2206 and 158. The combined frame for a vehicle includes a forward-most sub-frame 2220 with a top surface that is at a first elevation above the rotational axes of the wheels, and a center and rear-most frame section 2020 with a top surface that is at a second elevation below the rotational axes of the wheels.

What follows now are specific dimensions for a particular embodiment of the present invention which is related to apparatus 2021 of FIGS. 30, 31, 32, and 33. However, it is understood that these particular dimensions are provided as examples only and are not limiting.

In a specific embodiment, the height of plane 2022 above the road surface is from 10–12 inches and preferably about 11 inches. The distance from the road surface to underneath planar surface 2022b is 5–8 inches and preferably about 6.5 inches. The distance form the road surface to planar surface 2022c on aft frame portion 2060 is 7–10 inches and preferably about 8 inches.

The vertical height of frame portions 2042a, 2042b, 2072a, 2072b, and 2070a is 4–6 inches, and preferably about 5 inches. The width of these same beams is preferably from 2–3 inches. The vertical height of beams 2070b, 2072c, 2072d, 2072e, 2062a, and 2062b, is preferably from about 2–4 inches and most preferably about 3 inches. The vertical height of front transverse beam 2041 is preferably from about 7–9 inches and most preferably about 8 inches. The width of beam 2041 ranges from about 1–3 inches and preferably about 2 inches.

The lateral width of pocket 2180 from the outboard edge of the pocket along the outer surface of beam 2073 to the inboard edge of the pocket along the outboard surface of beam 2042b is from about 38–42 inches and preferably about 40 inches. The width of pocket 2180 from the inner surface of beam 2141 to the front face of beam 2072b is from about 33–37 inches and most preferably about 35 inches. The vertical distance from plane 2022 to the top surface of beam 2073 is from about 3–5 inches and preferably about 4 inches. The distance from the longitudinal centerline of the chassis to the outboard edge of beam 2072b is from about 45–50 inches and preferably about 47.5 inches. Beams 2041, 2072a, 2072b, 2072c, 2072d, 2072e, 2042a, 2042b, 2062a, and 2062b are preferably of a closed channel construction with a rectangular cross section. Beams 2070a and 2070b are preferably of an open channel construction with a "c" cross section, or I-beams.

Figure 34:
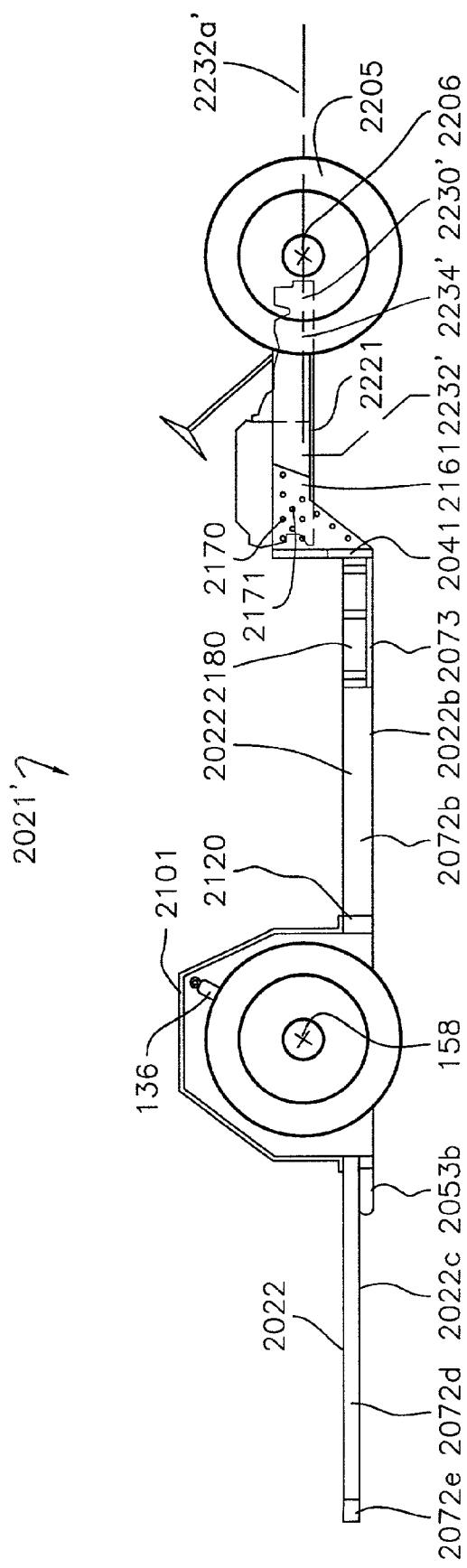
FIG. 34 is a side elevational view of another embodiment of the present invention.
Figure 35:
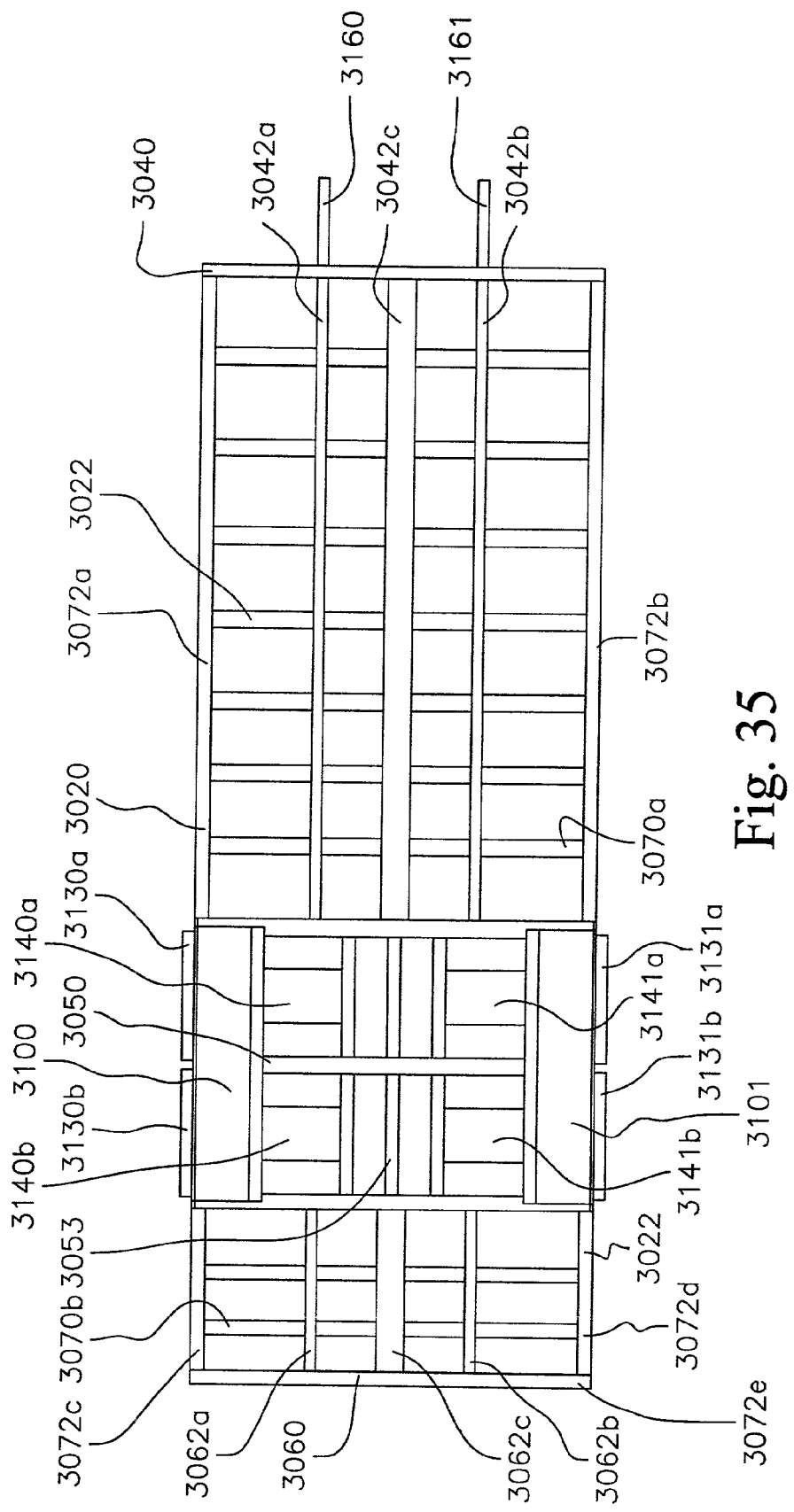
FIG. 35 is a top plan view of an apparatus according to another embodiment of the present invention.
Figure 36:
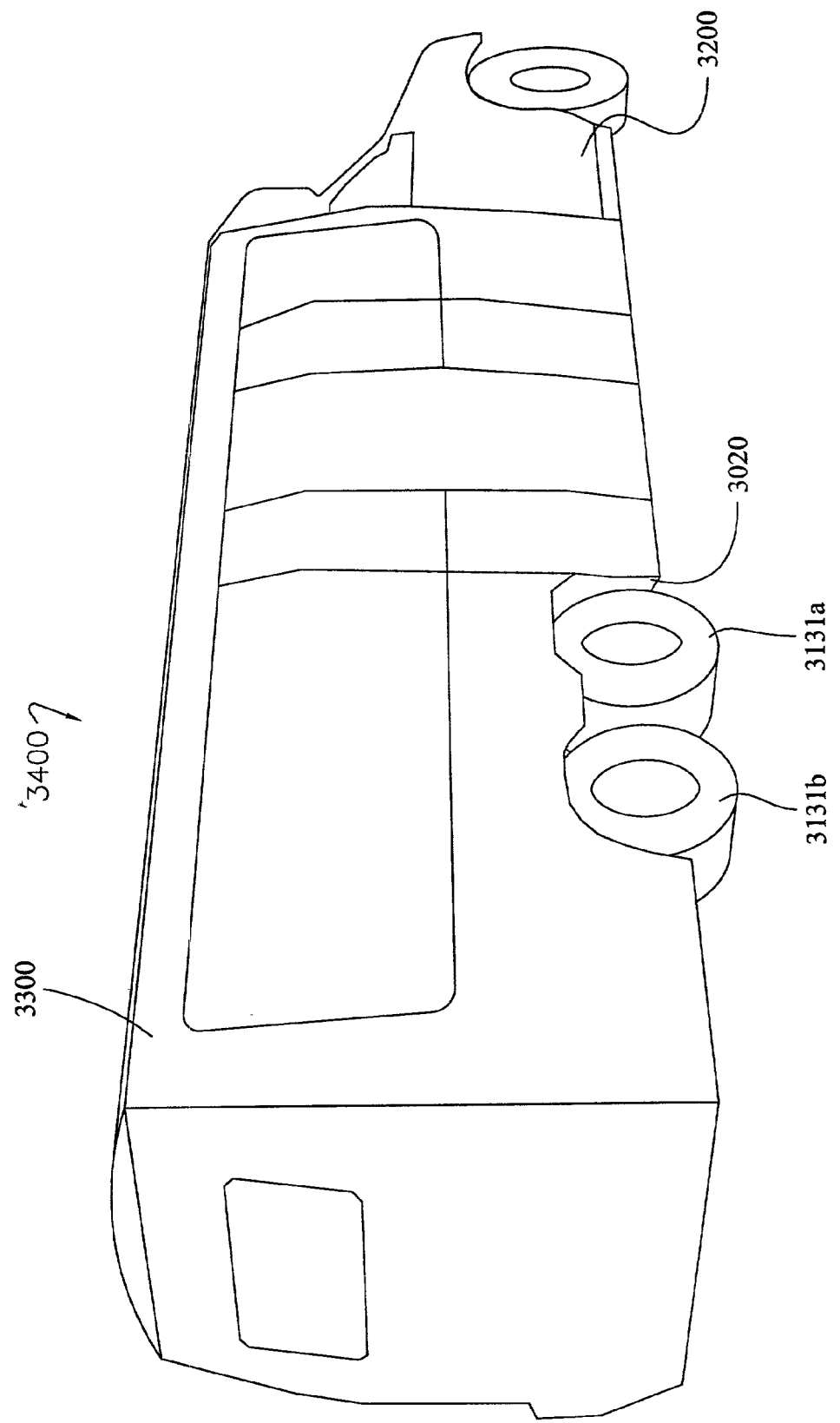
FIG. 36 is a side and rear perspective view of a vehicle incorporating the apparatus of FIG. 35.

FIG. 34 shows a side elevational view of another embodiment of the present invention. FIG. 35 shows an apparatus 2021' which includes a chassis section 2020 as previously described, and a modified cab section 2200'. The use of a prime (') mark by an element number indicates an element substantially similar to the non-prime element, except for those differences which are shown or described.

Cab section 2200' includes a subframe 2220' and a front suspension and engine module 2230' that have been modified to permit a lowering of the driver's seat and floor of the cab compartment. Front suspension and engine module 2230' includes an engine 2232' and transmission 2234' located aft and lower than the location shown and described for engine 2232 and transmission 2234. Engine 2232 is located over the centerline 2206 of wheel 2205, as best seen in FIG. 32. The rotational centerline and power takeoff for engine 2232 is above the axis of the front wheels, and must be brought to the lower level of front axle 2208 by a transfer case 2236. The rotational centerline of the engine and transmission, as well as the various housings of the engine and transmission, generally establish lower boundaries for the floor of the cab section. Therefore, apparatus 2020 can include one or more steps which the driver uses to climb from road level to the driver's seat. Climbing a large distance is undesirable in some applications, such as for delivery trucks which make frequent starts and stops. In these situations, the height and number of steps that must be climbed leads to increased injuries and problems for the delivery drivers.

Apparatus 2021', shown in FIG. 34, includes a mounting arrangement for the engine 2232' and transmission 2234' that reduces the height of the floor of cab section 2200'. Front suspension and engine module 2230' includes an engine 2232' placed aft of front axle 2208'. Engine 2232' is also rotated 180 degrees so that its power takeoff is toward the front of apparatus 2021'. Transmission 2234' is located between engine 2232' and front axle 2208'. The centerline 2232a' of the engine is preferably co-planar with axis 2206' of the front axle. Apparatus 2021' does not need a transfer case because the centerline of the engine is close to, or intersects the centerline of the front axle. The present invention also contemplates those embodiments in which the power input of the front axle is offset slightly from the rotational centerline of the axle. Therefore, the height of the floor of cab section 2200' is lower, and fewer steps are required for entry of the driver from the road surface.

FIG. 35 is a top plan view of an apparatus according to another embodiment of the present invention. A vehicle chassis 3020 is similar to inventive chassis 1020 and 2020 as previously described, but with the following differences. Chassis 3020 includes three central longitudinal members 3042a, 3042b, and 3042c, that traverse the length of forward frame section 3040. Three longitudinal frame members 3062a, 3062b, and 3062c, traverse the length of rear frame portion 3060. Intermediate frame portion 3050 in between the forward and aft frame portions supports a plurality of rear wheels on each side of the chassis. The left side of chassis 20 includes forward and rear wheels 3130a and 3130b, respectively, housed under a common wheel housing 3100. The right side of chassis 3020 includes forward and rear wheels 3131a and 3131b, respectively, housed under a common wheel housing 3101. Further, chassis 3020 includes upper spring supports 3140a and 3140b which are in contact with the top surface of the springs held by the wheel supports (not shown). Further, chassis 3020 includes upper spring supports 3141*a* and 3141*b* which are in contact with the top surface of the springs held by the wheel supports (not shown).

Figure 37:
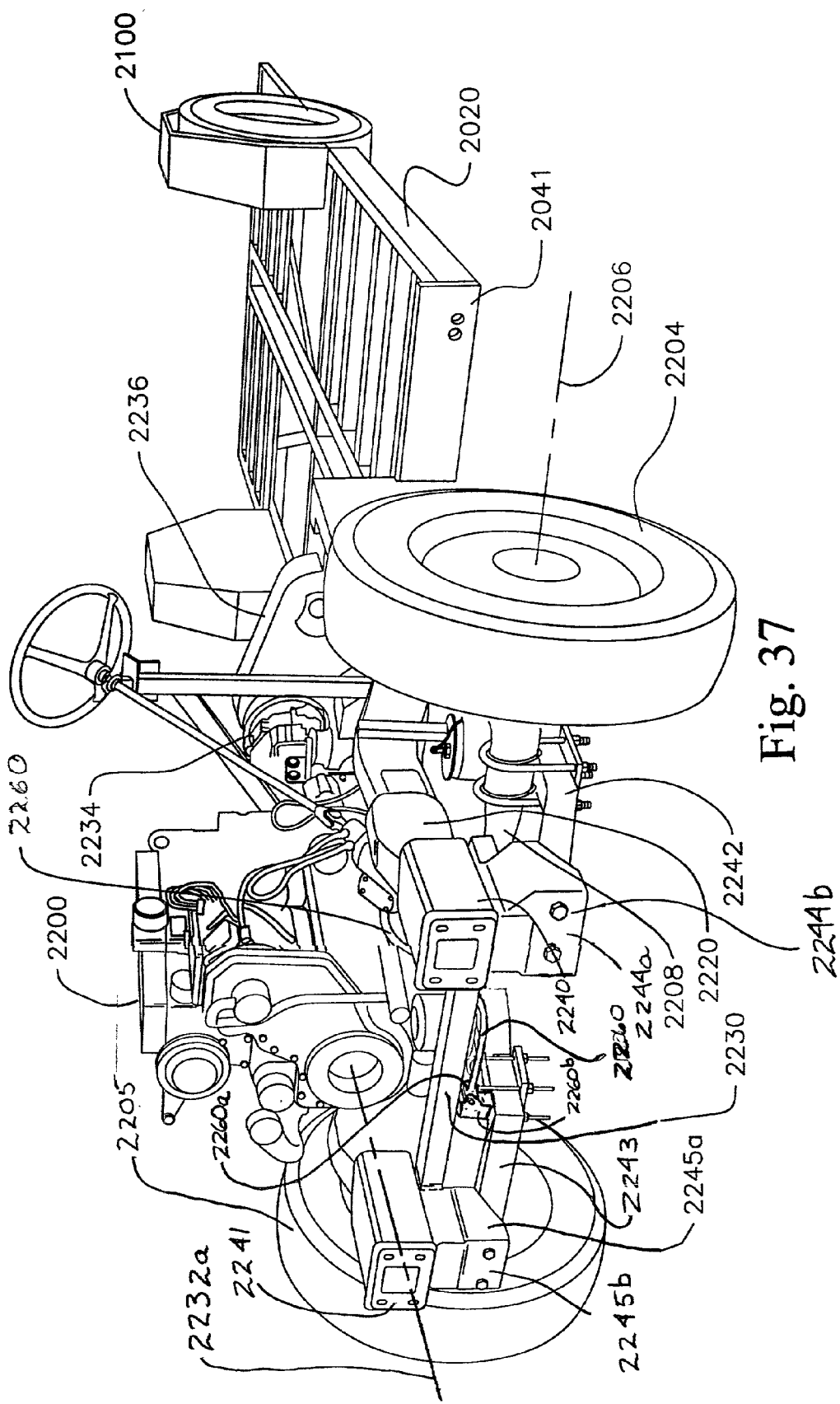
FIG. 37 is a top, front, left side perspective view of the apparatus of FIG. 30.

FIG. 37 shows a front, left, top true perspective view of chassis section 2020 coupled to a portion of a cab section 2200. Various portions of cab 2200, such as the body, seats, windshield, and other features have been removed for sake of clarity. Cab section 2200 includes a subframe 2220 which supports a front suspension and engine module 2230. Module 2230 includes a front axle 2208 which provides power to driven front wheels 2204 and 2205. Wheels 2204 and 2205 rotate about a common centerline 2206 which, in one embodiment of the present invention, is located below engine rotational axis 2232*a*. Power is provided to the driven front wheels by a transfer case 2236, which in turn receives power from a transmission 2234 coupled to engine 2232.

Subframe 2220 includes a pair of longitudinally extending front frame members 2240 and 2241, located on the left and right sides, respectively, of subframe 2220. Each side of front axle 2208 is pivotally coupled to a respective frame member 2240 and 2241 by trailing arm supports 2242 and 2243, respectively. Each trailing arm support is pivotally coupled to the frame member by a single degree of freedom pivot joint. For example, trailing arm support 2242 is coupled to frame member 2240 by a pivot joint 2244*a* located within a housing 2244*b*. Likewise, trailing arm support 2243 is coupled to frame member 2241 by a pivot joint 2245*a* located within a housing 2245*b*. In the description that follows, reference will be made to the trailing arm support and other features of the left side of cab section 2200, it being understood that identical and/or mirror-image features are used on the right side, except as noted.

Figure 38:
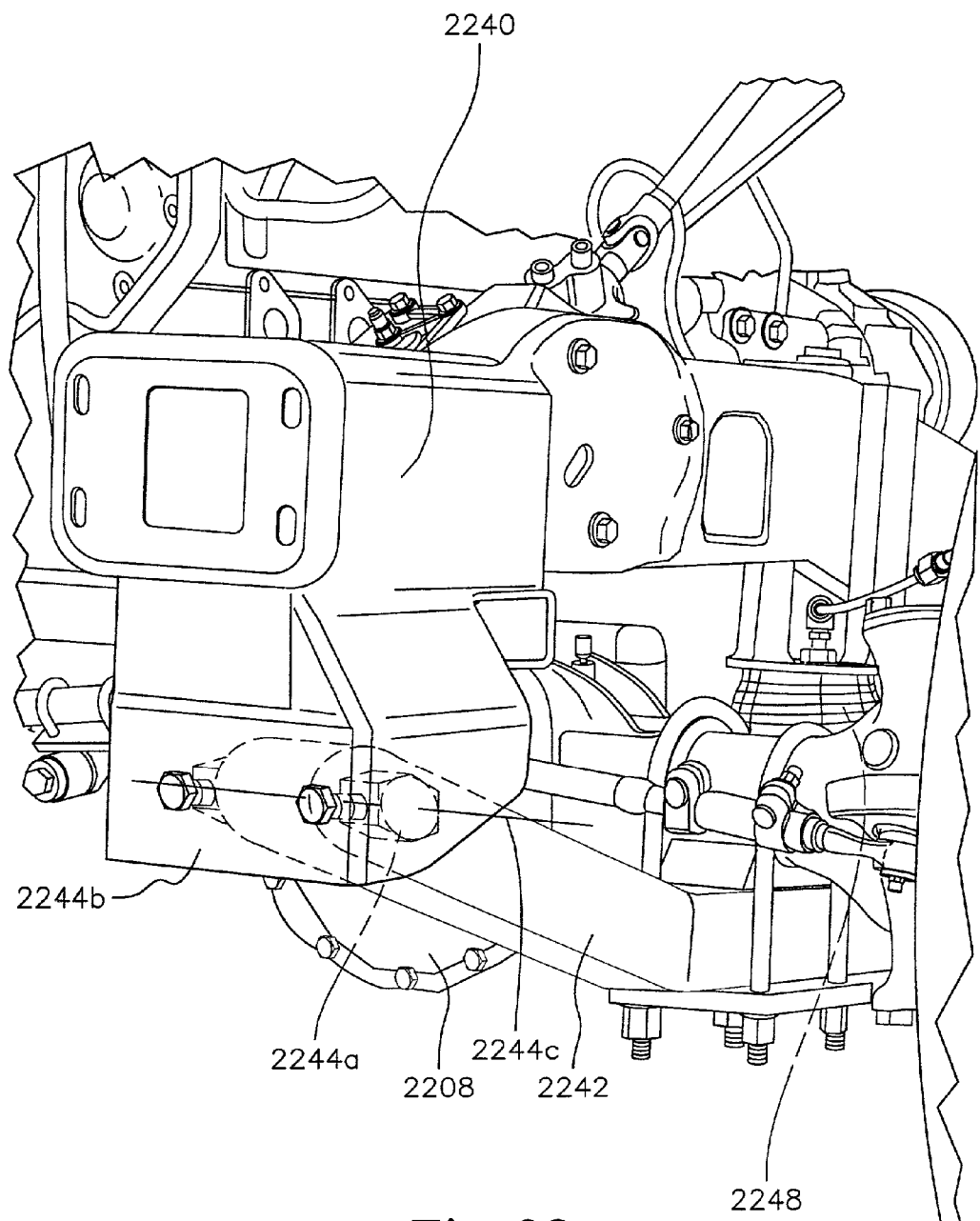
FIG. 38 is an enlargement of a portion of the apparatus of FIG. 37.
Figure 39:
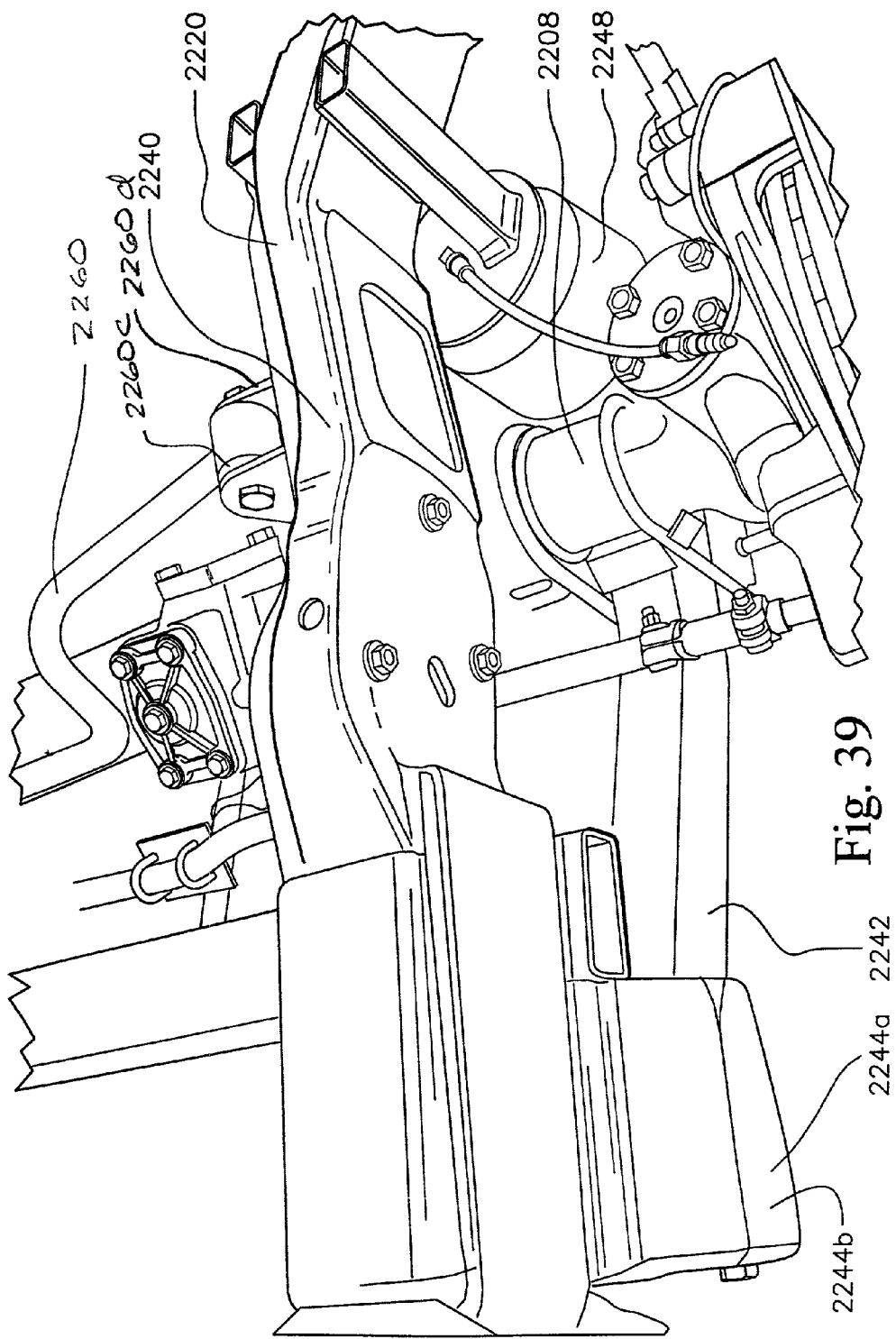
FIG. 39 is a top perspective view of a portion of the apparatus of FIG. 37.
Figure 40:
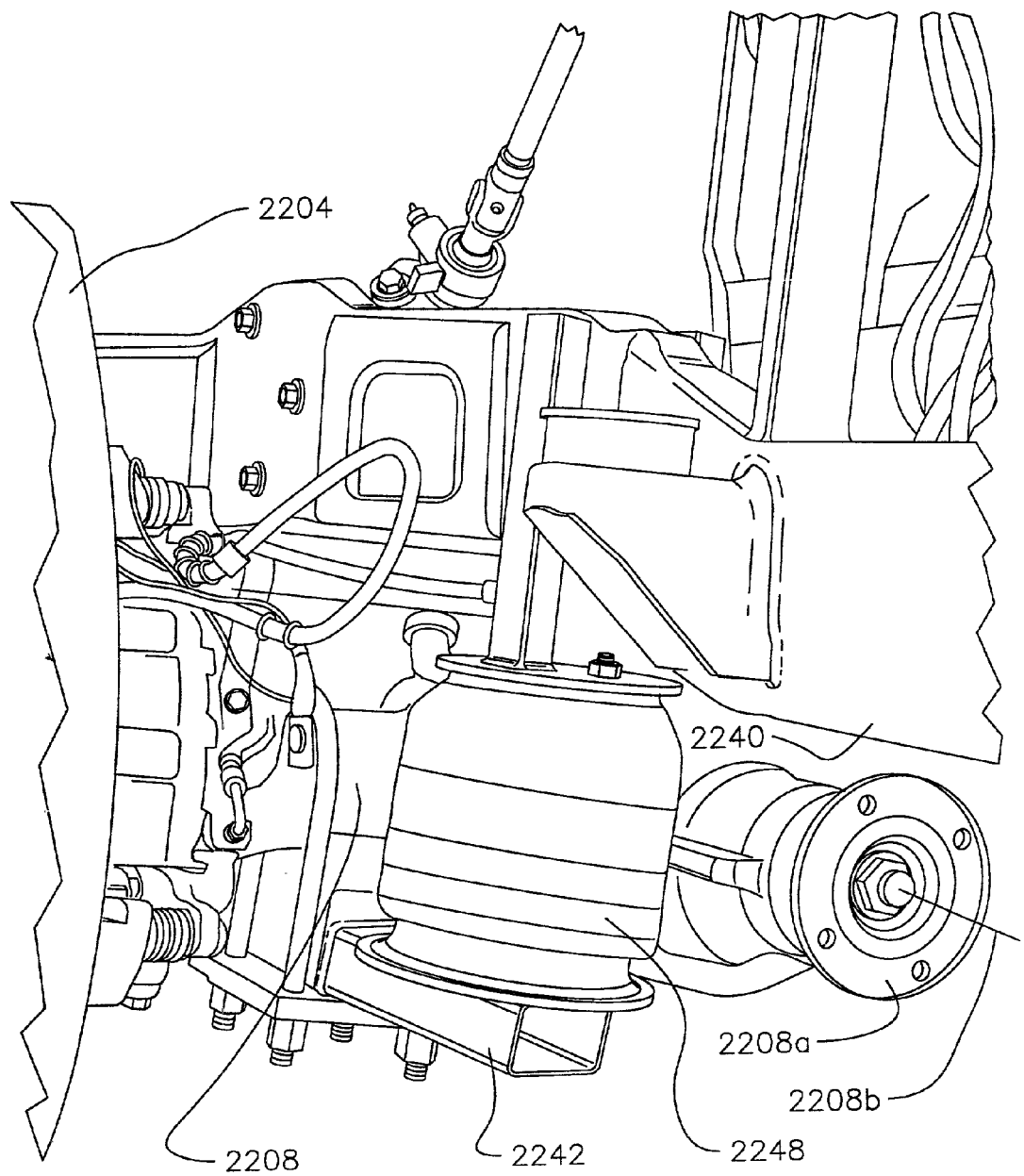
FIG. 40 is a rear, side perspective view of a portion of the apparatus of FIG. 37.

FIGS. 38, 39, and 40 are enlarged views of the various components in the vicinity of trailing arms support 2242 from side, top, and rear viewpoints, respectively. FIG. 38 shows trailing arm support 2242 pivotally coupled to longitudinal frame member 2240 by a pivot joint 2244*a* attached within a joint housing 2244*b*. Pivot assembly 2244*a* permits rotation of trailing arm support 2242 about a pivot axis 2244*c* which is generally parallel to the rotational axis 2206 of front axle 2208. Pivot assembly 2244*a* includes a stationary member, preferably bolted to housing 2244*b*, and a pivoting inner member which is attached to the forward-most end of arm 2242.

In one embodiment, the inner pivoting member of assembly 2244*a* includes an inner molded elastomeric collar which is integrally molded within the stationary member of pivot assembly 2244*a*. Preferably, the inner surface of the joint stationary member includes a plurality of grooves, such that during molding of the elastomeric collar, complimentary shaped ribs are molded into the elastomeric material.

Referring to FIGS. 38, 39 and 40, trailing arm support 2242 extends aft from pivot joint 2244*a* preferably underneath front axle 2208, with the aftmost end of support 2242 being coupled to the bottom side of an air spring 2248. The top side of air spring 2248 is in contact with static members which are rigidly attached to front longitudinal frame member 2240. Air spring 2248 is pressurized with a gas such as air, and urges apart the aftmost end of arm 2242 from frame member 2240. Although what has been shown and described is an air spring, the present invention also contemplates the use of other biasing members, including for example, coil springs and leaf springs.

Arm 2242 is coupled to the left side of front axle 2208, such as by a plurality of U-bolts, as shown. In a preferred embodiment, the support of front axle 2208 by trailing arm support 2242 occurs at a longitudinal position inbetween pivot joint 2244*a* and air spring 2248. However, the present invention contemplates those embodiments in which the support of the front axle by the trailing arm support occurs at a longitudinal position aft of both the pivot joint and the air spring.

Referring to FIG. 40, front axle assembly 2208 includes a power input coupling 2208*a*. This power input coupling rotates about an input axis 2208*b*, which is largely perpendicular to the central axis 2206 of the front axle and front driven wheels. However, the present invention also contemplates those embodiments in which the axis of power input is displaced vertically up or down from wheel axis 2206, as is common in some front axles.

As best seen in FIG. 37, front suspension module 2230 includes a pivotal member 2260 that pivotally couples trailing arm 2243 to longitudinal frame member 2240. Rod 2260, sometimes referred to as a panhard rod, is pivotally coupled at one end by a pivot joint 2260*a* supported within a pivot housing 2260*b*, the latter being rigidly attached to trailing arm support 2243. Pivot joint 2260*a* permits pivoting movement of one end of rod 2260 about a pivot axis that is generally perpendicular to pivot axes 2244*c* and 2243*c* of trailing arm supports 2242 and 2243, respectively.

Referring to FIG. 37, pivotal member 2260 extends laterally from its pivotal attachment to trailing arm 2243 toward the longitudinal centerline of engine and suspension module 2220, and then transitions vertically up toward longitudinal frame member 2240. As best seen in FIG. 39, member 2260 is pivotally connected by a pivot joint 2260*c* supported by a pivot joint housing 2260*d* rigidly attached to an inboard surface of frame member 2240. Pivot joint 2240*c* permits pivoting of the second end of member 2260 about a pivot axis that is perpendicular to the pivot axes of trailing arms 2243 and 2242, and generally parallel to the pivot axis of the other end of member 2260.

Figure 41:
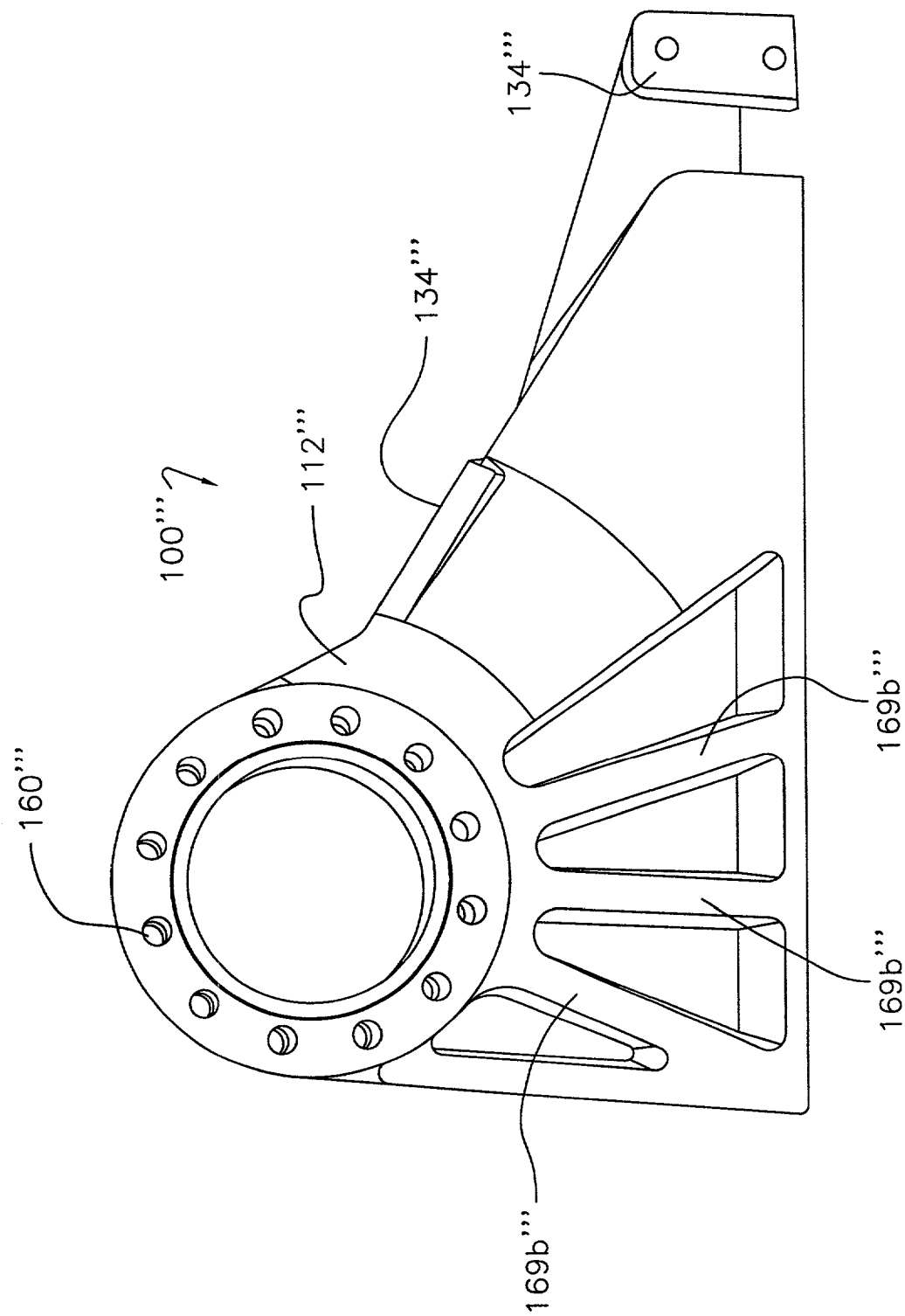
FIG. 41 is a side true perspective view of a wheel support according to another embodiment of the present invention.
Figure 42:
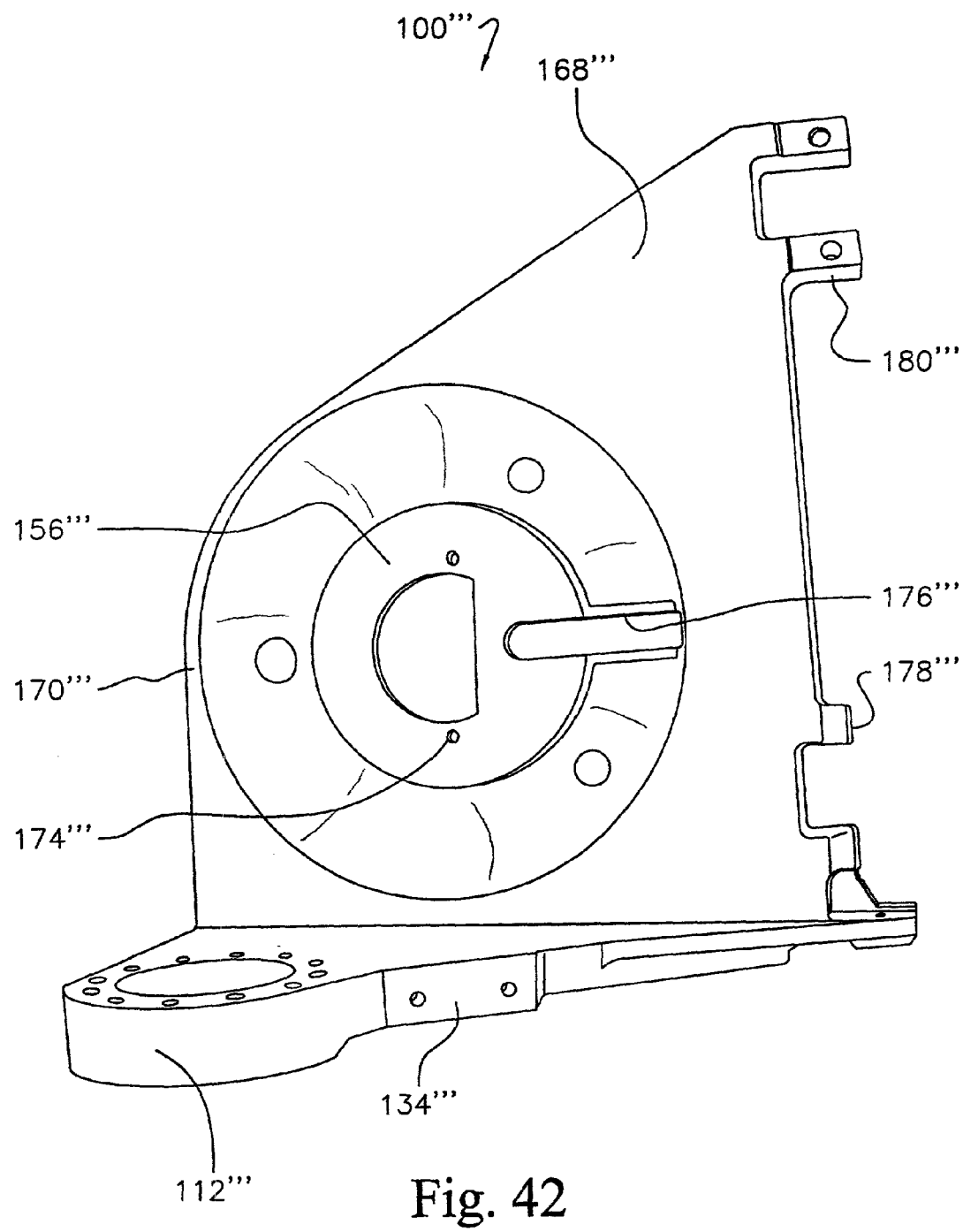
FIG. 42 is a top true perspective view of the wheel support of FIG. 41.
Figure 43:
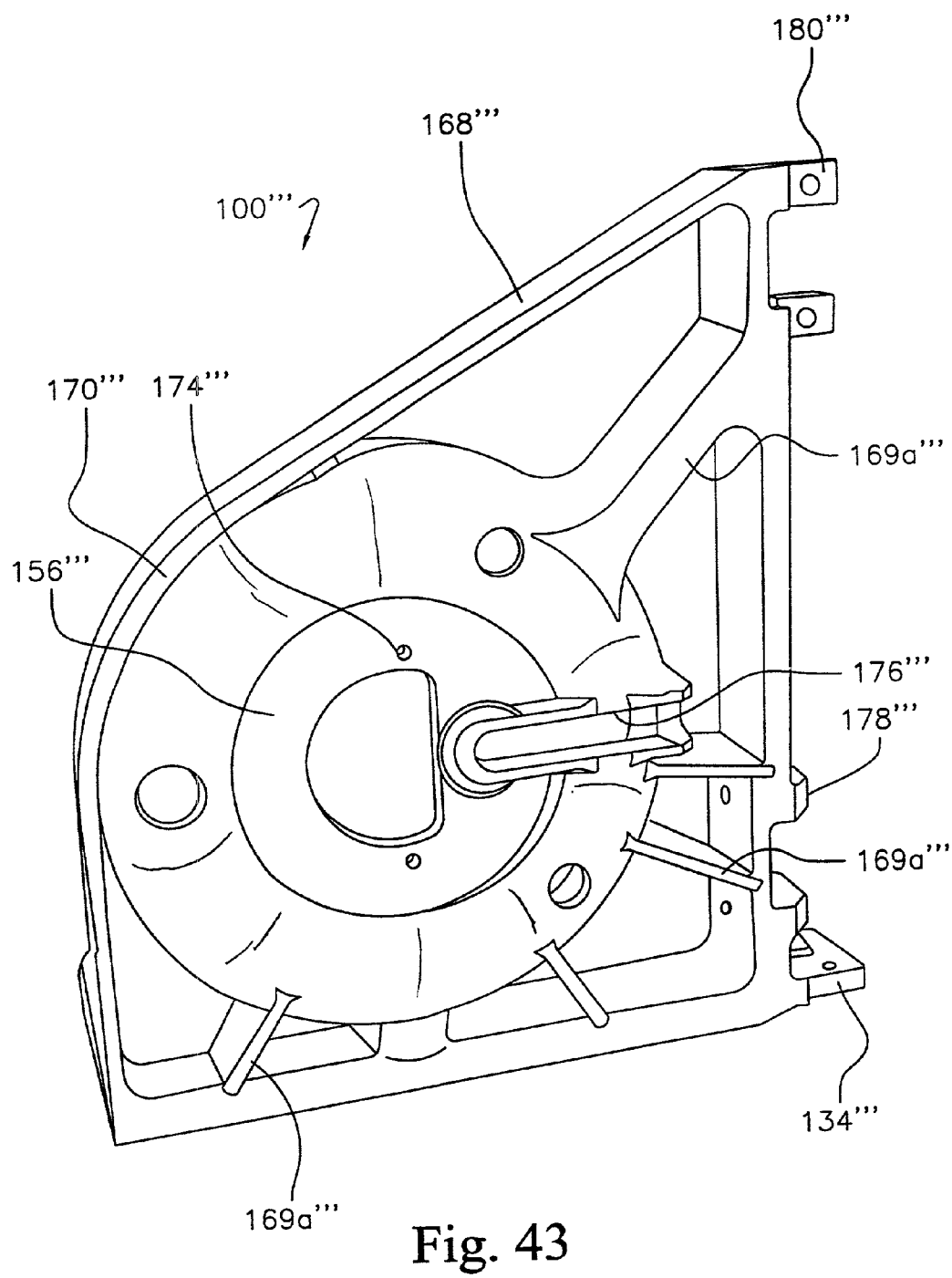
FIG. 43 is a bottom true perspective view of a mirror-image wheel support of the wheel support of FIG. 41.

FIGS. 41–43 depict a substantially cast wheel support 100''' according to another embodiment of the present invention. Element numbers designated with three prime marks (''') designate elements that are the same as the non-prime, single prime, or double prime elements, except as described and depicted differently.

Wheel support 100''' includes a horizontal portion 168''' cast integrally with an upright portion 112'''. A spring support 156''' within horizontal portion 168''' receives loads from a spring, and is reinforced by a plurality of cast stiffening ribs 169*a*'''. Spring support 156''' preferably includes two mounting holes 174''' placed laterally and generally parallel to the rotational axis of the wheel. For the configurations of wheel supports shown herein, it is possible to dispense with a form bolt pattern for attachment of the airspring, since the pitching-type movement of the wheel support reduces loads on the airspring which act to cause the airspring to move fore and aft. Therefore, a simplified, two bolt lateral pattern is sufficient in some embodiments to prevent side to side motion of the airspring. By simplifying the attachment pattern from four fasteners to two fasteners, the reliability of the airspring and wheel support is increased by lessening the number of attachment points that can fail.

A cast reinforcing member 170''' stiffens and strengthens wheel support 100'''. A plurality of cast stiffening ribs 169*b*''' reinforces upright portion 112'''. Attachment members 178''' and 180''' are cast integrally with wheel support 100'''. Upright portion 112''' includes mounting provisions 134''' for attachment of a shock absorber and brake system components.

The toe-in of wheel support 100''' is adjustable by shimming in a manner as previously described. Camber is adjustable by incorporating slots in stationary outer members 108c''' and/or 110c''' of the pivotal attachments. The slots permit the orientation of outer member 108c''' or 110c''' to be adjusted relative to a cross-member of the frame. This orientation is maintained by a friction fit provided by fasteners 177'''.

Figure 44:
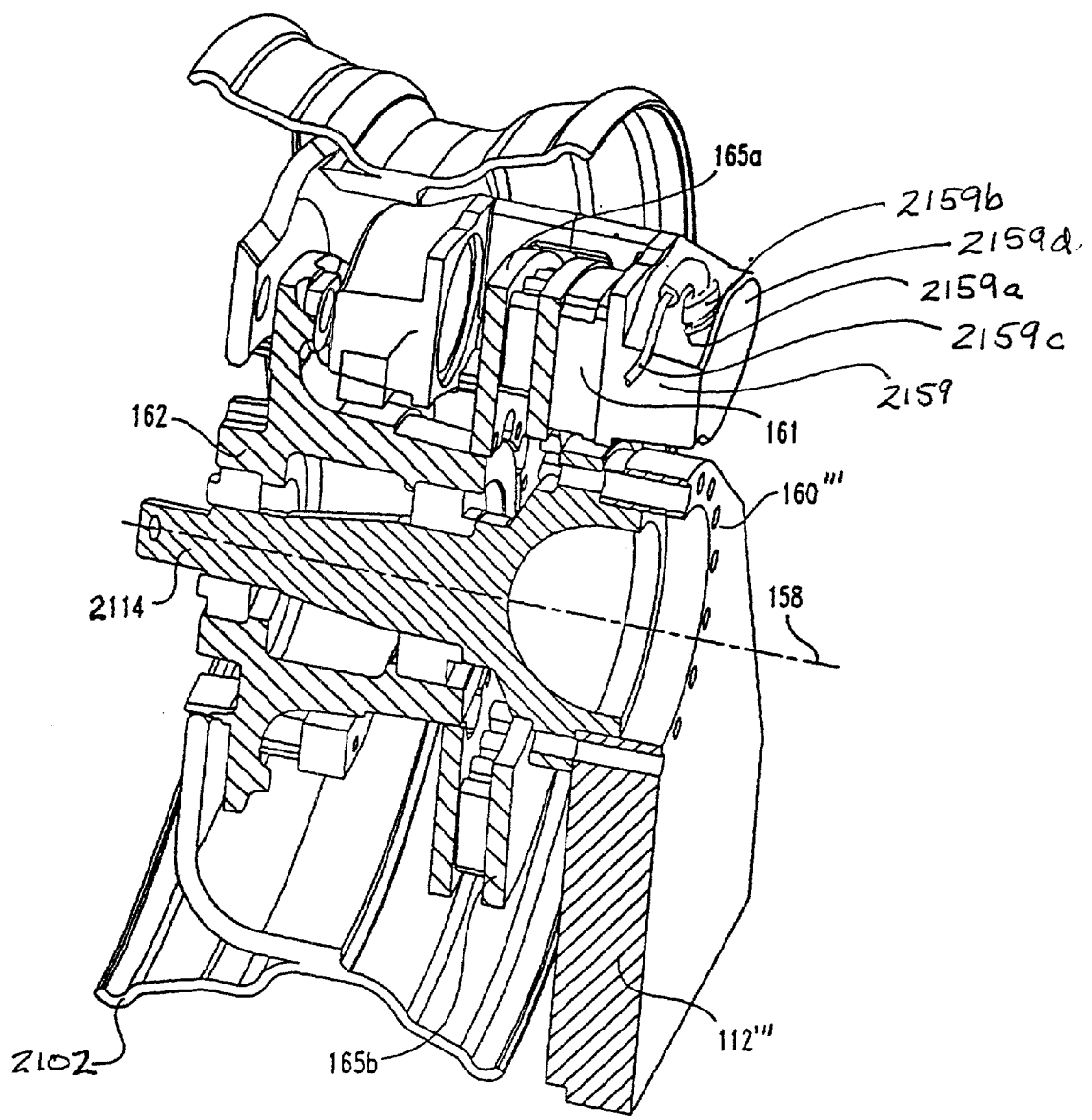
FIG. 44 is a side perspective and cutaway view of a portion of a wheel support, wheel, brake, and stub axle assembly according to one embodiment of the present invention.

Yet other alternate embodiments of the present invention include a wheel support and a disc brake assembly including bleed and pressure ports oriented to maximize the lateral extent of the payload compartment between wheel housings. FIG. 44 is a top perspective view, shown in partial cutaway, of a wheel 2102 rotatably supported about a stub axle 2114 which is cantilevered from an upright portion 112''' of a wheel support 100'''. For sake of clarity, the wheel housing, tire, and other components have been removed. It is understood that the upright portion 112''' lies immediately outboard of the inner surface of the vertical, inboard-most portion of wheel housing 2100.

As shown in FIG. 44, an upright section 112''' is bolted to a spindle 114 by fasteners through fastener attachment pattern 160'''. A rotating hub 162 is bearingly supported on spindle 114. Coupled to hub 162 is a vented disc assembly 165 comprised of opposing rotor plates 165a and 165b. A brake caliper assembly 2159 supported by upright portion 112''' includes two friction pads 161 which are actuated against vented disc 165 so as to slow the vehicle. For sake of clarity, only one friction pad 161 is shown. Those of ordinary skill in the art will recognize the applicability of disc brakes to the many embodiments of the present invention.

As is common in the art, brake assembly 2159 includes one or more ports which are in fluid communication with an internal hydraulic cylinder. For example, there can be one port which provides flow into and out of the internal wheel cylinder, for purposes of brake application and release, respectively. There can be another fluid port for removal of trapped air and outward flow of hydraulic fluid, commonly called a bleed port. For sake of clarity, FIG. 49 is shown with a single port 2159a, which represents either the fluid actuation port or the bleed port.

In order to get the maximum lateral distance between wheel housings, it is necessary to place the inboard vertical walls of the wheel housings as close to the upright portion of the wheel supports as possible. However, other portions of the wheel, stub axle, and brake assemblies must also be located outboard of the inner vertical surface of upright portion 112''', so as to not interfere with the wheel housing or, for those embodiments in which the wheel housings are integrated into the payload section, to not interfere with the payload section itself.

Therefore, some embodiments of the present invention utilize a brake assembly 2159 which incorporates one or more fluid ports that are oriented so that neither the ports, nor any equipment attached to it, protrude inward of the innermost surface of the brake assembly. As shown in FIG. 44, brake assembly 2159 includes a port 2159a, preferably located on a top surface of the brake assembly, and preferably oriented with an axis that is generally parallel to the longitudinal axis of the chassis. A hydraulic fitting 2159b part of a hydraulic fluid line 2159c is threadably coupled into port 2159a. Hydraulic line 2159c provides hydraulic fluid into and out of the internal cylinder of brake assembly 2159, or provides a bleed of trapped air and hydraulic fluid from the internal cylinder. Preferably, port 2159a is located on assembly 2159 and adapted and configured such that no portion of hydraulic line 2159c, including hydraulic fitting 2159b, is located inward of innermost portion 2159d. As shown in FIG. 49, the brakes can be actuated or bled from a hydraulic line, including the fittings, that does not come closer to the wheel housing than the upright portion of the wheel support. As shown and described, port 2159a is oriented vertically upwards. However, the present invention also contemplates those embodiments in which port 2159a can have any orientation, so long as hydraulic line 2159c and fitting 2159b do not extend inward of the innermost surface of the brake assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. An apparatus for a motor vehicle with a front engine, transmission, and a pair of powered, steerable front wheels, comprising:
   a first frame supporting at least one of the engine, transmission, and the front wheels, wherein the engine rotational axis is located above the centerline of the front wheels;
   a second frame with a top surface and a bottom surface, said second frame being rigidly coupled to said first frame;
   a first rear wheel
   a second rear wheel;
   a first stub axle providing cantilevered support to said first wheel about a first rotational axis, said first stub axle being pivotally coupled to said second frame and pivotal about a first pivot axis;
   a second stub axle providing cantilevered support to said second wheel about a second rotational axis, said second stub axle being pivotally coupled to said second frame and pivotal about a second pivot axis;
   wherein said first pivot axis is below and in front of said first rotational axis, said second pivot axis is below and in front of said second rotational axis, and the top surface of said second frame is below the first rotational axis and the second rotational axis; and
   which further comprises a first wheel support supporting said first stub axle, said first wheel support being pivotally coupled to said second frame, and a second wheel support supporting said second stub axle, said second wheel support being pivotally coupled to said second frame, wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing.

2. The apparatus of claim 1 wherein the top surface of said second frame is below the first rotational axis and the second rotational axis when the vehicle is transporting.

3. The apparatus of claim 1 which further comprises an exhaust pipe for exhausting combusted gas to ambient and including a port to ambient conditions, the port being behind one of said first rear wheel or said second rear wheel, wherein said exhaust pipe passes under the top surface of said second frame and over the bottom surface of said second frame.

4. The apparatus of claim 1 which further comprises a motor which propels the vehicle and which exhausts combusted gas, and an exhaust pipe which exhausts combusted gas behind one of said first rear wheel or said second rear wheel, wherein said second frame includes a bottom surface, the top surface of said frame is substantially planar, and said exhaust pipe is supported below the top surface and above the bottom surface of said second frame.

5. The apparatus of claim 1 wherein said second frame includes a bottom surface and the pivotal coupling of said first stub axle is below the top surface and above the bottom surface, and the pivotal coupling of said second stub axle is below the top surface and above the bottom surface.

6. The apparatus of claim 1 wherein said first frame has a lateral width less than the lateral width of said second frame.

7. The apparatus of claim 1 wherein said first rear wheel is unpowered and said second rear wheel is unpowered.

8. The apparatus of claim 1 wherein said second frame comprises a recessed pocket adapted and configured for wheelchair access.

9. The apparatus of claim 1 wherein the front wheels have a track width less than the track width of the rear wheels.

10. An apparatus for a transporting motor vehicle with a front engine, transmission and a pair of powered, steerable front wheels, comprising:
   a first frame supporting at least one of the engine, transmission, and the front wheels;
   a second frame with a top surface and a bottom surface, said second frame being rigidly coupled to said first frame;
   a first rear wheel;
   a second rear wheel;
   a first stub axle providing cantilevered support to said first wheel about a first rotational axis, said first stub axle being pivotally coupled to said second frame and pivotal about a first pivot axis;
   a second stub axle providing cantilevered support to said second wheel about a second rotational axis, said second stub axle being pivotally coupled to said second frame and pivotal about a second pivot axis;
   wherein said first pivot axis is below and in front of said first rotational axis, said second pivot axis is below and in front of said second rotational axis, and the top surface of said second frame is below the first rotational axis and the second rotational axis when the vehicle is transporting;
   a first spring for urging said first wheel apart from said second frame; and
   a second spring for urging said second wheel apart from said second frame;
   wherein said first spring and said second spring are below the top surface of said second frame; and
which further comprises a first wheel support supporting said first stub axle, said first wheel support being pivotally coupled to said second frame, and a second wheel support supporting said second stub axle, said second wheel support being pivotally coupled to said second frame, wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing.

11. The apparatus of claim 10 wherein said first frame has a bottom surface, the rotational axis of the front wheels is below the bottom surface of said first frame and above the top surface of said second frame, and the rotational axis of the rear wheels is above the top surface of said second frame and below the bottom surface of said first frame.

12. The apparatus of claim 10 which further comprises an exhaust pipe for exhausting combusted gas to ambient and including a port to ambient conditions, the port being behind one of said first rear wheel or said second rear wheel, wherein said exhaust pipe passes under the top surface of said second frame and over the bottom surface of said second frame.

13. The apparatus of claim 12 wherein said second frame section defines a recessed pocket adapted and configured for wheelchair access.

14. An apparatus for a motor vehicle with a front engine, transmission, and a pair of powered, steerable front wheels, comprising:
   a first frame supporting at least one of the engine, transmission, and the front wheels;
   a second frame with a top surface, and a bottom surface said second frame being rigidly coupled to said first frame;
   a first rear wheel;
   a second rear wheel;
   a first stub axle providing cantilevered support to said first wheel about a first rotational axis, said first stub axle being pivotally coupled to said second frame and pivotal about a first pivot axis;
   a second stub axle providing cantilevered support to said second wheel about a second rotational axis, said second stub axle being pivotally coupled to said second frame and pivotal about a second pivot axis;
   wherein said first pivot axis is below and in front of said first rotational axis, said second pivot axis is below and in front of said second rotational axis, and the top surface of said second frame is below the first rotational axis and the second rotational axis, and which further comprises a first wheel support independently supporting said first stub axle, said first wheel support being pivotally coupled to said second frame, and a second wheel support independently supporting said second stub axle, said second wheel support being pivotally coupled to said second frame, wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing.

15. The apparatus of claim 14 wherein said first and second wheel supports are pivotal about a pivot axis that is forward and below the rotational axis of each said rear wheel.

16. The apparatus of claim 15 wherein the pivot axis is parallel to the rotational axis, and the pivot axis is mounted between the top and bottom surfaces of said second frame.

17. The apparatus of claim 14 which further comprises:
   a first air spring urging apart said first wheel support from said second frame;
   a second air spring urging apart said second wheel support from said second frame;
   a source of compressed air; and
   a valve operably coupled to said source, said first air spring, and said second air spring and capable of placing said first air spring or said second air spring in fluid communication with said source or in fluid communication with ambient air;
   wherein said valve places said air spring in fluid communication with said source or with ambient air in response to pivoting of said first wheel support or said second wheel support.

18. The apparatus of claim 17 wherein said first pivot axis is parallel to said first rotational axis and said second pivot axis is parallel to said second rotational axis.

19. An apparatus for a vehicle propelled by a motor which exhausts combusted gas, comprising:
a first rear wheel having a first rotational axis;
a second rear wheel having a second rotational axis;
a frame having a planar portion with a top surface and a bottom surface, said frame interconnecting said first and second rear wheels and being located between said first and second rear wheels, the first and second rotational axes being located above the top surface;
a first stub axle providing cantilevered support to said first wheel about said first rotational axis, said first stub axle being pivotally coupled to said second frame and pivotal about a first pivot axis;
a second stub axle providing cantilevered support to said second wheel about said second rotational axis, said second stub axle being pivotally coupled to said second frame and pivotal about a second pivot axis;
wherein said first pivot axis is below and in front of said first rotational axis, said second pivot axis is below and in front of said second rotational axis, and the top surface of said second frame is below the first rotational axis and the second rotational axis, and which further comprises a first wheel support supporting said first stub axle, said first wheel support being pivotally coupled to said second frame, and a second wheel support supporting said second stub axle, said second wheel support being pivotally coupled to said second frame, wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing; and
an exhaust pipe supported within said frame below the top surface and above the bottom surface, said exhaust pipe including a port to ambient conditions, the port being behind one of said first rear wheel or said second rear wheel.

20. The apparatus of claim 19 wherein said frame includes a pair of closely-spaced longitudinal members proximate the centerline of said frame, and said exhaust pipe is located between said longitudinal members.

21. The apparatus of claim 19 which further comprises a first airspring for urging apart said first wheel support from said frame, the top of said first airspring being below the top surface of said frame, and a second airspring for urging apart said second wheel support from said frame, the top of said second airspring being below the top surface of said frame.

22. The apparatus of claim 19 wherein each pivot axis is parallel to the rotational axes of said rear wheels.

23. An apparatus for a motor vehicle with a front engine, transmission, and a pair of powered, steerable front wheels, comprising:
a first frame supporting at least one of the engine, transmission, and the front wheels;
a second frame with a top surface and a bottom surface, said second frame being rigidly coupled to said first frame;
a first rear wheel;
a second rear wheel;
a first stub axle providing cantilevered support to said first wheel about a first rotational axis, said first stub axle being pivotally coupled to said second frame and pivotal about a first pivot axis; and
a second stub axle providing cantilevered support to said second wheel about a second rotational axis, said second stub axle being pivotally coupled to said second frame and pivotal about a second pivot axis;
wherein said first pivot axis is below and in front of said first rotational axis, said second pivot axis is below and in front of said second rotational axis, and the top surface of said second frame is below the first rotational axis and the second rotational axis; and which further comprises a first wheel support supporting said first stub axle, said first wheel support being pivotally coupled to said second frame, and a second wheel support supporting said second stub axle, said second wheel support being pivotally coupled to said second frame, wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing.
wherein said second frame comprises a recessed pocket extending from an inboard portion of said second frame to an outboard portion of said second frame and extending below the top surface, said pocket being adapted and configured for wheelchair access.

24. The apparatus of claim 23 wherein said second frame has a right side and a left side and said pocket for wheelchair access is located on the right side of said second frame and forward of said first rear wheel and said second rear wheel.

25. The apparatus of claim 23 wherein the top surface of said second frame is below the first rotational axis and the second rotational axis when the vehicle is transporting.

26. The apparatus of claim 25 wherein the engine rotational axis is located above the centerline of the front wheels.

27. The apparatus of claim 23 wherein the front wheels have a track width less than the track width of the rear wheels.

28. The apparatus of claim 27 which further comprises an exhaust pipe for exhausting combusted gas to ambient and including a port to ambient conditions, the port being behind one of said first rear wheel or said second rear wheel, wherein said exhaust pipe passes under the top surface of said second frame and over the bottom surface of said second frame.

29. An apparatus for a motor vehicle with a front engine, transmission, and a pair of powered, steerable front wheels, comprising:
a first frame supporting a pair of powered, steerable front wheels;
a second frame with a top surface and a bottom surface;
a first rear wheel;
a second rear wheel;
a first stub axle providing cantilevered support to said first rear wheel about a first rotational axis, said first stub axle being pivotally coupled to said second frame and pivotal about a first pivot axis; and
a second stub axle providing cantilevered support to said second rear wheel about a second rotational axis, said second stub axle being pivotally coupled to said second frame and pivotal about a second pivot axis;
wherein said first pivot axis is below and in front of said first rotational axis, said second pivot axis is below and in front of said second rotational axis, and the top surface of said second frame is below the first rotational axis and the second rotational axis; and which further comprises a first wheel support supporting said first stub axle, said first wheel support being pivotally coupled to said second frame, and a second wheel support supporting said second stub axle, said second wheel support being pivotally coupled to said second frame wherein said first wheel support is pivotally coupled to said second frame by a first pivotal attachment including a first inner member and an elastomeric bushing and said first wheel support is pivotally coupled to said second frame by a second pivotal attachment including a second inner member and a second elastomeric bushing.

wherein the front wheels have a track width less than the track width of the rear wheels.

30. The apparatus of claim 29 wherein the top surface of said second frame is below the first rotational axis and the second rotational axis when the vehicle is transporting.

31. The apparatus of claim 30 which further comprises an exhaust pipe for exhausting combusted gas to ambient and including a port to ambient conditions, the port being behind one of said first rear wheel or said second rear wheel wherein said exhaust pipe passes under the top surface of said second frame and over the bottom surface of said second frame.

32. The apparatus of claim 29 wherein said second frame comprises a recessed pocket adapted and configured for wheelchair access.

* * * * *